(12) United States Patent
Muramatsu

(10) Patent No.: US 9,208,928 B2
(45) Date of Patent: Dec. 8, 2015

(54) METHOD FOR PRODUCING MULTILAYER GRAPHENE-COATED SUBSTRATE

(75) Inventor: Kazuo Muramatsu, Kobe (JP)

(73) Assignee: INCUBATION ALLIANCE, INC., Kobe-shi (JP)

( * ) Notice: Subject to any disclaimer, the term of this patent is extended or adjusted under 35 U.S.C. 154(b) by 0 days.

(21) Appl. No.: 13/698,796

(22) PCT Filed: Feb. 6, 2012

(86) PCT No.: PCT/JP2012/052587
§ 371 (c)(1),
(2), (4) Date: Nov. 19, 2012

(87) PCT Pub. No.: WO2012/108371
PCT Pub. Date: Aug. 16, 2012

(65) Prior Publication Data
US 2013/0065034 A1   Mar. 14, 2013

(30) Foreign Application Priority Data

Feb. 9, 2011 (JP) ................................ 2011-025710
Mar. 1, 2011 (JP) ................................ 2011-044523

(51) Int. Cl.
*B05D 3/12* (2006.01)
*H01B 13/32* (2006.01)
*C01B 31/04* (2006.01)
(Continued)

(52) U.S. Cl.
CPC .............. *H01B 13/321* (2013.01); *B82Y 30/00* (2013.01); *B82Y 40/00* (2013.01); *C01B 31/0469* (2013.01); *C01B 31/0484* (2013.01); *C01B 2204/04* (2013.01); *Y10T 428/2495* (2015.01); *Y10T 428/30* (2015.01)

(58) Field of Classification Search
CPC .... C01B 31/02; C01B 31/04; C01B 31/0446; C01B 31/0438; C01B 31/0484; C23C 16/26; C23C 16/16; C23C 16/44
USPC .................. 427/180, 196, 355, 369, 249.1, 11
See application file for complete search history.

(56) References Cited

U.S. PATENT DOCUMENTS 6,787,235 B2 * 9/2004 Nesbitt et al. ................. 428/408
6,869,581 B2 * 3/2005 Kishi et al. ................. 423/447.6
(Continued)

FOREIGN PATENT DOCUMENTS

JP   H11-292526      10/1999
JP   2007-42390 A1   2/2007
(Continued)

OTHER PUBLICATIONS

Liang et al. Graphene transistors fabricated via transfer-printing in device active-areas on large wafer, Nano Letters, 2007, vol. 7 No. 12, pp. 3840-3844.*
(Continued)

*Primary Examiner* — Kelly M Gambetta
(74) *Attorney, Agent, or Firm* — Kratz, Quintos & Hanson, LLP

(57) ABSTRACT

The present invention provides a method of producing a multi-layer graphene-laminated substrate which comprises laminating, on a substrate surface, multi-layer graphenes from a mass of multi-layer graphenes. The method of the present invention can provide an electrically conductive film and a transparent electrically conductive film made of graphenes more easily and stably.

26 Claims, 31 Drawing Sheets

(51) Int. Cl.
*B82Y 30/00* (2011.01)
*B82Y 40/00* (2011.01)
*C23C 16/00* (2006.01)

(56) References Cited

U.S. PATENT DOCUMENTS

| | | | |
|---|---|---|---|
| 7,071,258 B1 | 7/2006 | Jang et al. | |
| 2002/0166654 A1* | 11/2002 | Smalc | 165/80.2 |
| 2002/0167800 A1* | 11/2002 | Smalc | 361/710 |
| 2007/0284557 A1 | 12/2007 | Gruner et al. | |
| 2008/0248275 A1* | 10/2008 | Jang et al. | 428/220 |
| 2009/0200707 A1 | 8/2009 | Kivioja et al. | |
| 2010/0140219 A1 | 6/2010 | Liang | |
| 2011/0123776 A1* | 5/2011 | Shin et al. | 428/172 |
| 2012/0235545 A1* | 9/2012 | Hino et al. | 310/365 |
| 2012/0241690 A1 | 9/2012 | Janowska et al. | |

FOREIGN PATENT DOCUMENTS

| | | |
|---|---|---|
| WO | 02/081187 A2 | 10/2002 |
| WO | 2008/143692 A1 | 11/2008 |
| WO | WO 2009/089268 A2 | 7/2009 |
| WO | WO 2010/110153 A1 | 9/2010 |
| WO | WO 2010110153 A1 * | 9/2010 |
| WO | WO 2010/128650 A2 | 11/2010 |
| WO | WO 2010/137592 A1 | 12/2010 |
| WO | 2011055039 A1 | 5/2011 |
| WO | WO 2011/102473 A1 | 8/2011 |

OTHER PUBLICATIONS

Wang et al. Large-Scale Synthesis of Few-Layered Graphene using CVD, Chemical Vapor Deposition, vol. 15, Mar. 24, 2009, pp. 53-56.*
Shang et al. Catalyst-Free Efficient Growth, Orientation and Biosensing Properties of Multilayer Graphene Nanoflake Films with Sharp Edge Planes, Adv. Funct. Mater. 2008, 18, pp. 3506-3514.*
X. Liang, et al.; "Graphene Transistors Fabricated via Transfer-Printing in Device Active-Areas on Large Wafer;" Nano Letters; vol. 7; No. 12; 2007; pp. 3840-3844 (5 Sheets)/Cited in International Search Report.
Q. Yu, et al.; "Graphene segregated on Ni Surfaces and transferred to insulators;" Applied Physics Letters; vol. 93; 2008; pp. 113103-1-113103-3 (3 Sheets)/p. 4 of specification.
X. Li, et al.; "Large-Area Synthesis of High-Quality and Uniform Graphene Films on Copper Foils;" Science; vol. 324; Jun. 5, 2009; pp. 1312-1314 (3 Sheets)/p. 4 of specification.
X. Li, et al.; "Evolution of Graphene Growth on Ni and Cu by Carbon Isotope Labeling;" Nano Letters; vol. 9; No. 12; 2009; pp. 4269-4272 (3 Sheets)/p. 4 of specification.
S. Bae, et al.; "Roll-to-roll production of 30-inch graphene films for transparent electrodes;" Nature Nanotechnology; vol. 5; Aug. 2010; pp. 574-578 (5 Sheets)/ p. 4 of specification.
C. Berger, et al.; "Ultrathin Epitaxial Graphite: 2D Electron Gas Properties and a Route toward Graphene-based Nanoelectronics;" J. Phys. Chem. B; vol. 108; 2004; pp. 19912-19916 (5 Sheets)/ p. 4 of specification.
S. Horiuchi, et al.; "Carbon Nanofilm with a New Structure and Property;" Jpn. J. Appl. Phys.; vol. 42; 2003; pp. L 1073-L 1076 (4 Sheets)/p. 5 of specification.
M. Hirata, et al.; "Thin-film particles of graphite oxide 1:High-yield synthesis and flexibility of the particles;" Carbon; vol. 42; 2004; pp. 2929-2937 (9 Sheets)/p. 5 of specification.
International Search Report for International Application No. PCT/JP2012/052587 dated Apr. 24, 2012.
Singaporean Search Report and Written Opinion dated Oct. 3, 2013, in the corresponding Singaporean Patent Application No. 201208606-2.
Notification of Transmittal of Translation of the International Preliminary Report on Patentability mailed Aug. 22, 2013, including forms PCT/IB/338 and PCT/IB/373 in the corresponding International Application No. PCT/JP2012/052587.
Viet Hung Pham, et al., "Fast and simple fabrication of a large transparent chemically-converted graphene film by spray-coating." Carbon, 48 (2010) 1945-1951.
Supplementary Search Report dated Oct. 20, 2014, for Singaporean Patent Application No. 2012086062, 9 pages.
European Search Report dated Feb. 4, 2015. Application No. EP 12 74 4187.

* cited by examiner (a)

(b)

(a)

(b)

METHOD FOR PRODUCING MULTILAYER GRAPHENE-COATED SUBSTRATE

TECHNICAL FIELD

The present invention relates to a substrate coated with multi-layer graphenes which is usable, as a transparent conductive film or a conductive film, on electrodes for panels such as liquid crystal display panels and plasma display panels, electrodes for display elements such as laptop computers, mobile phones and touch panels, or electrodes and electrode substrates for lithium ion batteries, lithium ion capacitors, fuel cells, thin film solar cells, other primary batteries and secondary batteries, and sheets for efficiently releasing heat generated inside various devices, and a novel method for producing the same.

BACKGROUND ART

Transparent conductive films (transparent electrodes) produced by coating a glass substrate and a PET (polyethylene terephthalate) resin film with ITO (indium tin oxide) by sputtering, vacuum deposition, or the like have been used so far. However, indium contained in ITO is a rare earth, and there is uneasiness at procurement thereof and there is a fear that dusts of ITO generated at a production site may cause injuries to health. Therefore, alternatives thereof are actively under research and development. Graphenes are expected as a promising candidate, but have not yet put into practical use because they could not be produced stably in an industrial scale.

In lithium ion batteries, capacitors, lithium ion capacitors and fuel cells, film-like electrodes, which are produced by mixing fine powders of graphite, carbon black or the like with polyvinylidene fluoride and a solvent to form a slurry and coating and drying the slurry on a current collector such as a copper foil, have been put into practical use. For example, film-like electrodes, which are produced by using a copper foil and artificial graphite and natural graphite as main materials have been put into practical use on negative electrodes for lithium ion batteries. Such lithium ion batteries are put into practical use as batteries for driving of electric vehicles and are under active research and development since improvement of energy efficiency and increase in a cruising distance per one charge are required.

Graphite is an active material for producing charging and discharging by an intercalation reaction of a lithium ion, but it is difficult to form graphite alone into a sheet since graphite is a powder. For that reason, graphite is adhered together with a binder such as polyvinylidene fluoride to a copper foil or the like to be formed into a sheet. Though there is a graphite sheet material formed into a sheet using graphite alone, mechanical strength thereof is very low in its bending direction and pulling direction, and therefore, use of such a material is limited to a heat resistant packing, etc., in which a compressive strength is important.

Multi-layer graphenes are promising as negative electrodes of lithium ion batteries and electrodes of lithium ion capacitors because they produce intercalation of lithium ion like graphite. For example, if graphene film can be formed directly on a copper foil, electric resistance which is a problem in use of a binder component can be decreased, and in addition, an electrode layer can be made thinner and a charge and discharge capacity is increased. Further, if graphene film can be formed directly on a resin film or graphene can be formed into a complex with a resin film, an electrode can be formed without using a copper foil. In lithium ion batteries for electric vehicles, making a weight thereof light is required, but a specific gravity of copper is as heavy as approximately 9 g/cm$^3$. Meanwhile, if a graphene film can be formed on a PET resin film or a composite of graphene with a PET resin can be produced, a specific gravity thereof is decreased to less than 2 g/cm$^3$, which can lead to decrease in weight to a large extent.

There are a CVD method, an SiC thermal decomposition method, a graphene oxide reducing method, etc. as a technology for producing graphene on a substrate. However, each of them has respective problems. Therefore, a method for producing more easily and stably is demanded.

For example, a CVD method is such that a film comprising graphene is formed on one surface of a metal foil such as copper or nickel by chemical vapor deposition (CVD), then after laminating a resin film on the graphene film, the metal foil is removed by etching and the graphene film is transferred from the etched surface onto an end substrate of PET resin or the like (Non-patent Documents 1 to 4). However, in such a method, since a composite material, in which a graphene film is strongly bonded to a metal foil due to a catalytic action of the metal foil, is produced, in order to transfer the film once formed on the metal foil to a substrate, all metal foil need to be removed using an acid, which makes a production process complicated and results in a problem such as a fear of causing a defect on the film in a transferring process.

Further, the SiC thermal decomposition method is a method for heating an SiC substrate to around 1300° C. to remove Si from its surface and recombine the remaining C into graphene autonomously (Non-patent Document 5). However, there is a problem such that the SiC substrate to be used is expensive and transferring from the SiC substrate is difficult.

Furthermore, the graphene oxide reducing method is a method for oxidizing a graphite powder, dissolving the oxidized graphene powder in a solution, applying the solution to a substrate and then reducing the oxidized graphene (Non-patent Documents 6 and 7). However, since a reducing process is necessary and it is difficult to complete the reduction, there is a problem such that it is difficult to secure enough electric conductivity and transparency.

PRIOR ART DOCUMENTS

Non-Patent Documents

Non-patent Document 1: Q. Yu et al., Appl. Phys. Lett. 93 (2008) 113103
Non-patent Document 2: X. Li et al., Science 324 (2009) 1312
Non-patent Document 3: X. Li et al., Nano Letters 9 (2009) 4268-4272
Non-patent Document 4: S. Bae et al., Nature Nanotech, 5 (2010) 574
Non-patent Document 5: C. Berger et al., J. Phys. Chem. B 108 (2004)
Non-patent Document 6: S. Horiuchi et al., JJAP 42 (2003) L1073
Non-patent Document 7: M. Hirata et al., Carbon 42 (2004) 2929

SUMMARY OF INVENTION

Problem to be Solved by the Invention

In the light of the above-mentioned background, an object of the present invention is to provide a method being capable of providing a transparent conductive film and a conductive film, which comprise graphenes, more simply and stably.

Further, the present invention provides a substrate coated with multi-layer graphenes obtained by laminating, on surface of a substrate, multi-layer graphenes from a mass of multi-layer graphenes.

Means to Solve the Problem

The inventors of the present invention have made intensive studies, and as a result, have found that a substrate coated with multi-layer graphenes, being useful as a transparent conductive film and a conductive film, can be produced simply and stably by laminating multi-layer graphenes directly on surface of a substrate using a mass of multi-layer graphenes formed by aggregation of many multi-layer graphenes. Then, further studies have been made to complete the present invention.

Namely, the present invention relates to:
(1) a method for producing a substrate coated with multi-layer graphemes, comprising laminating, on surface of a substrate, multi-layer graphenes from a mass of multi-layer graphenes,
(2) the production method of above (1), wherein the mass of multi-layer graphenes is a cluster of multi-layer graphenes composed of aggregates in such a state that multi-layer graphenes extend from the inside toward the outside,
(3) the production method of above (1) or (2), wherein the multi-layer graphenes constituting the mass of multi-layer graphenes have a thickness of from 0.34 to 10 nm,
(4) the production method of any of above 1 to 3, wherein the lamination is carried out by rubbing the surface of the substrate with the mass of multi-layer graphenes,
(5) the production method of any of above 1 to 3, wherein the lamination is carried out by bringing the surface of the substrate into contact with a dispersion of multi-layer graphenes prepared from the mass of multi-layer graphenes and then removing a solvent from the surface of the substrate,
(6) the production method of any of above 1 to 3, wherein the lamination is carried out by dip-coating of the surface of the substrate with a dispersion of multi-layer graphenes prepared from the mass of multi-layer graphenes,
(7) the production method of any of above 1 to 3, wherein the lamination is carried out by spray-coating of the surface of the substrate with a dispersion of multi-layer graphenes prepared from the mass of multi-layer graphenes,
(8) The production method of any of above 5 to 7, wherein the solvent is one selected from the group consisting of 1,2-dichloroethane, benzene, thionyl chloride, acetyl chloride, tetrachloroethylene carbonate, dichloroethylene carbonate, benzoyl fluoride, benzoyl chloride, nitromethane, nitrobenzene, acetic anhydride, phosphorus oxychloride, benzonitrile, selenium oxychloride, acetonitrile, tetramethylsulfone, dioxane, 1,2-propanediol carbonate, benzyl cyanide, ethylene sulfite, isobutyronitrile, propionitrile, dimethyl carbonate, propylene carbonate, ethyl methyl carbonate, diethyl carbonate, ethylene carbonate, phenyl phosphorous acid difluoride, methyl acetate, n-butyronitrile, acetone, ethyl acetate, water, phenyl phosphoric acid dichloride, diethyl ether, tetrahydrofuran, diphenyl phosphoric acid chloride, trimethyl phosphate, tributyl phosphate, dimethylformamide, N-methylpyrrolidine, n-dimethylacetamide, dimethyl sulfoxide, N-diethylformamide, N-diethylacetamide, pyridine, hexamethylphosphoric amide, hexane, carbon tetrachloride, diglyme, trichloromethane, 2-propanol, methanol, ethanol, propanol, ethylene glycol, methyl ethyl ketone, 2-methoxyethanol, dimethylacetamide, toluene and polybenzimidazole, or a mixture of at least two thereof; or the above-mentioned solvent or solvent mixture comprising a dispersant,
(9) the production method of above 6 or 8, wherein in the dip-coating, a temperature of the dispersion of multi-layer graphenes is 40° C. or more and a lift-up speed when lifting up the substrate dipped in the dispersion of multi-layer graphenes is from 1 to 1000 µm/sec,
(10) the production method of any of above 1 to 9, wherein a thickness of the layer of the multi-layer graphenes on the substrate coated with multi-layer graphenes is from 0.5 to 10000 nm,
(11) the production method of any of above 1 to 10, wherein the substrate is a resin film made of a resin selected from a polyester resin, an acrylic resin, a polystyrene resin, a polycarbonate resin, a polypropylene resin, a polyethylene resin, a polyvinyl chloride resin and a polytetrafluoroethylene resin; a glass substrate coated on its surface with a resin selected from a polyester resin, an acrylic resin, a polystyrene resin, a polycarbonate resin, a polypropylene resin, a polyethylene resin, a polyvinyl chloride resin and a polytetrafluoroethylene resin or a resin mixture of at least two thereof; a metal foil, metal sheet or metal film made of a metal selected from copper, nickel, iron, aluminum and titanium; paper; a glassy carbon substrate; or a sapphire substrate,
(12) a graphene-coating tool for coating multi-layer graphenes on surface of a substrate to be processed, in which the tool has its surface to be brought into contact with the surface of the substrate and holds a mass of multi-layer graphenes on its surface,
(13) a method for producing a substrate coated with multi-layer graphenes, wherein the substrate coated with multi-layer graphenes has a pattern of thick and thin layers of multi-layer graphenes, wherein the method comprises; preparing a transfer mold provided, on its surface, with convex and concave portions coinciding with the pattern, overlapping a back surface of the substrate over the surface of the transfer mold, and rubbing, on the surface of the substrate, multi-layer graphenes from a mass of multi-layer graphenes,
(14) a method for producing a substrate coated with multi-layer graphenes, comprising laminating, on surface of a substrate, multi-layer graphenes from a mass of multi-layer graphenes, and then pressing the surface of the substrate,
(15) the production method of above 14, wherein the lamination is carried out by spray-coating of the surface of the substrate with a dispersion of multi-layer graphenes, a liquid of pulverized multi-layer graphenes or a dispersion of residual graphenes, which are prepared from a mass of multi-layer graphenes,
(16) a method for producing a substrate coated with multi-layer graphenes, comprising laminating, on surface of a substrate, multi-layer graphenes from a mass of multi-layer graphenes, wherein the lamination is carried out by single-fluid spray-coating of the surface of the substrate with a dispersion of multi-layer graphenes, a liquid of pulverized multi-layer graphenes or a dispersion of residual graphenes, which are prepared from a mass of multi-layer graphenes,
(17) a substrate coated with multi-layer graphenes, in which the substrate is produced by laminating, on surface of a substrate, multi-layer graphenes from a mass of multi-layer graphenes.

Effect of the Invention

According to the production method of the present invention, by using a mass of multi-layer graphenes as a starting material, the multi-layer graphenes can be laminated directly on surface of a substrate by a simple method. Therefore, as compared with conventional methods, a substrate coated with multi-layer graphenes which is useful as a transparent conductive film, a conductive film and a heat-releasing sheet can be obtained easily and stably. Accordingly, the production method of the present invention makes it possible to provide an inexpensive transparent conductive film, conductive film and heat-releasing sheet efficiently.

EMBODIMENT FOR CARRYING OUT THE INVENTION

Figure 1:
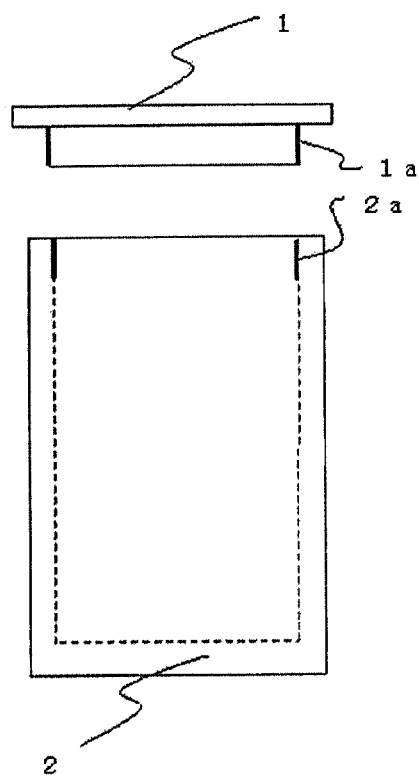
FIG. 1 is a cross-sectional view of a structure of a graphite crucible.

In the present invention, the mass of multi-layer graphenes is one resulting from aggregation of many multi-layer graphenes without being laminated to each other, and it does not matter whatever shape, embodiment and size the mass has. Examples thereof are (A) the cluster of multi-layer graphenes obtained by aggregation of multi-layer graphenes extending from the inside toward the outside (This mass can be in the form of isotropic graphite particle and in the form of bulk-like graphite structure. A size of the graphite particle is from about 1 μm to about 1000 μm, and a diameter or a width of multi-layer graphenes constituting the graphite particle is from about 0.1 μm to about 500 μm, and a thickness thereof is from about 0.34 nm to about 100 nm, preferably from about 0.34 nm to about 10 nm, more preferably from about 0.34 nm to about 3.5 nm. This mass is hereinafter referred to as "a cluster of multi-layer graphenes"); (B) the mass of multi-layer graphenes in the film-like form, in which each of multi-layer graphenes is in a state of being grown, in the direction of "a" axis of the graphite crystal, approximately vertically to a plane or a spherical surface, and such multi-layer graphenes cover the plane surface and the spherical surface to be in a film-like form (a diameter or a width of the multi-layer graphenes constituting the mass is from about 1 μm to about 500 μm, and a thickness thereof is from about 0.34 nm to about 100 nm, preferably from about 0.34 nm to about 10 nm, more preferably from about 0.34 nm to about 3.5 nm. This mass is hereinafter referred to simply as "a film-like mass of multi-layer graphenes"); (C) the fibrous mass of multi-layer graphenes, in which multi-layer graphenes are in a state of being grown from the center toward the outside of the fiber in the direction of "a" axis of the graphite crystal, and many of such multi-layer graphenes are connected to form a fibrous mass (This mass is in the fibrous foil having a diameter of from 1 to 500 μm and a length of from 0.01 to 30 mm. A diameter of the multi-layer graphenes constituting the mass of multi-layer graphenes is from 0.1 to 500 μm and a thickness thereof is from 1 to 100 nm. This mass is hereinafter referred to simply as "a fibrous mass of multi-layer graphenes"); (D) a cluster of multi-layer graphenes obtained by subjecting the multi-layer graphenes constituting the above (A) to partial cleaving (A thickness of the multi-layer graphenes is from about 0.34 nm to about 9 nm. This mass is hereinafter referred to simply as "a cluster of cloven multi-layer graphenes"); and the like.

The "multi-layer graphenes" constituting the mass of multi-layer graphenes can contain single-layer graphenes. Further, the "multi-layer graphenes" are those having the above-mentioned size and thickness, particularly are "multi-layer graphene pieces". Furthermore, other preferred examples of the "multi-layer graphenes" are several-layer graphenes (Few-layer graphene: Multi-layer graphenes up to about ten layers having a thickness of from about 0.34 nm to about 3.1 nm).

Among those masses of multi-layer graphenes, example of the method for producing (A) the cluster of multi-layer graphenes is a production method comprising preparing a powdery and/or particulate material of an organic compound pre-baked to an extent of containing remaining hydrogen, charging the powdery and/or particulate material in a closed vessel made of a heat resistant material, and subjecting the powdery and/or particulate material together with the vessel to hot isostatic pressing treatment using a compressed gas atmosphere, wherein a maximum ultimate temperature in the hot isostatic pressing treatment is 900° C. or more and lower than 2000° C. This production method is explained below.

The closed vessel made of heat-resistant material (for example, crucible made of graphite) functions as a reaction vessel for causing the CVD reaction with gases such as hydrogen, hydrocarbon, carbon monoxide and water generated from the pre-baked starting material during the HIP treatment. Since it is necessary to cause a chemical reaction without scattering the generated reaction gas outside the vessel while keeping isotropic high pressure by a gas pressure, the material of the vessel and the sealing structure thereof are properly selected. If the material is too dense, a difference in pressure between the inside and the outside of the vessel (for example, graphite crucible) arises, which results in an explosive breakdown of the vessel. On the other hand, if the material is too porous, the reaction gas generated inside the vessel is scattered outside the vessel (for example, graphite crucible) and efficiency of the chemical reaction is lowered.

The material and structure of the vessel (for example, graphite crucible) are properly selected in consideration of necessity of taking a HIP-treated product out of the vessel, sealing the vessel (for example, crucible) as easily as possible in view of facilitating charging of the starting material before the HIP treatment, exposure to high temperature of about 900° C. or more during the HIP treatment and maintaining strength of the vessel at high temperature so as to be capable of withstanding the inside pressure caused by generation of the reaction gas from the pre-baked starting material.

Examples of the heat resistant materials constituting the reaction vessel are graphite and in addition, ceramics such as alumina, magnesia and zirconia, and metals such as iron, nickel, zirconium and platinum. Graphite material is suitable as a material for the vessel (for example, crucible). The graphite vessel can be made using artificial graphite materials specifically prepared by extrusion molding, CIP molding, squeeze molding, vibration molding or rammer molding, hard carbon materials including glassy carbon prepared mainly by molding a thermosetting resin, carbon fiber-reinforced carbon materials or composite materials thereof. The porosity of the graphite material is important for efficiently causing the chemical reaction in the vessel (for example, crucible), and therefore, a material having an open pore ratio (apparent pore ratio) of less than 20% can be used suitably. In the case of a material having an open pore ratio of 20% or more, the reaction gases are diffused outside the vessel (for example, crucible), and therefore, a concentration of the gases necessary for generating the graphite cannot be kept. However, in the case where there is not so large difference between the volume of the vessel (for example, crucible) and the volume of a HIP-treating chamber where the vessel is charged, even if an open pore ratio of the vessel (for example, crucible) is 20% or more, an amount of gases scattering outside the vessel (for example, crucible) is not so large, and therefore, efficiency is not affected so much.

Figure 2:
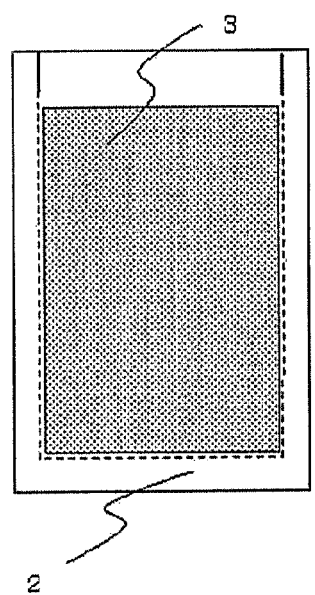
FIG. 2 is a cross-sectional view of a structure of a graphite crucible, in which a pre-baked starting material is charged.
Figure 3:
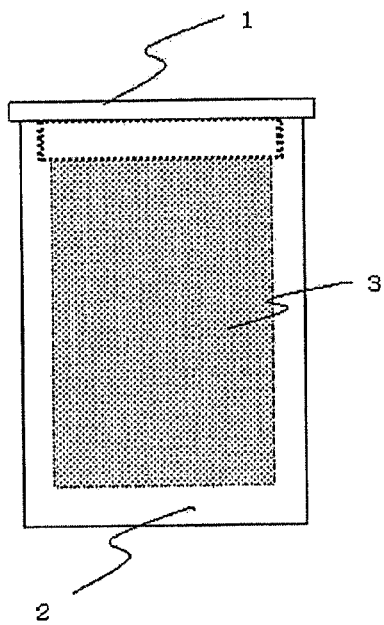
FIG. 3 is a cross-sectional view of a structure of a graphite crucible, in which a pre-baked starting material is charged and the crucible is sealed.

With respect to the vessel to be used in the present invention, a screw-capped graphite crucible can be used so that charging of the pre-baked starting material in the vessel and discharging of the product after the HIP treatment can be carried out efficiently. (FIGS. 1 to 3) The inner wall 2a at the top of the crucible body 2 and the outer circumference 1a of the crucible cap 1 have thread-cutting by specified tap processing, and thereby the crucible can be sealed by turning the cap 1 to the thread after charging of the pre-baked starting material 3.

Figure 4:
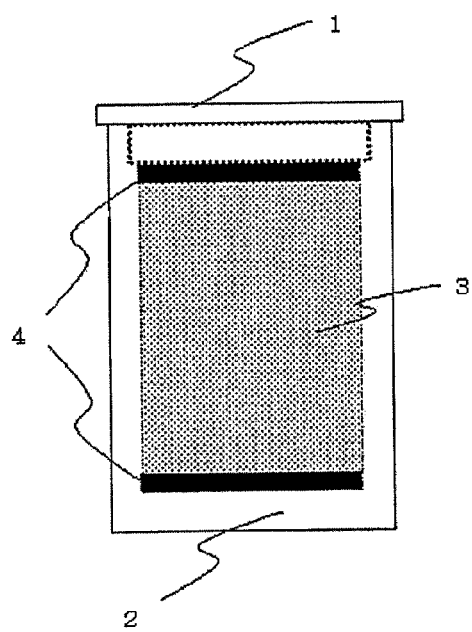
FIG. 4 is a cross-sectional view of a structure of a graphite crucible, in which all of the top and bottom of the pre-baked starting material 3 are covered with spacers and the crucible is sealed.

By carrying out hot isostatic pressing treatment by covering the whole (or a part) of the bottom and the top of the pre-baked starting material 3 with a spacer 4 made of a hard carbon material having a low open pore ratio in order to increase a degree of sealing of the pre-baked starting material, scattering of the reaction gases generated from the pre-baked starting material 3 from the top and the bottom of the crucible can be controlled. (FIG. 4)

Figure 5:
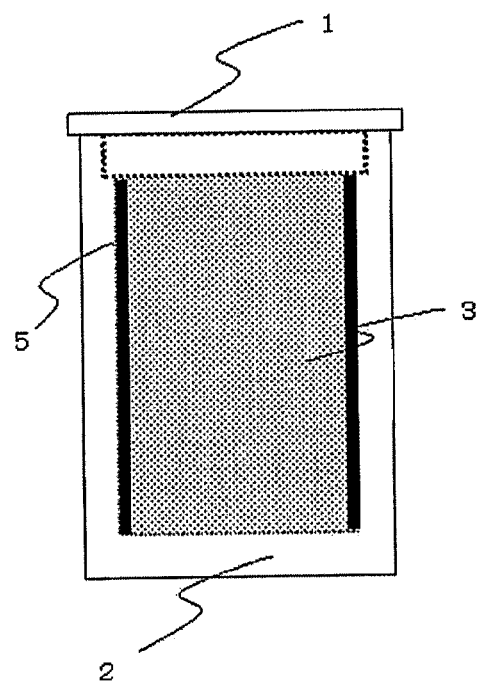
FIG. 5 is a cross-sectional view of a structure of a graphite crucible, in which all of the side of the pre-baked starting material 3 is covered with a sleeve and the crucible is sealed.
Figure 6:
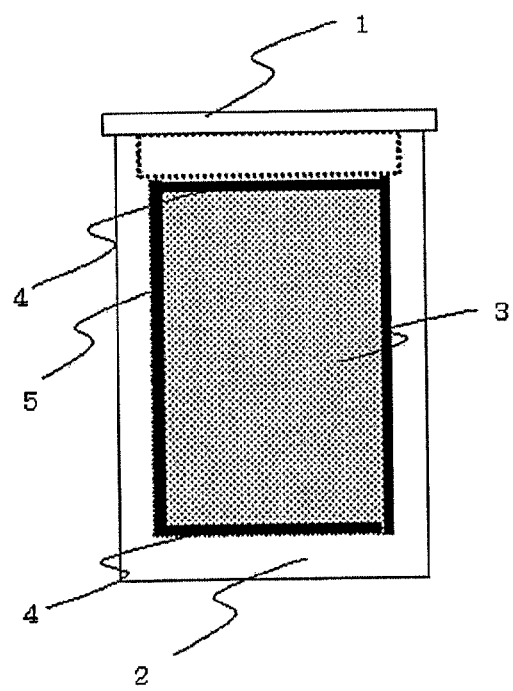
FIG. 6 is a cross-sectional view of a structure of a graphite crucible, in which all of the top, bottom and side of the pre-baked starting material 3 are covered with spacers and a sleeve and the crucible is sealed.

Further, a reaction efficiency can be increased by carrying out hot isostatic pressing treatment by covering the whole (or a part) of the side of the pre-baked starting material 3 with a sleeve 5 made of a hard carbon material having a low open pore ratio (FIG. 5) or by covering the whole (or a part) around the pre-baked starting material 3 with a spacer 4 and a sleeve 5 (FIG. 6). Examples of the carbon material for the spacer and the sleeve are glassy carbon, diamond-like carbon, amorphous carbon and the like, and one of them can be used alone, or two or more thereof can be used together. The open pore ratio of the carbon material is usually less than 0.5%. Even if the pre-baked starting material is covered with a spacer and a sleeve having an open pore ratio of 0%, there is a gap between the spacer and the sleeve. Therefore, the pre-baked starting material cannot be sealed completely with the spacer and the sleeve.

Examples of a screw of a screw-capped graphite crucible are a triangular screw (having a cross-section of screw thread in the form like equilateral triangle), a square screw, a trapezoid screw and the like, and among these, a triangular screw is preferred.

In the process for generating vapor-phase-grown graphite by HIP treatment using the pre-baked starting material containing remaining hydrogen, irrespective of kind of a starting material to be used, a degree of crystallinity and a true density of the generated graphite can be controlled by a pre-baking temperature, an amount of remaining hydrogen in the pre-baked starting material, a shape of the pre-baked starting material, a HIP treatment temperature and pressure, and temperature and pressure elevating rates.

With respect to an amount of remaining hydrogen, from the viewpoint of production of the target product of the present invention, there is no problem if the amount is enough for sufficiently generating gases such as hydrogen, hydrocarbon, carbon monoxide and water which are necessary for the CVD reaction at the time of HIP treatment. The amount is usually about 6500 ppm or more, preferably about 10000 ppm or more. The pre-baked starting material containing remaining hydrogen can be obtained by pre-baking a powdery and/or particulate material of an organic compound. In this case, usually the amount of the remaining hydrogen changes depending on the pre-baking temperature. Namely, as the pre-baking temperature increases, the amount of the remaining hydrogen decreases.

A pre-baking temperature is about 1000° C. or lower, preferably about 800° C. or lower.

Figure 29:
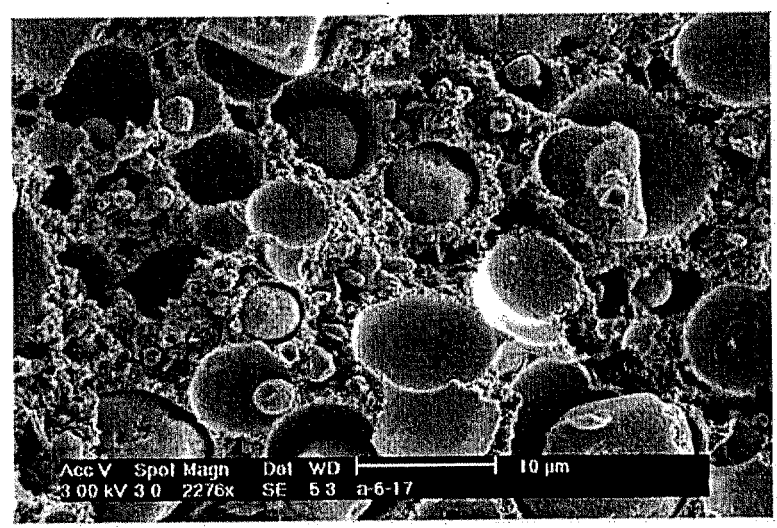
FIG. 29 is an SEM photograph showing a broken surface of the product of Production Example 3-6.

The thus obtained pre-baked starting material containing remaining hydrogen is subjected to HIP treatment under the proper conditions. The vapor-phase-grown graphite can be obtained at a HIP treatment temperature of about 900° C. or more, but at too high temperatures (for example, about 2000° C.), the target product is subject to damage by etching with the exciting hydrogen (FIG. 29). Therefore, in the present invention, it is necessary that the maximum ultimate temperature at the HIP treatment is about 900° C. or more and lower than about 2000° C. Further, from the viewpoint of efficient production of the target product of the present invention, the maximum ultimate temperature at the HIP treatment is within the range from about 1100° C. to about 1900° C., preferably from about 1200° C. to about 1800° C.

A suitable maximum ultimate pressure at the HIP treatment varies with a particle size of the pre-baked starting material, and the HIP treatment can be suitably carried out at a pressure usually within the range from about 1 MPa to about 300 MPa, preferably from about 10 MPa to about 200 MPa, preferably from about 30 MPa to about 200 MPa.

In the HIP treatment, it is desirable from the viewpoint of production efficiency that usually, the pressure is firstly elevated to a specified pressure before the temperature is elevated to approximately the pre-baking temperature (pressure-preceding pattern), so that the pre-baked starting material is not scattered, and then, the temperature is elevated to the pre-baking temperature and thereafter, the temperature and pressure are elevated to the maximum ultimate temperature and the maximum ultimate pressure, respectively, according to necessity. Example of the specified pressure is about 70 MPa. In the case of a particle size of as small as about 1 μm or less, the pressure-preceding pattern as mentioned above is not necessary particularly, and HIP treatment can be carried out efficiently.

The thus obtained cluster of multi-layer graphenes as a target product of the present invention has a high degree of crystallinity. In the present invention, the true density of the cluster of multi-layer graphenes is preferably 1.85 g/cm$^3$ or more, more preferably 2.0 g/cm$^3$ or more, further preferably 2.1 g/cm$^3$ or more, further preferably 2.2 g/cm$^3$ or more. In the case of a large particle size of the pre-baked starting material, as mentioned infra, a production rate of the cluster of multi-layer graphenes in the product decreases, and therefore, when the true density of the product after the HIP treatment is measured as it is, there may be a case where the true density is lower than the values mentioned above. However, as far as true density of generated cluster of multi-layer graphenes of any part is within the range mentioned above, the obtained product can be used suitably as the cluster of multi-layer graphenes of the present invention. Moreover, the total pore ratio of the cluster of multi-layer graphenes is preferably 40% or more, more preferably 50% or more. Among the above-mentioned cluster of multi-layer graphenes, those satisfying both of the true density and total pore ratio within the mentioned "preferred range" are preferred as compared with a cluster of multi-layer graphenes satisfying either of the true density or the total pore ratio within the mentioned "preferred range". Nonlimiting examples of such preferred cluster of multi-layer graphenes are those having a true density of 1.85 g/cm³ or more and a total pore ratio of 40% or more and those having a true density of 2.0 g/cm³ or more and a total pore ratio of 50% or more, and any other combinations can also be within the scope of the present invention.

Figure 7:
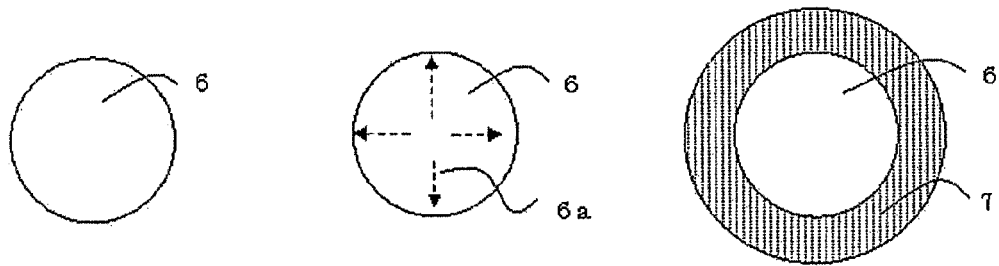
FIG. 7 is a schematic diagram (cross-sectional view) explaining a mechanism of generating graphenes on the surface of the pre-baked starting material.

A mechanism of generation of multi-layer graphenes from the pre-baked starting material is shown in FIG. 7. By carrying out HIP treatment of particles 6 of the starting material obtained by pre-baking an organic compound, gases 6a such as hydrogen, hydrocarbon, carbon monoxide and carbon dioxide are generated from the inside of the particles of the pre-baked starting material heated to a temperature higher than the pre-baking temperature. The gases 6a pass through the pores of the material and reach the surface of the particles 6 of the pre-baked starting material. During this process, the graphenes 7 are generated physically and chemically by excitation with a temperature and a pressure. The pre-baked starting material shrinks as the reaction gases are generated, and the graphenes 7 are generated inside and outside of the material.

Figure 8:
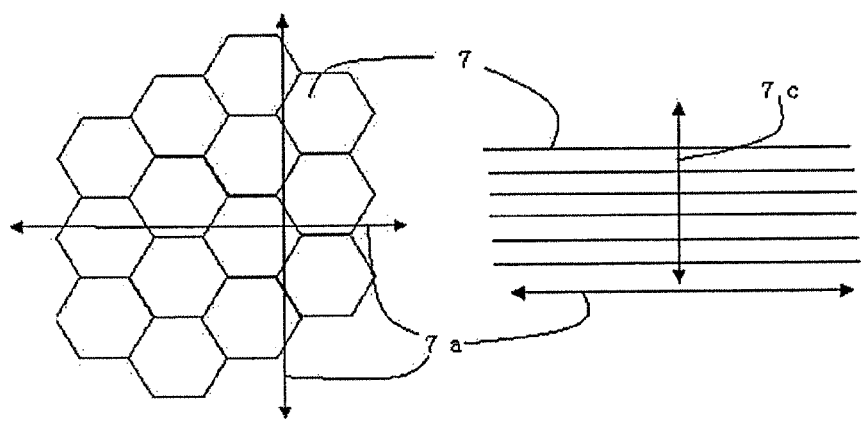
FIG. 8 shows a crystal orientation of carbon hexagonal planes in a crystal structure of graphite.
Figure 9:
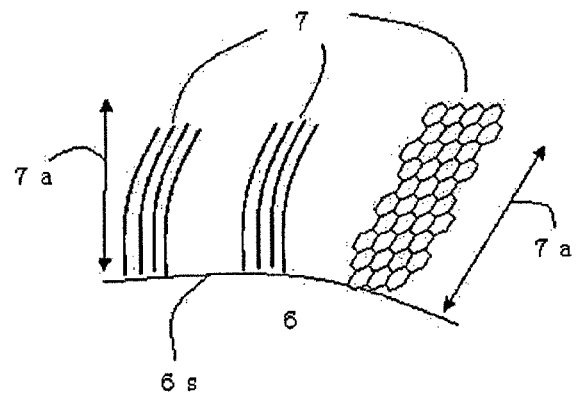
FIG. 9 is a schematic diagram explaining a mechanism of graphenes growing from the surface of the pre-baked starting material outward (approximately radially) in a direction of "a" axis of graphite crystals

In the HIP treatment, since a pressure is applied with gases such as argon and nitrogen in an isotropic manner, as shown in FIGS. 8 and 9, graphenes are grown approximately radially from the surface 6s of the particles 6 of the pre-heated starting material to an in-plane direction 7a of the graphenes 7 (in the direction of "a" axis of graphite crystal). Further, multi-layer graphenes are grown in such a manner that the graphenes 7 spread, while connecting carbons, in the direction of 7a from a starting point of graphene 7 formed at an initial stage of a reaction and at the same time, the graphenes 7 are laminated in the direction of 7c. In this case, it can be considered that since a high pressure compressed gas exhibits a shielding effect on the surface of graphene, thus inhibiting graphenes from adhering and jointing to each other to form into a multi-layer, the growth of graphenes is inhibited much in the direction of 7c and graphenes are grown much radically in the direction of 7a, thereby generating the cluster of multi-layer graphenes of the present invention.

Figure 10:
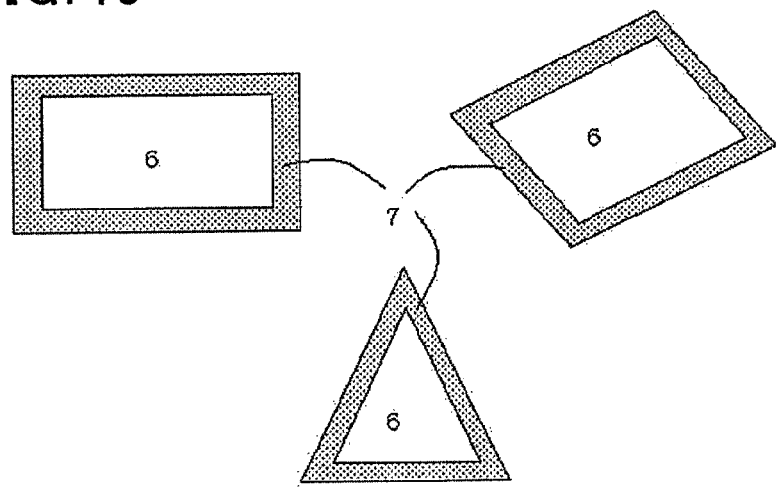
FIG. 10 is a schematic diagram (cross-sectional view) showing generation of graphenes around the pre-baked starting material in various forms of a powdery and/or particulate material.
Figure 11:
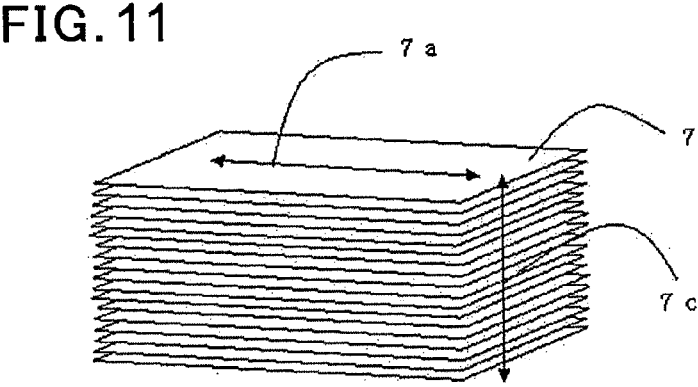
FIG. 11 is a schematic diagram showing a mechanism of anisotropic generation and growing of conventional graphite material.
Figure 12:
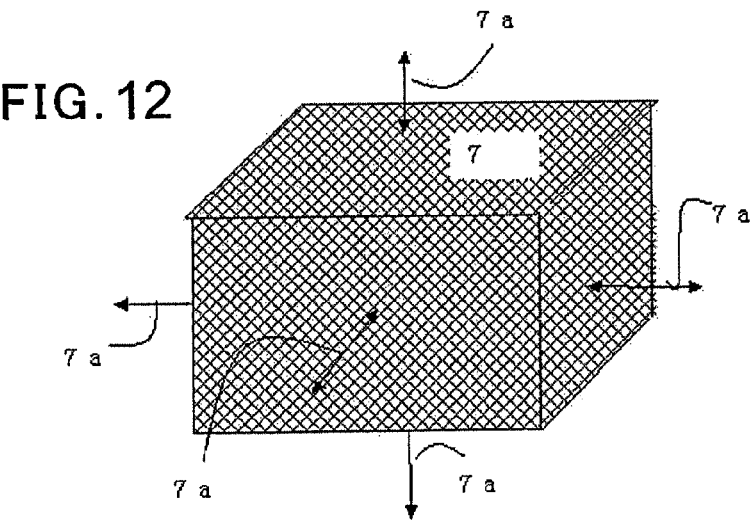
FIG. 12 is a schematic diagram showing a mechanism of isotropic growing of graphenes from the surface of the pre-baked starting material.

The pre-baked starting material to be subjected to HIP treatment can be a powdery and/or particulate material in various forms such as circle, ellipse, column, cylindrical column, fiber and block having an undefined shape (FIG. 10). In any shapes, multi-layer graphenes are grown such that graphenes 7 spread approximately radially from the surface 6s of the pre-baked starting material 6 in a direction 7a while connecting carbons and at the same time, the graphenes 7 are laminated in the direction of 7c. So far, only graphite materials, in which graphenes 7 are grown all together in one direction on the particle, for example, graphite materials having high anisotropy, which have orientation in the direction of 7a on the surface of the particle and orientation in the direction of 7c in the thickness of the particle, have been able to be produced (FIG. 11). However, according to the present invention, the graphenes 7 are grown toward the direction of 7a and the growth toward the direction of 7a extends approximately radially. As a result, a cluster of multi-layer graphenes composed of aggregates in such a state that multi-layer graphenes extend from the inside toward the outside can be obtained (FIG. 12). Moreover, such a cluster of multi-layer graphenes can be in the form of isotropic graphite particles or in the form of a bulky graphite structure comprising such isotropic graphite particles.

Figure 13:
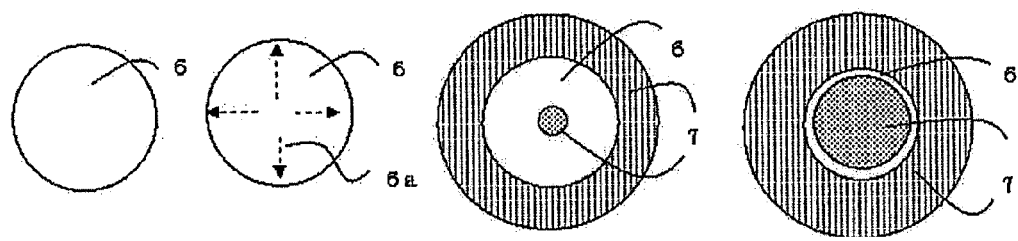
FIG. 13 is a schematic diagram (cross-sectional view) showing a mechanism of generation of graphenes on the outer surface and the inside of the pre-baked starting material being in a spherical form.

A degree of growth of the graphenes inside and outside of the pre-baked starting material 6 is determined by selection of a pre-baking temperature and an amount of remaining hydrogen of the pre-baked starting material, a structure of a graphite crucible and HIP treatment conditions. By selecting suitable conditions, the graphenes 7 can be generated on the outer surface and the inside of the pre-baked starting material 6 as shown in FIG. 13, a degree of crystallinity as a bulky cluster of graphenes can be increased, and a true density can be enhanced.

The mechanism of generation of the graphenes of the present invention is explained in more detail. The pre-baked starting material is subjected to isostatic application of pressure with a pressurized medium such as argon and nitrogen in the HIP treatment. Therefore, at the initial stage of the HIP treatment, a high pressure and high density phase is formed around the particles of the pre-baked starting material. When the HIP-treatment temperature is elevated more than the pre-baking temperature, generation of gases from the pre-baked starting material starts, but since a coefficient of diffusion of the gases into the pressurized medium having a high pressure and high density becomes small, reaction gas regions (hydrogen, hydrocarbon, carbon monoxide, and the like) of high concentration are formed around the pre-baked starting material. In the HIP-treatment, isotropic application of a pressure is carried out, and therefore, the reaction gas regions are formed uniformly on the outer surface of the particles in the form being analogous to the shape of the particles.

Figure 25:
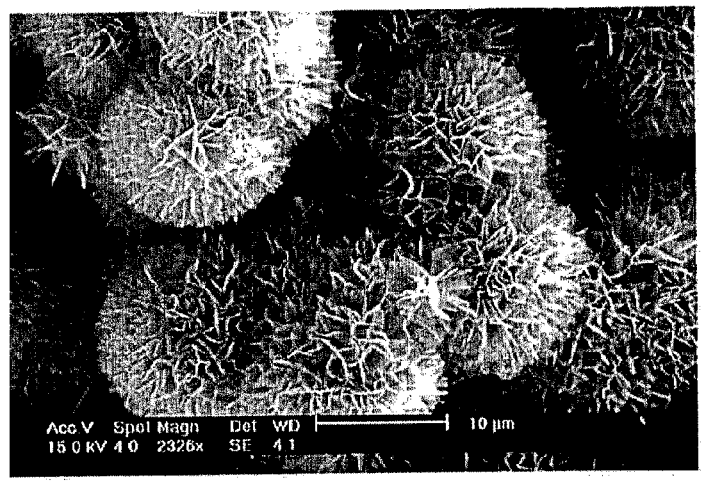
FIG. 25 is an electron micrograph showing a surface of the product of Production Example 3-1.
Figure 34:
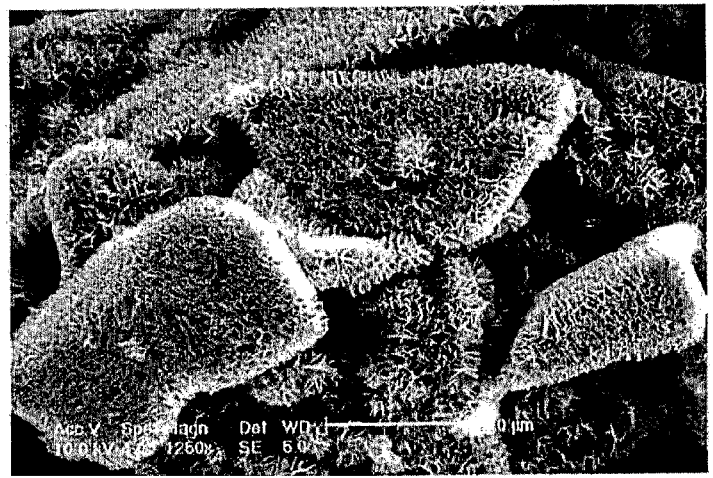
FIG. 34 is an SEM photograph showing a surface of the product of Production Example 5. A bar in this photograph represents 20 μm.

In these reaction gas regions, when the HIP-treatment temperature becomes further high, particularly about 900° C. or more, excitation occurs and so-called thermal CVD reaction occurs to precipitate graphenes. Generally CVD reaction is carried out by supplying a reaction gas to a surface of a substrate using a CVD apparatus, a plasma CVD apparatus, or the like. However, the reaction mechanism of the present invention is characterized by carrying out CVD reaction in a reaction gas region generated around the pre-baked starting material in the graphite crucible by using HIP equipment. Therefore, in the case of a spherical pre-baked starting material, graphenes are generated approximately radially from the surface of the spherical particle as shown in FIG. 25, and in the case of particles having irregular shapes, graphenes analogous to each other are generated from the surfaces of the particles as shown in FIG. 34.

The reason why there is an optimum temperature range for pre-baking the starting material is such that proper percentages of gas components such as hydrocarbon, hydrogen and carbon monoxide are necessary in order to generate graphenes efficiently in the CVD reaction. For example, in the case of a pre-baking temperature exceeding about 900° C., an amount of remaining hydrogen becomes small, which makes it difficult to precipitate graphenes efficiently. Moreover, the reason why there is an optimum range of HIP treatment temperature is such that it was found that when the HIP treatment temperature is lower than about 900° C., thermal excitation of the generated gas hardly occurs and CVD reaction hardly proceeds, and when the HIP treatment temperature exceeds about 2000° C., there is a large effect of etching of precipitated graphenes due to hydrogen.

Figure 14:
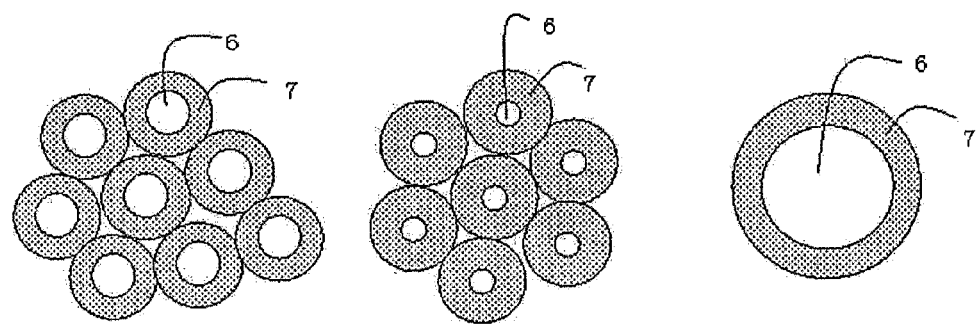
FIG. 14 is a schematic diagram (cross-sectional view) showing a mechanism of generation of graphenes and generation of a cluster of graphenes having a bulky form on the outer surface and the inside of the pre-baked starting material being in a spherical form.

With respect to a particle size of the pre-baked starting material to be used, since CVD reaction occurs mainly on the surface of the particles, if the particle size is large, a ratio of the surface area to the volume of the particle is small, and as a result, an amount of the graphenes in the obtained product is reduced. Therefore, when using a starting material having a smaller particle size, a ratio of generated graphenes 7 can be increased (FIG. 14). Accordingly, from the viewpoint of production efficiency, in the case of using a spherical resin, it is preferable that its particle size (average) is about 100 μm or less. Meanwhile, in the case of application where it is desired to grow graphenes only in the vicinity of surfaces of hard carbon material particles such as glassy carbon, a target product can be obtained easily by selecting particles having a particle size larger than 100 μm according to necessity.

In a conventional method for producing graphite materials, only those having high anisotropy in which carbon hexagonal planes are laminated in the form of film in parallel with a surface of a substrate could be produced. However, the present invention made it possible to grow graphenes, in which the number of graphenes laminated is controlled, efficiently in a three-dimensional space and as a result, to produce a cluster of multi-layer graphenes (including isotropic graphite particles and a bulky graphite structure) composed of aggregates in such a state that multi-layer graphemes extend from the inside toward the outside, in a very short period of time, So far, it has been difficult to synthesize graphenes directly in a large amount because graphenes are obtained by peeling from a graphite material or by forming on a metal substrate using a catalytic effect of metal. However, according to the present invention, a large amount of graphenes can be produced directly using general-purpose HIP equipment and usual organic materials.

Generally, an organic compound, as it is heated, becomes larger in molecular weight, and then, oxygen, nitrogen and hydrogen atoms in its structure become thermodynamically instable and released, and thereby, carbonization proceeds. Therefore, in most of organic compounds, such a reaction proceeds by heat-treating at a temperature of about 300° C. or more. In the case of about 400° C. or more, a pre-baked starting material comprising carbon and proper amounts of remaining hydrogen, oxygen and nitrogen is obtained. In the present invention, the thus pre-baked organic compound can be used as a pre-baked starting material.

Examples of usable organic compound are those mentioned below. There can be used, for example, natural organic polymers such as starch, cellulose, protein, collagen, alginic acid, dammar, kovar, rosin, gutta-percha and natural rubber; semisynthetic polymers such as cellulose resin, cellulose acetate, cellulose nitrate, cellulose acetate butyrate, casein plastic and soybean protein plastic; and synthetic polymers such as thermosetting reins such as phenol resin, urea resin, melamine resin, benzoguanamine resin, epoxy resin, diallyl phthalate resin, unsaturated polyester resin, bisphenol A type epoxy resin, Novolac type epoxy resin, polyfunctional epoxy resin, alicyclic epoxy resin, alkyd resin and urethane resin, thermoplastic resins such as polyester resins (polyethylene terephthalate (PET) resin, polytrimethylene terephthalate resin, polybutylene terephthalate resin, polyethylene naphthalate resin, polybutylene naphthalate resin and the like), vinyl chloride resin, polyethylene, polypropylene and polystyrene, synthetic rubbers such as polyisoprene and butadiene, synthetic fibers such as nylon, vinylon, acrylic fiber and rayon, and other materials such as polyvinyl acetate, ABS resin, AS resin, acrylic resin, polyacetal, polyimide, polycarbonate, modified polyphenylene ether (PPE), polyarylate, polysulfone, polyphenylene sulfide, polyether ether ketone, fluorine-containing resin, polyamide imide, and silicon resin.

It is a matter of course that petroleum pitch, coal pitch, petroleum coke, coal coke, carbon black and active carbon which are generated when fossil fuels such as petroleum and coal, for example, being refined can be used as a starting material. In addition, toward the establishment of resources-recycling society, introduction of carbonization system has been advanced from the viewpoint of effective utilization of carbon in wastes, and waste plastics and waste PET bottles which are mixtures of the above-mentioned various resins, waste wood, waste plants and food wastes such as garbage can also be used as an organic compound being a starting material.

These hydrocarbon starting materials are pre-baked at a pre-baking temperature at a specified temperature elevating rate in an inert atmosphere such as in a nitrogen gas stream by burning with oxygen without releasing carbon dioxide and carbon monoxide. For the pre-baking, an electric heating or gas heating type externally heating batch oven, continuous multi-tubular oven, internal heating rotary kiln, oscillating kiln or the like is used.

The above-mentioned film-like mass of multi-layer graphenes of (B) can be produced by growing multi-layer graphenes on a surface of a substrate made, for example, of glassy carbon, diamond-like carbon, amorphous carbon, graphite, copper, nickel, iron, cobalt, other heat resistant metal, ceramic, SiC, GaN, Si or other semiconductor in the production method of (A) the above-mentioned cluster of multi-layer graphenes. In this case, the substrate can be in various forms such as circle, column, pyramid, cone and an undefined shape in addition to a flat sheet such as a spacer, and a surface of the substrate may be subjected to rough polishing or mirror polishing. The productivity and shape of the obtained film-like mass of multi-layer graphenes can be controlled by changing a shape and surface conditions of the substrate.

The above-mentioned fibrous mass of multi-layer graphenes of (C) is one simultaneously generated in the above-mentioned production method of the cluster of multi-layer graphenes of (A).

The above-mentioned cluster of cloven multi-layer graphenes of (D) can be produced via a graphite intercalation compound (compound in which sulfate ion, organic complex of alkali metal, and the like are intercalating between the graphite layers) produced using the above-mentioned cluster of multi-layer graphenes of (A) as a host material. Namely, by intercalation of ion, and the like between the graphite layers, an interval between the layers of the multi-layer graphenes forming the cluster of multi-layer graphenes is increased, and thereby, a stress arises at various portions of the cluster of multi-layer graphenes. Further, by subjecting the graphite intercalation compound to rapid heating, a volume of multi-layer graphenes expands rapidly in the direction of "c" axis of the multi-layer graphenes. Through these processes, a thinner graphene, which results from effective cleaving of multi-layer graphenes, can be produced.

A graphene layer can hold either of electron or hole as a carrier, and therefore, it can form any of intercalation compounds of electron-accepting acceptor type and electron-donating donor type. Many of such intercalation compounds have been researched and developed so far in a graphite having many laminated graphene layers and are known as graphite intercalation compounds (Michio Inagaki, Carbon 1989 (No. 139) 207-213). A graphite intercalation compound using a cluster of multi-layer graphenes as a host material can be prepared by a usual process, for example, by adding the cluster of multi-layer graphenes into a mixed solution of concentrated sulfuric acid and concentrated nitric acid, a tetrahydrofuran solution of alkali metal and condensation polycyclic hydrocarbon, or the like and then stirring the mixture. A method for rapid heating of the thus obtained graphite intercalation compound is not limited particularly, and for example, there is exemplified a method for charging an intercalation compound in a magnetic crucible made of ceramic or the like and charging the crucible in a heated electric oven. In this case, the temperature of the electric oven is preferably within a range from 600° to 1000° C. Through such a process, the thickness of the multi-layer graphenes will be from about 0.34 nm to about 9 nm. The cluster of cloven multi-layer graphenes is composed of single-layer graphene and multi-layer graphene which are thinner than the multi-layer graphenes constituting the initial "cluster of multi-layer graphenes", and therefore, is more preferable for producing a transparent conductive film having light transmission and electric conductivity.

With respect to the thus obtained masses of multi-layer graphenes (B) to (D) mentioned above, preferred ranges of the true density and total pore ratio thereof are the same as those explained in the cluster of multi-layer graphenes of (A).

It is described the method for laminating, on surface of a substrate, multi-layer graphenes from the thus obtained mass of multi-layer graphenes, wherein said multi-layer graphens constitute the mass of multi-layer graphenes.

The substrate is not limited particularly as far as it is one made of a material being usable for laminating multi-layer graphenes thereon, in other words, as far as it is one made of a material on which multi-layer graphenes can be bonded to its surface by Van der Waals force. Preferred examples thereof are a resin film having π-electron bond of benzene nucleus, double bond or the like in its molecular structure, a metal foil, a metal sheet, a metal film, paper, a glassy carbon substrate, a sapphire substrate and the like. It can be considered that a resin film having π-electron bond forms a stronger Van der Waals bond between the graphenes due to overlapping with a π-electron orbit of the graphene. Examples of such a resin having π-electron bond are polyester resin (for example, PET resin, polytrimethylene terephthalate resin, polybutylene terephthalate resin, polyethylene naphthalate resin, polybutylene naphthalate resin, and the like), acrylic resin, polystyrene resin, polycarbonate resin, polypropylene resin, polyethylene resin, polyvinyl chloride resin, polytetrafluoroethylene resin Teflon (registered trade mark) resin) and the like. Among these resins, PET resin, polystyrene resin and polycarbonate resin are preferable, and PET resin having high mechanical strength is most preferable. These resins can be formed into a film to be used as a substrate, and in addition, one or a mixture of two or more thereof can be coated on surface of a glass sheet to form a glass sheet coated with these resins, and the coated glass sheet can be used as a substrate. Examples of metal forming a metal foil, a metal sheet or a metal film are copper, nickel, iron, aluminum, titanium and the like, and among these, copper is preferable. Paper is a kind of a non-woven fabric made of vegetable fiber (mainly cellulose), and examples thereof are a free sheet, a coated paper, a Kent paper, a glossy paper, a simili paper, an impregnated (kraft) paper, and the like.

With respect to "a substrate made of a material being usable for laminating multi-layer graphenes thereon", there can be exemplified a non-woven fabric made of a resin fiber. Preferred more as a resin is one having π-electron bond. Examples of "a resin having in-electron bond" are aromatic polyamide resin, aromatic polyimide resin, polyester resin and the like.

The lamination of multi-layer graphenes on surface of a substrate is carried out via Van der Waals bond, and therefore, any means can be suitably used as far as it is means being capable of bringing multi-layer graphenes into contact with a surface of a substrate and forming Van der Waals bond.

There is exemplified, for example, means for rubbing the surface of the substrate with the mass of multi-layer graphenes. For the rubbing, any rubbing method may be employed as far as the mass of multi-layer graphenes is brought into contact uniformly with the surface of a substrate. Though the rubbing depends on sizes of a substrate and a mass of multi-layer graphenes, when rubbing with a mass of multi-layer graphenes having a size as large as it can be held with fingers on a substrate of 30 mm square, the rubbing may be carried out in four directions, vertically, horizontally, and diagonally to the upper right and the upper left. When rubbing the substrate from its one end to another end once in each direction, the number of rubbing cycles is assumed to be one, and the rubbing may be carried out plural times (for example, 2 to 10 times, preferably 3 to 8 times, more preferably 4 to 6 times).

Figure 53:
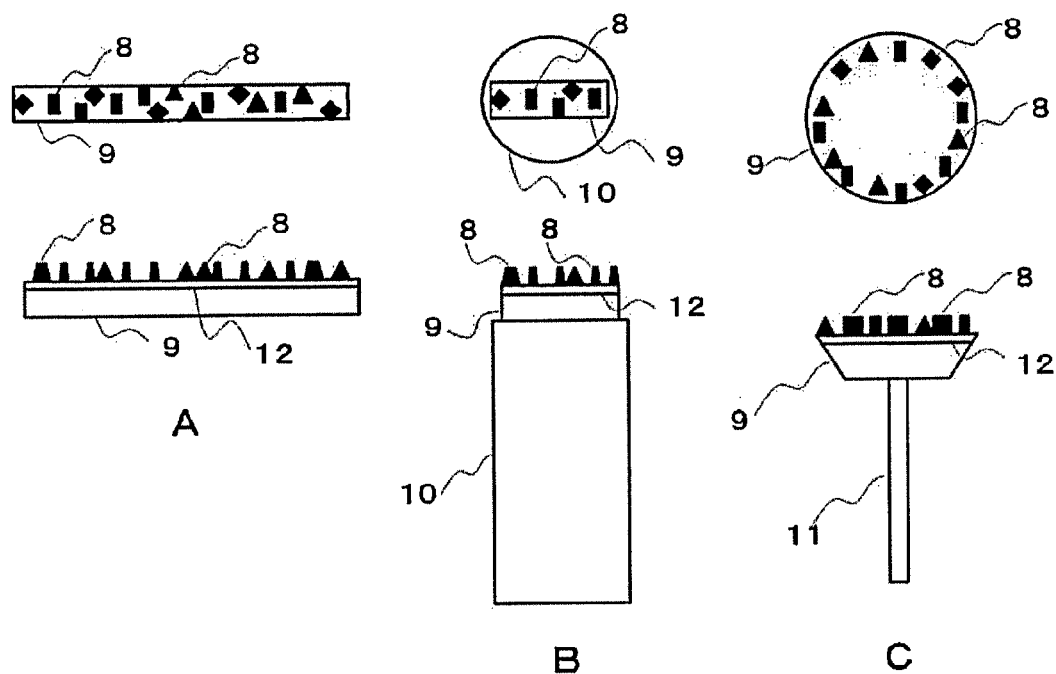
FIG. 53 is a diagrammatic view of a graphene-coating tool holding a mass of multi-layer graphenes.
Figure 54:
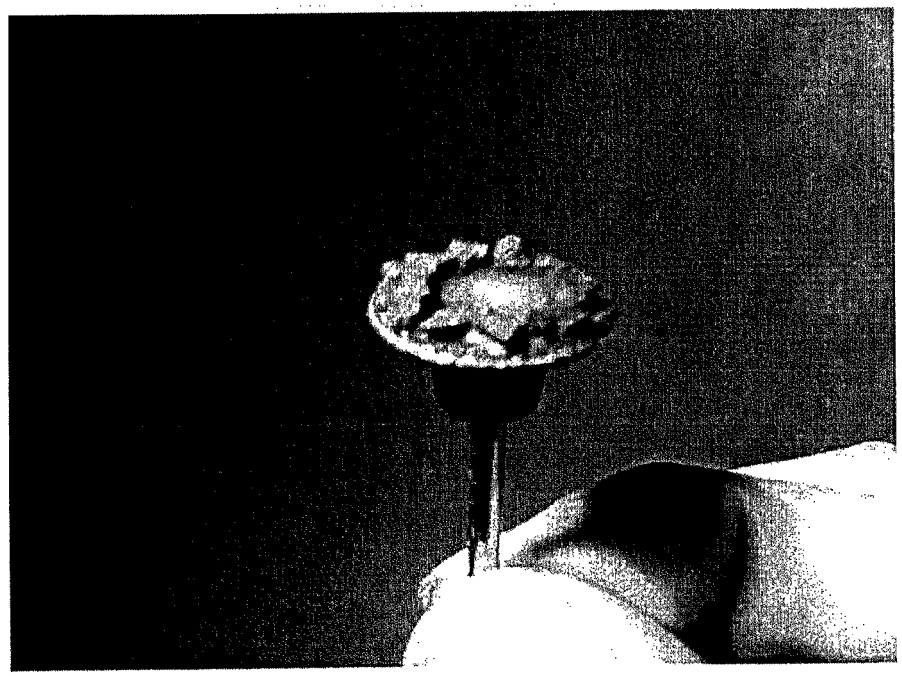
FIG. 54 is a photograph showing an appearance of the graphene-coating tool used in Example 9.

In order to coat multi-layer graphenes on surface of a substrate with high productivity, it is effective to use a graphene coating tool. Here, the "graphene coating tool" is a tool for coating multi-layer graphenes on surface of a substrate, and the tool has its surface to be brought into contact with the surface of the substrate and holds a mass of multi-layer graphenes on its surface. Here, the "surface of the tool" means the surface of the tool holding the mass of multi-layer graphenes thereon and having a function of rubbing the mass of multi-layer graphenes on surface of a substrate to be processed by bringing the surface of the tool into contact with the surface of a substrate to be processed. The surface of the tool may be in any of shapes as far as the above-mentioned function is fulfilled. For example, it may be in the form of plane or in the gently curved form. Further, "holding" means a state of a certain substance being retained at a certain position, and holding means is not questioned. Therefore, this stands for a concept also including a state of a mass of multi-layer graphenes being adhered to the surface of the tool using an adhesive or the like. While various kinds of tools can be considered as the graphene coating tool, FIG. 53 shows its example in a schematic diagram, and FIG. 54 is a photograph showing an appearance of a rotary tool prepared in Example 9. In the tools shown in FIG. 53, a mass 8 of multi-layer graphenes is adhered to a surface of a pedestal 9 (a surface of the tool) via an epoxy resin adhesive layer 12. "A" of FIG. 53 shows a type such that a tool is mounted on a given machinery with bolts and nuts. In "B" of FIG. 53, the pedestal 9 is jointed to a gripper 10 so as to enable the rubbing to be conducted by hand. The rubbing is carried out while holding the gripper 10 by hand. In "C" of FIG. 53, the mass 8 of multi-layer graphenes is adhered to the surface of the pedestal 9 with the adhesive layer 12, and the pedestal 9 is further jointed to a rotary shaft 11, through which the tool can be, therefore, mounted on a rotary processing machine such as a reamer, a drill or a machining center. Accordingly, the mass 8 of multi-layer graphenes can be rubbed on a substrate material with rotating the tool. A material of the tool is not limited particularly as far as its shape is maintained, and any material may be used. Example of such material is a hard material such as stainless steel.

In order to conduct the coating of multi-layer graphenes on surface of a substrate with higher productivity, it is effective to rub the mass of multi-layer graphenes, using the graphene coating tool, on a substrate material which is made of a material having high hardness and is fed continuously by roll-to-roll process and is moved at a given speed in a certain direction. The rubbing can be carried out by pressing a stationary tool or a rotating or vibrated tool on a substrate such as a resin film being moved at high speed. The tool can be fixed at a desired position and coating can be conducted without interruption on a substrate material being fed continuously.

Example of another means for lamination is one for bringing a surface of a substrate into contact with a dispersion of multi-layer graphenes prepared from the mass of multi-layer graphenes and then removing the solvent from the surface of a substrate.

<Dispersion of Multi-Layer Graphenes>

Preparation of the dispersion of multi-layer graphenes from the mass of multi-layer graphenes can be made, for example, by pulverizing the mass of multi-layer graphenes previously, pouring the obtained powder into a solvent, applying ultrasonic wave to the solvent, conducting centrifugal separation and then collecting an obtained supernatant. Or, the preparation can be carried out by pouring the mass of multi-layer graphenes into a solvent, pulverizing the mass, conducting centrifugal separation and then collecting an obtained supernatant.

Here, since a compressed gas is attached to the surface of the mass of multi-layer graphenes, the mass of multi-layer graphenes or a powder obtained by pulverization thereof may, according to necessity, be heat-treated (for example, at a temperature of 100° C.) to remove the compressed gas and then subjected to the following steps.

The method for pulverizing before pouring into a solvent is not limited particularly as far as the multi-layer graphenes can be separated from the mass of multi-layer graphenes. The pulverization can be carried out, for example, by physically breaking into thin pieces with a dry or wet mechanical pulverizer, a mixer, a blender, a ball mill, a vibration mill, an ultrasonic wave mill, a homogenizer, an ultrasonic wave homogenizer, an ultrasonic wave pulverizer or a mortar.

The method for pulverizing after pouring into a solvent is not limited particularly as far as the method can separate the multi-layer graphenes from the mass of multi-layer graphenes in the solvent. The pulverization can be carried out, for example, by physically breaking the mass of multi-layer graphenes in the solvent into thin pieces with a rotary mixer or the like.

Examples of the solvent are carbonic acid esters such as 1,2-dichloroethane, benzene, thionyl chloride, acetyl chloride, tetrachloroethylene carbonate, dichloroethylene carbonate, benzoyl fluoride, benzoyl chloride, nitromethane, nitrobenzene, acetic anhydride, phosphorus oxychloride, benzonitrile, selenium oxychloride, acetonitrile, tetramethylsulfone, dioxane, 1,2-propanediol carbonate, benzyl cyanide, ethylene sulfite, isobutyronitrile, propionitrile, dimethyl carbonate, propylene carbonate, ethyl methyl carbonate, diethyl carbonate and ethylene carbonate; polyhydric alcohols such as phenyl phosphorous acid difluoride, methyl acetate, n-butyronitrile, acetone, ethyl acetate, water, phenyl phosphoric acid dichloride, diethyl ether, tetrahydrofuran, diphenyl phosphoric acid chloride, trimethyl phosphate, tributyl phosphate, dimethylformamide, N-methylpyrrolidine, n-dimethylacetamide, dimethyl sulfoxide, N-diethylformamide, N-diethylacetamide, pyridine, hexamethylphosphoric amide, hexane, carbon tetrachloride, diglyme, trichloromethane, 2-propanol, methanol, ethanol, propanol, ethylene glycol; methyl ethyl ketone, 2-methoxyethanol, dimethylacetamide, toluene, polybenzimidazole, and the like. These solvents can be used alone or can be used in a mixture of at least two thereof.

In addition, a dispersant can be added to these solvents in order to increase an amount of dispersed graphene or to prevent agglomeration of the graphenes in a solvent. Examples of a dispersant are surfactants and in addition, those having a week binding force to graphene and an electric attracting force such as a Coulomb's force and having a hydrophilic functional group such as hydroxyl and carboxyl in a structure thereof. Examples of the latter dispersants are monomers and polymers of phenols such as phenol and naphthol having hydroxyl bonded to a benzene nucleus, monomers and polymers of styrene, propylene, acrylonitrile, vinyl acetate and the like having carbon double bond, proteins such as collagen, keratin, actin, myosin, casein, albumin, GFP and RFP, amino acids such as glycine, tyrosine, threonine and glutamine, and the like.

Examples of usable surfactants are: anion based surfactants (anionic surfactants) such as fatty acid salts (for example, sodium dodecanoate), cholic acid salts (for example, sodium cholate), monoalkyl sulfates (for example, sodium lauryl sulfate), alkyl polyoxyethylene sulfate, alkyl benzene sulfonates (for example, sodium dodecyl benzene sulfonate) and monoalkyl phosphate; cation based surfactants (cationic surfactants) such as alkyl trimethyl ammonium salts (for example, cetyl trimethyl ammonium bromide), dialkyl dimethyl ammonium salts (for example, didecyl dimethyl ammonium chloride) and alkyl benzyl dimethyl ammonium salts (for example, alkyl benzyl dimethyl ammonium chloride); amphoteric surfactants (Gemini surfactants) such as alkyl dimethyl amine oxide and alkyl carboxybetaine; and non-ionic surfactants (nonionic surfactants) such as polyoxyethylene alkyl ether (for example, polyoxyethylene dodecyl ether), fatty acid sorbitan ester, alkyl polyglucoside, fatty acid diethanol amide and alkyl monoglyceryl ether. Among these, monoalkyl sulfates are preferred more.

Among the above-mentioned solvents, preferred are dimethylformamide, water to which a dispersant (preferably a surfactant) is added, 2-methoxyethanol and the like.

An amount of a dispersant is within a range from 0.001 to 10 wt %, preferably from 0.02 to 5 wt % based on the weight of a solvent. The amount is not always limited to the above-mentioned range in the case where a cleaning step is conducted after forming a coating film such as a transparent conductive film or a conductive film.

An amount of the mass of multi-layer graphenes is within a range from 0.001 to 50 wt %, preferably from 0.01 to 10 wt % based on the weight of a solvent.

A means for ultrasonic wave treatment is not particularly limited, and it can be carried out by using, for example, an ultrasonic cleaner. It is preferable that a frequency of an ultrasonic wave to be applied is within a range from about 20 kHz to about 100 kHz. A period of time for the treatment is preferably from about 1 minute to about 60 minutes.

It is preferable that centrifugation is carried out at an acceleration rate within a range from about 100 G to about 100000 G, preferably from about 100 G to about 10000 G, for about 1 minute to about 60 minutes, preferably for about 5 minutes to about 30 minutes.

In the supernatant obtained in the manner mentioned above after the centrifugation is dispersed the mass of multi-layer graphenes. To this dispersion can be added additives (for example, a viscosity improver, a dispersant, a diluent, and the like) which are usually used in this field, if desired so.

In the case of producing a substrate coated with multi-layer graphenes requiring no light transmitting property like electrode materials for lithium ion batteries and heat-releasing sheets, it is effective to laminate graphenes thick on surface of a substrate or to laminate multi-layer graphenes on concave portions of surface of a substrate such as a porous non-woven fabric. In such a case, it is effective to use a liquid of pulverized multi-layer graphenes or a dispersion of residual graphenes, which contains the multi-layer graphenes at higher concentration.

<Liquid of Pulverized Multi-Layer Graphenes>

The liquid of pulverized multi-layer graphenes can be prepared by pulverizing the mass of multi-layer graphenes previously and then pouring the obtained powder into a solvent, or by pouring the mass of multi-layer graphenes into a solvent and then pulverizing the mass. Preparation conditions such as a solvent and a dispersant to be used, pulverizing means and an amount of multi-layer graphenes to be poured are the same as mentioned with respect to the dispersion of multi-layer graphenes.

<Dispersion of Residual Graphenes>

The dispersion of residual graphenes can be prepared by adding the above-mentioned solvent and, if necessary, a dispersant and the like, to a residual after the centrifugal separation (one remaining after removing a supernatant after the centrifugal separation), which is obtained when preparing the dispersion of multi-layer graphenes. It is preferable that the concentration of the residual graphenes in the dispersion of residual graphenes is from 1 wt % to 90 wt %.

For bringing the dispersion of multi-layer graphenes, the liquid of pulverized multi-layer graphenes and the dispersion of residual graphenes (hereinafter collectively referred to as "the dispersion of multi-layer graphenes, etc.") into contact with a surface of a substrate, any methods may be employed as far as the purpose of contact can be achieved. Examples of the method which can be suitably used are those using the existing techniques such as usual coating methods such as dip coating, spin coating, die coating and spray coating, and in addition, ink jet printing, printing using a dispenser, flexographic printing (letterpress printing), offset printing (planographic printing), gravure printing (intaglio printing), screen printing, electrophotography, heat transfer, laser transfer, slit coating, bar coating, blade coating, melt extrusion molding method in combination of a resin and an additive, inflation method, T die method, flat die method, solvent casting method, calendaring method, stretching method, multilayer processing method, co-extrusion method, co-extrusion by inflation method, multi-manifold method, laminating method, extrusion-laminating method, laminating method using an adhesive, wet laminating method, dry laminating method, hot-melt laminating method, heat-seal method, external heating method, internal heating method, ion plating, and sputtering. Further, for removing the solvent from the surface of the substrate, any methods may be employed as far as the purpose of removal can be achieved. The removal can be usually carried out by drying, using a usual method, the surface of the substrate brought into contact with the dispersion of multi-layer graphenes, etc. The drying may be carried out by heating and/or air blowing or air drying.

For example, by dip coating of the surface of the substrate with the dispersion of multi-layer graphenes, etc., the surface of the substrate can be brought into contact with the dispersion of multi-layer graphenes, etc., and the solvent can be removed from the surface of the substrate. The conditions for the dip coating vary depending on kinds of a solvent and a substrate to be used, an amount of the mass of multi-layer graphenes to be poured into a solvent, etc. For example, the temperature of the dispersion is preferably 40° C. or more, more preferably 50° C. or more, further preferably 60° C. or more, in order to smoothly remove (dry) the solvent from the surface of the substrate. The speed for lifting up the substrate is preferably from 1000 to 1 μm/sec, for example, when forming a film by one dip in one solution tank. However, when carrying out film formation plural times using many solution tanks, the speed is not limited to the above-mentioned range, and film formation at higher speed can be made.

In the thus obtained substrate coated with multi-layer graphenes, the thickness of the coated layer thereof is from about 0.5 nm to about 300 nm, preferably from about 2 nm to about 100 nm, and the substrate is useful as a transparent conductive film or a transparent electrode. Further, in an application requiring no light transmitting property like a conductive film for a lithium ion battery, a thick coated layer having a thickness as thick as from about 1 μm to about 10 μm is useful for such a required property.

Other method for bringing the dispersion of graphenes into contact with the surface of the substrate and removing the solvent from the surface of the substrate is a spray coating method (including wet blast, etc.) for spraying a dispersion of graphenes together with a high pressure gas onto the surface of the substrate. In this method, a compressed gas such as air, nitrogen or argon compressed to 0.1 to 10 MPa with a compressor is used, and a high pressure gas/liquid mixture from a gas/liquid mixer such as a spray gun or an air gun is sprayed onto the surface of a substrate. In this case, when the dispersion of graphenes comes into contact with the surface of the substrate, graphenes easily comes into contact with the surface of the substrate and are easily adhered thereto, and the gas is easily dried and evaporated due to air stream. Further, according to necessity, when a liquid and gas maintained at high temperature are used and/or when the surface of the substrate is heated, graphenes can be coated efficiently on the surface of the substrate. In the case of mass production of a transparent conductive film, a conductive film or an electrode sheet, film formation can be carried out with high productivity by feeding the substrate by roll-to-roll process and spraying a high pressure gas and a dispersion of graphenes onto the surface of the substrate at high speed.

In the case of electrode materials for lithium ion batteries and heat-releasing sheets requiring no light transmitting property, it is useful to form a thick graphene layer by laminating multi-layer graphenes thick (this can be said to be a thin graphite layer) or to laminate or fill multi-layer graphenes inside a resin substrate such as a porous non-woven fabric. In these cases, it is effective to use, as a liquid for spray coating, the liquid of pulverized multi-layer graphenes or the dispersion of residual graphenes, which comprise multi-layer graphenes at higher concentration.

In the case of a transparent conductive film for a touch panel requiring high light transmitting property, it is effective to laminate graphemes of a small number of layers thin on the surface of the substrate. In such a case, when employing usual spray coating (two-fluid spray-coating using two fluids, i.e. liquid and gas), there is a case where thin graphenes are easily scattered due to a velocity of compressed gas, resulting in high possibility that the graphenes cannot reach the surface of the substrate. To prevent this, it is effective to use a dispersion of multi-layer graphenes or a dispersion of multi-layer graphenes comprising thinner graphenes which is obtained from the supernatant after carrying out further centrifugal separation sufficiently, and also to use a single-fluid type spray coating such as a dispenser or an ink jet, in which only a slight amount of a dispersion in the form of droplet is ejected from a tip of a nozzle in order to increase a rate of multi-layer graphenes reaching the surface of the substrate. It is preferable that an inner diameter of the nozzle to be used is from about 1 μm to about 1000 μm.

In the substrate coated with multi-layer graphenes of the present invention, it is preferable that the surface of the substrate is laminated with multi-layer graphenes as mentioned above, and then is further subjected to pressing. This is rather preferred in a transparent conductive film application, etc., where thin lamination of multi-layer graphenes of a small number of layers is required. The thickness of the graphene of the present invention is about 1 nm in the case of a small number of layers, while on the surface of the substrate (for example, a PET film), there is a deviation in surface roughness and thickness at a level of from 100 to 1000 nm. Therefore, for example, when carrying out the lamination by bringing the dispersion of graphenes into contact with the surface of the substrate and then removing the solvent, there is a case where it is difficult to bring the surface of graphene into close contact uniformly completely with the surface of the substrate. In such a case, it can be considered that it is effective to get the surface of graphene close to the surface of the substrate by applying a pressure by pressing to an interface between the multi-layer graphene and the substrate, in order to enhance orientation of the multi-layer graphene and in addition, to increase adhesion of the multi-layer graphene to the substrate. Also, in this case, by pressing under heating, a resin, for example, in the case of a resin substrate is easily deformed due to heating, thereby enabling the surface of the multi-layer graphene to come into closer contact with the surface of the substrate. Further, it is possible to bring the surface of multi-layer graphene into close contact more uniformly completely with the surface of the substrate by precisely polishing surface of parts to be used for pressing to improve surface roughness, a degree of parallelization and flatness thereof because the resin substrate or the like follows to fit to the surface of the parts by deformation. Moreover, it is effective to previously subject the surface of the substrate to be coated to cleaning or surface treating by corona treatment, plasma treatment or the like, thereby increasing adhesion between the multi-layer graphene and the substrate.

For pressing, any of known methods such as cold rolling and hot rolling can be adopted. From the viewpoint of increasing productivity, it is effective to use equipment for mass production such as roll press and hot press. Especially, it is effective to carry out hot press after roll press (hot roll press) under heating. The heating temperature in the roll press depends on a material of a substrate to be used, and is preferably from about 70° C. to about 300° C. The press load is preferably from about 1 N to about 100000 N, and the feeding speed is preferably from about 0.1 cm/sec to about 10 cm/sec. In the hot press, the heating temperature is preferably from about 70° C. to about 300° C., the press load is preferably from about 1 N to about 5000000 N, and the pressing time is preferably from about 10 sec to about 10 min.

The multi-layer graphene has a smaller number of laminated graphene layers and a larger Van der Waals force as compared with conventional graphite. Therefore, by making use of this Van der Waals force (adhesive force), multi-layer graphenes are laminated and filled in an optional shape, and as a result, a graphite structure having high crystallinity can be obtained. Conventional graphite materials have been produced by molding a starting material such as a resin and gradually carbonizing and graphitizing the molded starting material up to high temperature of about 3000° C. In that case, in order to make various shapes, it was necessary to carry out complicated steps such as a step for cutting or grinding a graphite material by machining or mixing a graphite powder with a binder and then conducting coating, press-molding or the like. In the present invention, by the easy method for laminating and filling, on substrates having various shapes, multi-layer graphenes having been produced previously, it is made possible to endow features of substrate such as strength, flexibility and light weight and features of graphenes and graphite obtained by laminating graphenes such as electric conductivity, thermal conductivity, electro-magnetic interference shielding property, antibacterial activity, lubricity, heat resistance and chemical resistance.

When multi-layer graphenes are laminated, as the lamination proceeds, the form and characteristics thereof come close to those of graphite. Therefore, it is possible to produce graphite materials of various forms by so-called bottom up system by applying the method of the present invention.

For example, by making use of high thermal conductivity of graphite, a thin graphite sheet is used as countermeasures for heat accumulation or locally heated heat spot inside a thin mobile terminal such as smartphone. So far, technique for processing of a graphite material into a large size thick part such as an electrode for steel making has been established, but it is difficult to process a graphite material into a sheet-like part. Therefore, graphite sheets produced by synthesizing a graphite intercalation compound using graphite and sulfuric acid, rapidly heating the obtained compound for expansion and subjecting the expanded graphite to rolling or hot press molding, and graphite films produced by laminating resin films of polyimide or the like which is easily graphitized and then heat-treating the laminated films up to about 3000° C. under pressure have been put into practical use. Actually graphite sheets having a thickness of about 100 μm and graphite films having a thickness of about 50 μm are put into practical use. However, graphite alone tends to be low in mechanical strength and adhesive force, and it is difficult to produce graphite materials being thinner and having good mechanical strength and processability.

By applying the method of the present invention and laminating multi-layer graphenes on a porous resin substrate having relatively high percentage of voids to fill multi-layer graphenes in the voids of the substrate, it is possible to produce thin members and sheets having good processability, high strength and excellent characteristics of graphite such as electric conductivity, thermal conductivity, heat resistance, chemical resistance and antibacterial property. Steps for laminating and filling multi-layer graphenes on a substrate are not limited particularly, and various processing methods such as the above-mentioned method for laminating multi-layer graphenes on surface of a substrate can be used. Whichever method is used among the above-mentioned processing methods, it is possible to laminate and fill graphenes on a substrate without using a binder due to a high adhesive force of multi-layer graphenes, especially several graphene layers or a single-layer graphene. The method of the present invention has a feature of laminating and filling multi-layer graphenes without using a binder as mentioned above. However, the use of a binder and a surfactant which may be required for increasing productivity and product area is not limited particularly.

As a specific preparation method of a graphite film, since the lamination is carried out via Van der Waals bond, any means for preparation can be suitably used as far as multi-layer graphenes can be brought into contact with the surface of the substrate and Van der Waals bond can be formed. Examples of the method are a method for rubbing surface of a substrate with the mass of multi-layer graphenes, a method for bringing surface of a substrate into contact with a dispersion of multi-layer graphenes obtained from the mass of multi-layer graphenes and then removing the solvent from the surface of a substrate, a method for increasing an adhesive force between the substrate and the graphene by cold rolling, hot rolling, roll press, hot press or the like, an optional combination of these methods and a method for repeating these methods. Also, in order to increase strength of a graphite film, a binder and additives usually used in this field (for example, a thickener, a dispersant, a diluent and the like) can be added to the dispersion of graphene.

In the case of forming a transparent conductive film for a touch panel, since high light transmissivity is required, it is effective to use fibrous or tube-like multi-layer graphenes and form a conductive path for flowing electric current while holding light transmissivity with relatively low covering degree.

<Pattern of Thick and Thin Layers>

Among the substrates coated with multi-layer graphenes according to the present invention, the substrate coated with multi-layer graphenes and having a pattern of thick and thin layers of multi-layer graphenes (multi-layer graphene-coated substrate with a pattern) can be produced by preparing a transfer mold provided with convex and concave portions coinciding with the pattern on the surface of the mold, overlapping a back surface of the substrate (resin film, non-woven fabric, paper or the like) over the surface of the transfer mold, and rubbing multi-layer graphenes of a mass of multi-layer graphenes on the surface of the substrate.

Here, "pattern" means a figure or a design formed by one of thick and thin coated layers, for example, a thick coated layer (thick layer). Nonlimiting examples of the pattern are lattice, net and polka dot. An arrangement plan of a circuit (for example, electronic circuit, and the like) can also be used as a pattern. In the pattern, the thick layer portion can be used, for example, as a conductive layer. The thick layer portion may be a continuous layer. Moreover, the thin coated layer (thin layer portion) can be used, for example, for securing light transmissivity.

The "transfer mold" is a base material provided with a pattern of convex and concave portions on its surface, and is used for reproducing the pattern on surface of a substrate in such a manner that the convex portion supports the substrate from its bottom with a stronger force than that of the concave portion, thereby rubbing multi-layer graphenes on the surface of the substrate over the convex portion thicker than on the surface of the substrate over the concave portion. The transfer mold may be in the form of plane or in the curved form. The material of the transfer mold is not limited particularly as far as it has strength being capable of withstanding the rubbing. Examples of the material are metal (for example, aluminum, etc.), ceramic and the like.

When carrying out the rubbing, in the case where the substrate is "a film made of a resin having π-electron bond or a non-woven fabric made of fibers of the same resin", the surface of the substrate may be warmed previously. By warming the substrate, the resin is softened and comes into close contact with the transfer mold, and as a result, the pattern of the transfer mold is easily reproduced on the surface of the substrate. The warming temperature varies depending on kind of a resin, and is preferably within a range from about 30° C. to about 350° C., more preferably within a range from about 50° C. to about 250° C. In this case, the substrate can be warmed by usual method, for example, warming can be achieved by placing a metal transfer mold having good thermal conductivity on a hot plate having been set at a given temperature, holding the transfer mold thereon for a while to warm its surface and then placing the substrate thereon.

With respect to "the method for producing the multi-layer graphene-coated substrate with a pattern", the description on "the method for producing the substrate coated with multi-layer graphenes" can be applied unless contradictory to the description mentioned above.

The thus obtained multi-layer graphene-coated substrate with a pattern is useful as a transparent conductive film having both of transparency and conductivity, and in addition, the film itself functions as a circuit if a circuit is used as a pattern. Further, the multi-layer graphene-coated substrate with a pattern can be used as a heat-releasing sheet, a static electricity eliminating sheet or the like.

In the present invention, an amount of hydrogen is one measured in accordance with General Rules for Determination of Hydrogen in Metallic Materials (JIS Z 2614: 1990. Determination is carried out by an inert gas heating method which is a condition for "steel". The measurement is concretely conducted by heating a sample up to 2000° C. under argon gas atmosphere and measuring an integrated amount of generated hydrogen by gas chromatograph.).

There is no definite limitation in a size and a shape of particles constituting a powdery and/or particulate material, and a powdery material being composed of relatively fine particles and particulate material being composed of comparatively coarse particles are encompassed.

Further, the open pore ratio (apparent pore ratio) is a ratio of a volume of a (open) cavity which exists in a volume obtained from the outer shape of a material and into which a liquid or gas can invade. Generally a material having a high open pore ratio has a continuous pore and has air permeability. In this specification, the open pore ratio is obtained from the following equation.

$$\text{Open pore ratio}(\%) = \{(\text{Apparent specific gravity} - \text{Bulk specific gravity})/\text{Apparent specific gravity}\} \times 100$$

Apparent specific gravity: A value measured using a sample before pulverization by a helium gas substitution pycnometer method using a densimeter AccuPyc 1330-PCW available from Shimadzu Corporation Bulk specific gravity: A value obtained by dividing a sample weight by a volume calculated from outer dimensions of the sample Further, the total pore ratio is a ratio of a volume of a total cavity (including closed pores in addition to open pores) existing in a volume calculated from outer shape of a sample. In this specification, the total pore ratio is obtained from the following equation.

$$\text{Total pore ratio}(\%) = \{(\text{True specific gravity} - \text{Bulk specific gravity})/\text{True specific gravity}\} \times 100$$

True specific gravity: A specific gravity measured using a target material in a state of being pulverized into a fine powder in order to minimize an effect attributable to a cavity contained in the target material, and in Examples and Production Examples of this specification, the true specific gravity is measured using a powder sample having passed through a 74 μm filter.

An apparent specific gravity, a bulk specific gravity and a true specific gravity are synonymous with an apparent density, a bulk density and a true density, respectively.

In this specification, the spacer and the sleeve are used being placed inside the closed vessel made of graphite and is inserted between the inner wall of the vessel and the pre-baked starting material so that the both do not come into direct contact with each other. The spacer is one covering the pre-baked starting material mainly from the top and bottom thereof, and the sleeve is one covering the pre-baked starting material from the side thereof. There can be a case where discrimination between the spacer and the sleeve is meaningless depending on a shape of the vessel.

"Bulk" in the terms such as "bulky", "bulky state" or "bulky structure" means that the basic component units are connected each other.

The average particle size (particle size (average)) was measured by a laser diffraction scattering method using a laser diffraction density distribution measuring device. Namely, a density distribution was determined by emitting laser beam to the group of particles and calculating from a distribution pattern of intensity of beams diffracting and scattering therefrom.

In this specification, in the case of a numerical range shown, for example, by 1200 to 1900, this stands for a range of 1200 or more and 1900 or less.

EXAMPLE

The present invention is then described by means of Examples, but is not limited to these Examples.

Example 1

Figure 15:
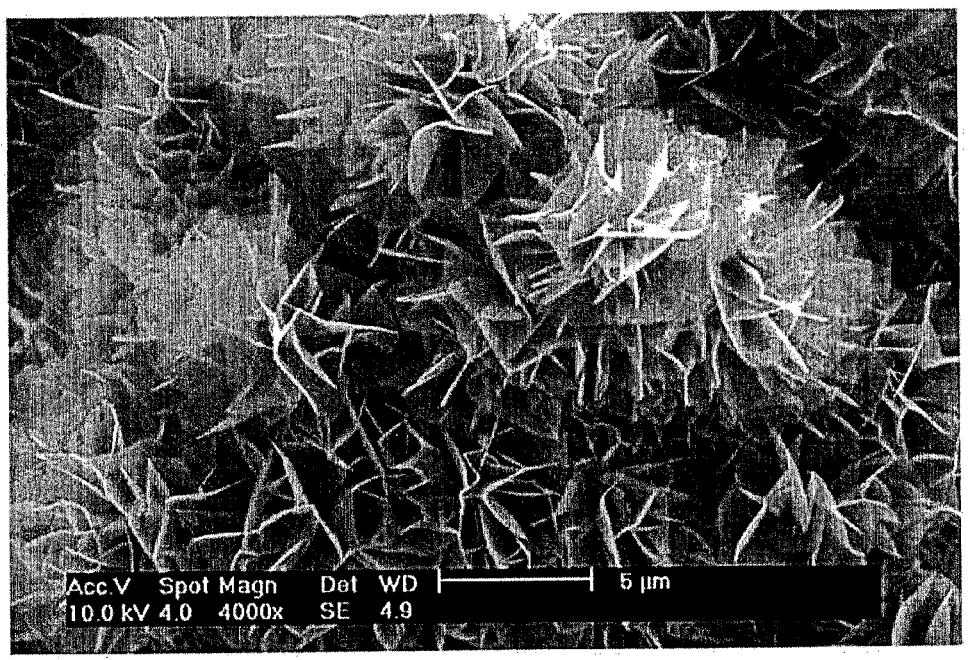
FIG. 15 is a scanning electron microscope (SEM) photograph of the surface of a cluster of multi-layer graphenes used in Example 1.

The cluster of multi-layer graphenes which had a size of from several millimeters to several tens millimeters and could be held by hand was selected from those produced in Production Example 1. An SEM of the surface of the cluster of graphenes is shown in FIG. 15. It is seen that the obtained cluster has a structure composed of many aggregated multi-layer graphenes in the form of flower leaf having a size of several microns and an extremely thin thickness.

A 300 μm thick PET resin film was cut into a shape of 30 mm×30 mm, and the surface thereof was wiped with a swab impregnated with ethyl alcohol for cleaning and degreasing treatment to prepare a substrate.

The surface of the substrate was rubbed with the cluster of multi-layer graphenes held on a hand to cause a friction force at an interface between the substrate and the cluster of multi-layer graphenes, thereby forming a multi-layer graphene layer on the surface of the substrate. In the rubbing of the surface of the substrate with the cluster of multi-layer graphenes, first, the rubbing was carried out in one direction on the film (referred to as a vertical direction), then in a traversing direction at a right-angle to the vertical direction, and further in the directions at angles of 45° and 315° to the vertical direction. In each direction, the rubbing was conducted from one end to another end of the film. When the rubbing was conducted once in each of four directions, the number of rubbing cycles was assumed to be one, and the rubbing was carried out plural times so that the multi-layer graphenes could be transferred to the whole surface of the substrate to enable sufficient electric conductivity on the surface to be obtained.

Figure 16:
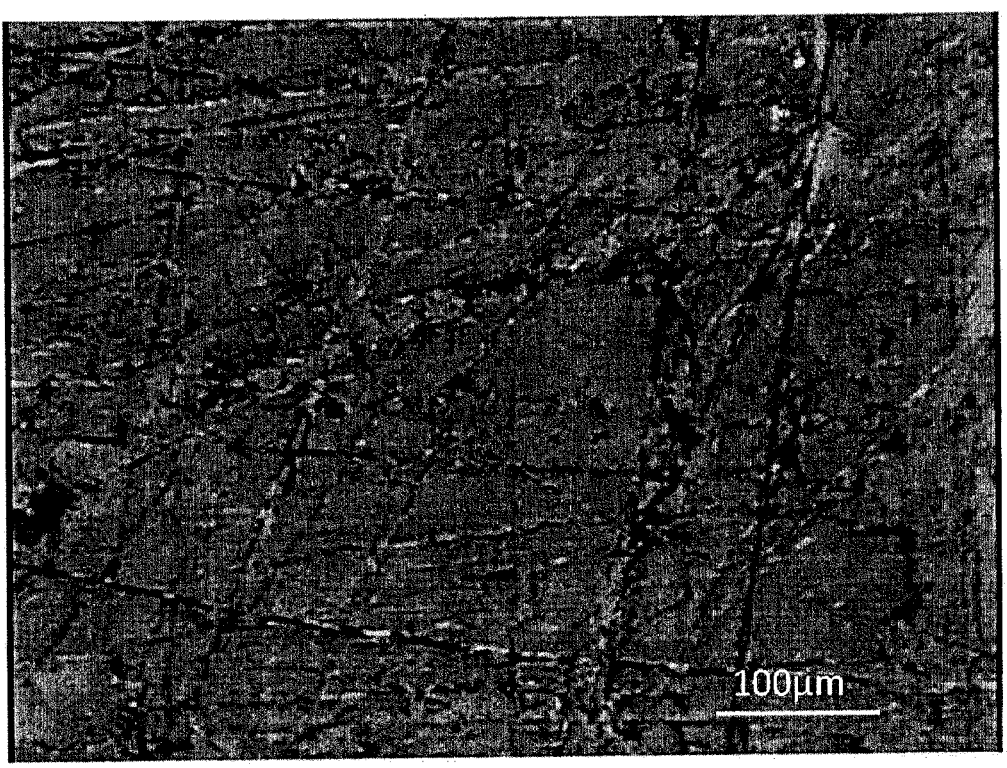
FIG. 16 is an optical microscope photograph of the surface of the transparent conductive film produced in Example 1.
Figure 17:
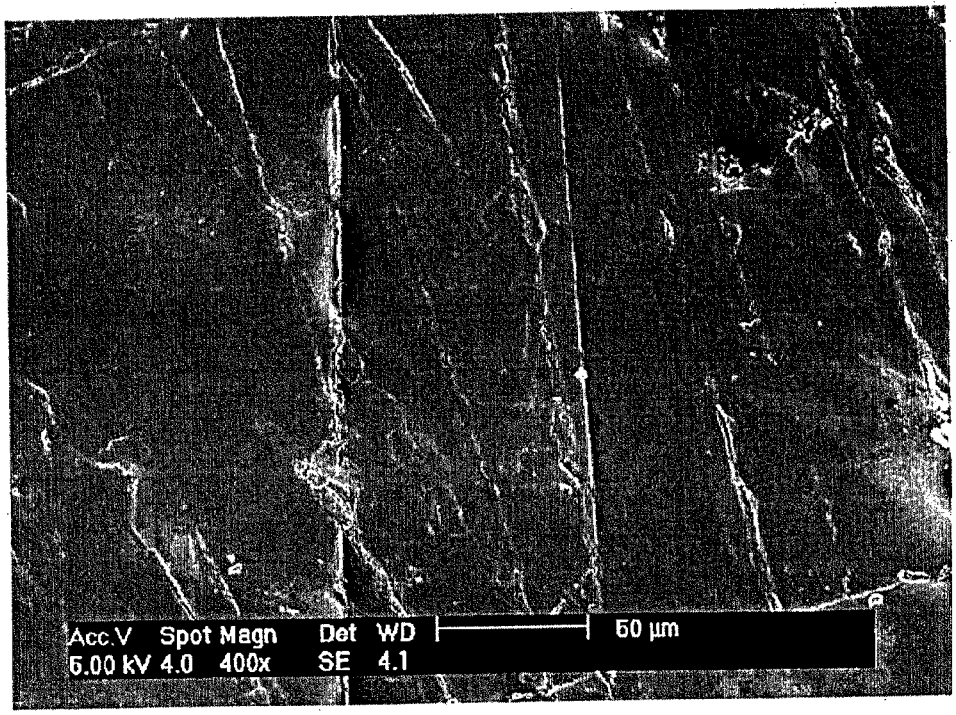
FIG. 17 is an SEM photograph of the surface of the transparent conductive film produced in Example 1.
Figure 18:
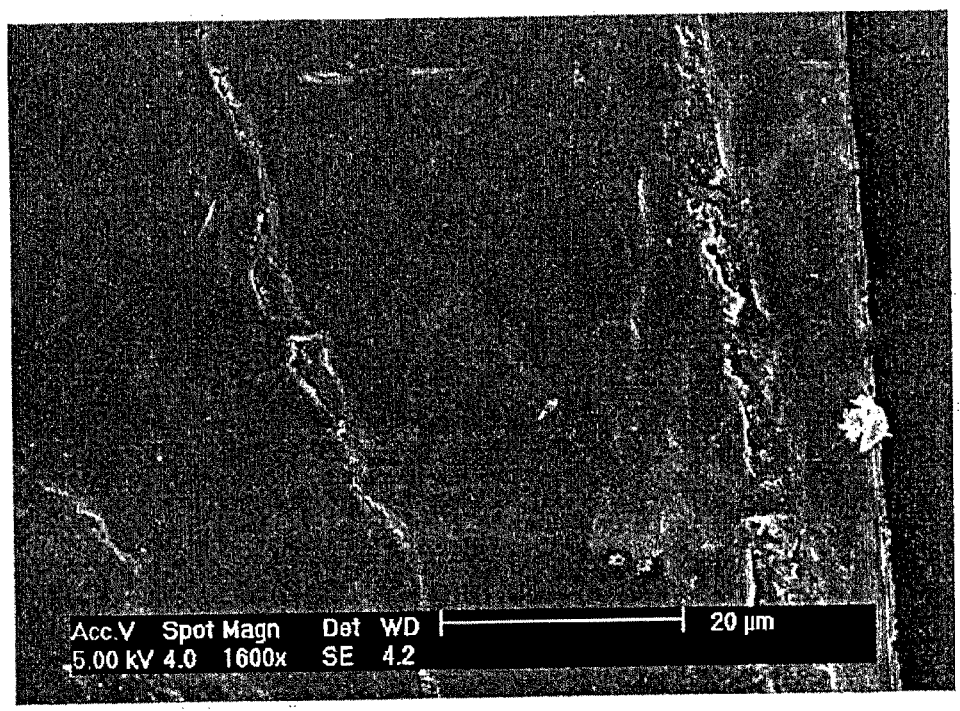
FIG. 18 is an enlarged view of FIG. 17.

The surface of the obtained substrate coated with multi-layer graphenes (transparent conductive film) turned light grey, but characters carried on a paper were readable through the film. An optical microscope photograph of the surface of the transparent conductive film is shown in FIG. 16, and SEM photographs thereof are shown in FIG. 17 and FIG. 18. It was confirmed that the multi-layer graphenes could have been coated on the surface of the substrate without a blank space. Since the PET resin film as a substrate has no electric conductivity, when electron beams are emitted thereto, an electron density on the surface of the substrate is increased and the substrate is overheated and deformed, and therefore, observation of the surface of the substrate with SEM is difficult. However, in the substrate coated with multi-layer graphenes, electron conductivity arose on the surface of the substrate, and the surface could be observed stably with SEM.

The surface resistance of the obtained transparent conductive film was measured with a surface resistance meter (resistivity meter, LORESTA EP MCP-T360) available from Mitsubishi Chemical Analytech Co., Ltd. by a 4-pin probe, constant current method (A surface resistance was measured hereinafter by the same method). With respect to light transmittance, light transmissivity at each of wavelengths of 400 nm, 500 nm, 600 nm and 700 nm was measured with a visible-ultraviolet spectrophotometer (CE1021 available from AS ONE Corporation) (Light transmissivity was measured hereinafter by the same method). The results thereof are shown in Tables 1-1 and 1-2.

The PET resin film used as a substrate was transparent and transmissivity of light within a visible light region was 87.9%. However, since the film had no electric conductivity, its surface resistance was infinite and was not measurable. Meanwhile, in the case of a film formed, on its surface, a coated layer of multi-layer graphenes by rubbing with the cluster of multi-layer graphenes, though its light transmissivity varies depending on the number of rubbing cycles, sufficient electric conductivity was obtained with keeping light transmittance. Though the thickness of the coated layer of graphenes is very thin, the surface resistance making it possible to use the film as electrical wiring was obtained.

TABLE 1-1

| | Number of rubbing cycles | Light transmissivity (%) | | | | |
|---|---|---|---|---|---|---|
| | | 400 nm | 500 nm | 600 nm | 700 nm | Average value |
| PET film | 0 | 86.3 | 88 | 88.6 | 88.8 | 87.9 |
| Example 1 | 10 | 21.9 | 26.2 | 28.4 | 29.7 | 26.6 |
| | 5 | 26.3 | 28.4 | 31.9 | 31.7 | 29.6 |
| | 3 | 53.4 | 56.6 | 59.1 | 60.7 | 57.7 |

TABLE 1-2

| | Number of rubbing cycles | Surface resistance (Ω/□) | | | |
|---|---|---|---|---|---|
| | | Measurement 1 | Measurement 2 | Measurement 3 | Average value |
| PET film | 0 | unmeasurable | unmeasurable | unmeasurable | unmeasurable |
| Example 1 | 10 | 1,350 | 1,800 | 1,300 | 1,480 |
| | 5 | 3,450 | 3,050 | 2,820 | 3,110 |
| | 3 | 14,870 | 6,280 | 14,070 | 11,740 |

Example 2

Clusters of multi-layer graphenes of Production Examples 2-1 to 2-6, and an artificial graphite material A (IGS895 available from Nippon Techno-Carbon Co., Ltd.) and an artificial graphite material B (MGY-72 available from TOHO CARBON CO., LTD.) prepared in Production Example 2 were prepared as graphite materials. A true density, an apparent density, a bulk density and a total pore ratio thereof are shown in Table 2-1.

Substrates coated with multi-layer graphenes were produced in the same manner as in Example 1 except that these graphite materials were used. In any of productions, the rubbing of the graphite material was carried out five times.

With respect to each of the graphite materials, whether or not a coated layer of multi-layer graphenes had been formed on the surface of the substrate was observed using an optical microscope. A light transmissivity and a surface resistance of the obtained substrate were measured. The results are shown in Tables 2-2 and 2-3.

Figure 19:
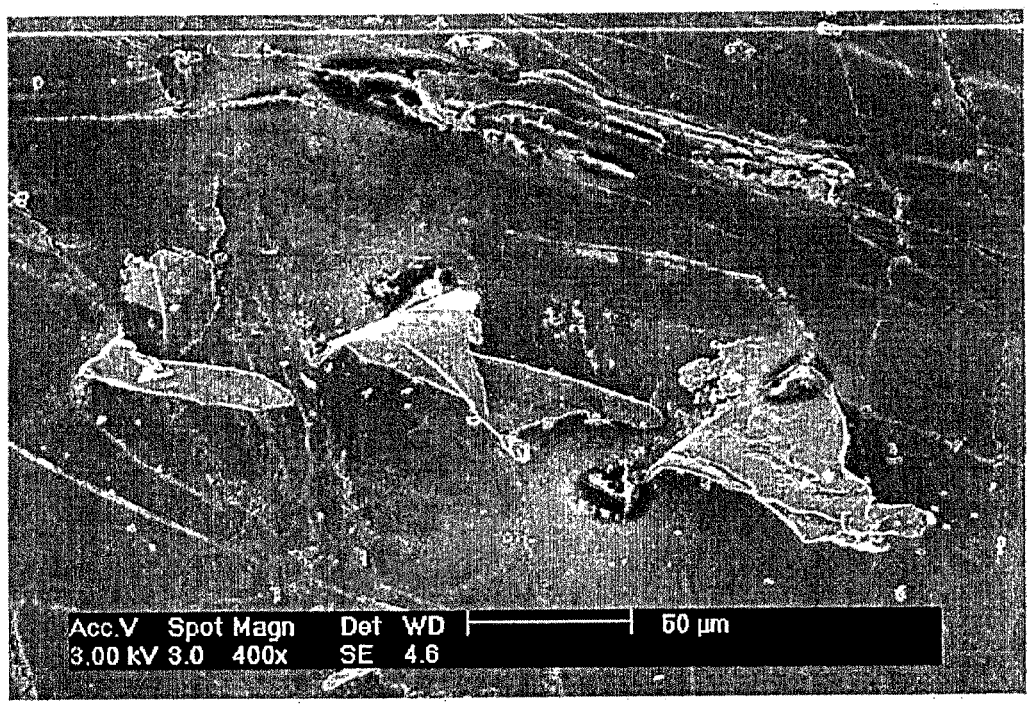
FIG. 19 is an SEM photograph of the substrate coated with multi-layer graphenes which was obtained in Example 2-4.

In respect to the commercially available artificial graphite materials A and B, a coated layer was not formed on the surface of the PET resin film at all, and since no current flows in the film, its surface resistance was infinite and was not measurable. Meanwhile, in respect to the clusters of multi-layer graphenes, in the case of a true density of less than 1.85 g/cm$^3$, a coated layer of multi-layer graphenes is hardly formed, and for forming a coated layer, it can be considered that it is necessary that a true density is approximately not less than 1.85 g/cm$^3$, and a total pore ratio is approximately not less than 40%. Further, it can be considered that a good coated layer is formed and a uniform coating surface is obtained when a true density is approximately not less than 2.0 g/cm$^3$, and a total pore ratio is approximately not less than 50%. FIG. 19 is an SEM of the surface of the coated layer of Example 2-4. In this figure, partly separated multi-layer graphenes in the form of flower leaf were observed.

TABLE 2-1

| Production Example | True density g/cm$^3$ | Apparent density g/cm$^3$ | Bulk density g/cm$^3$ | Total pore ratio % |
|---|---|---|---|---|
| 2-1 | 1.73 | 1.68 | 1.15 | 33.5 |
| 2-2 | 1.84 | 1.73 | 1.05 | 42.9 |
| 2-3 | 1.88 | 1.61 | 1.10 | 41.5 |
| 2-4 | 1.93 | 1.82 | 0.99 | 48.7 |
| 2-5 | 2.04 | 1.85 | 0.97 | 52.5 |
| 2-6 | 2.16 | 1.21 | 0.70 | 67.6 |
| Artificial graphite A | 2.12 | 2.09 | 1.98 | 6.6 |
| Artificial graphite B | 2.13 | 2.02 | 1.86 | 12.7 |

TABLE 2-2

| | | | Light transmissivity (%) | | | | |
|---|---|---|---|---|---|---|---|
| Example | Starting material | Coated film | 400 nm | 500 nm | 600 nm | 700 nm | Average value |
| 2-1 | Production Example 2-1 | No film was formed | 85.1 | 85.3 | 85.9 | 87.0 | 85.8 |
| 2-2 | Production Example 2-2 | No film was formed | 85.0 | 84.9 | 86.2 | 87.8 | 86.0 |
| 2-3 | Production Example 2-3 | Film was formed slightly | 76.5 | 77.3 | 78.9 | 80.5 | 78.3 |
| 2-4 | Production Example 2-4 | Film was formed | 65.6 | 69.1 | 68.9 | 70.4 | 68.5 |
| 2-5 | Production Example 2-5 | Film was formed | 57.9 | 59.8 | 63.9 | 66.3 | 62.0 |
| 2-6 | Production Example 2-6 | Film was formed and coating surface was uniform | 51.4 | 55.5 | 57.4 | 58.9 | 55.8 |
| 2-7 | Artificial graphite A | No film was formed | 83.2 | 84.0 | 85.1 | 87.0 | 84.8 |
| 2-8 | Artificial graphite B | No film was formed | 82.8 | 83.1 | 84.0 | 86.4 | 84.1 |

TABLE 2-3

| | Surface resistance (Ω/□) | | | |
|---|---|---|---|---|
| Example | Measurement 1 | Measurement 2 | Measurement 3 | Average value |
| 2-1 | unmeasurable | unmeasurable | unmeasurable | |
| 2-2 | unmeasurable | unmeasurable | unmeasurable | |
| 2-3 | 340,000 | 315,600 | 556,890 | 404,163 |
| 2-4 | 14,870 | 6,280 | 14,070 | 11,740 |
| 2-5 | 3,450 | 3,050 | 2,820 | 3,107 |
| 2-6 | 3,200 | 2,850 | 2,780 | 2,943 |
| 2-7 | unmeasurable | unmeasurable | unmeasurable | |
| 2-8 | unmeasurable | unmeasurable | unmeasurable | |

Example 3

A 300 μm thick PET resin film, a 500 μm thick acrylic resin film, a 200 μm thick polystyrene resin film, a 1 mm thick polycarbonate resin film, a 50 μm thick polypropylene resin film, a 100 μm thick polyethylene resin film, a 50 μm thick polyvinyl chloride resin film, a 500 μm thick Teflon (trade mark) resin film and a 500 μm thick glass sheet were cut into a shape of 30 mm×30 mm, respectively, and the surfaces thereof were wiped with a swab impregnated with ethyl alcohol for cleaning and degreasing treatment to prepare substrates.

The surfaces of these substrates was treated in the same manner as in Example 1 using the cluster of multi-layer graphenes obtained in Production Example 1 to ascertain whether a coated layer of the multi-layer graphenes was formed on the substrate. Number of rubbing cycles of the surface of the substrate with the cluster of multi-layer graphenes was five times.

Figure 20:
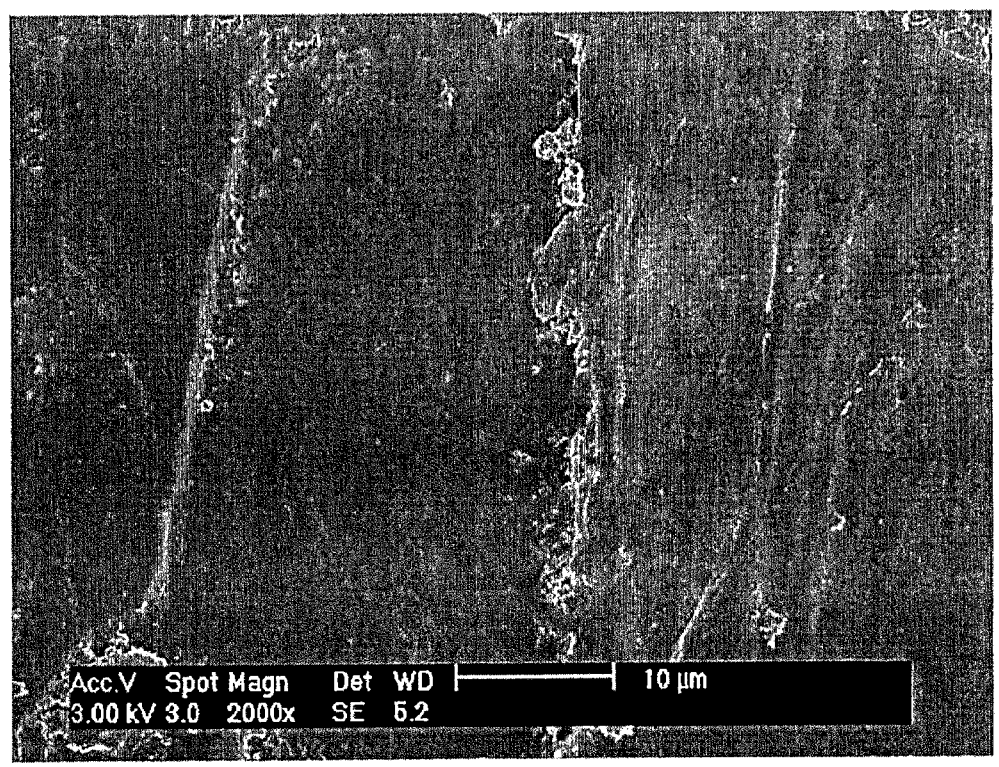
FIG. 20 is an SEM photograph of the surface of the coated layer of multi-layer graphenes and formed on the surface of the PET resin in Example 3.
Figure 21:
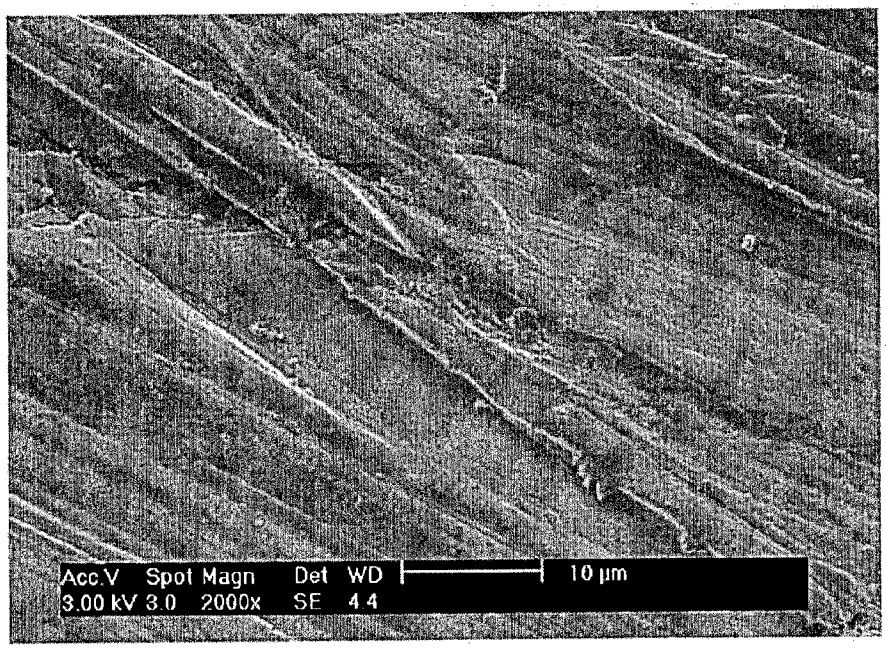
FIG. 21 is an SEM photograph of the surface of the coated layer of multi-layer graphenes and formed on the surface of the acrylic resin in Example 3.

The surfaces of the obtained substrates were observed with an optical microscope and SEM to check to see whether a coated layer was formed and whether the surfaces were uniform. The results are shown in Table 3. The coated films of the multi-layer graphenes were formed on the resins but not on the glass. Especially resins having π-electron bond of benzene nucleus, double bond or the like in its molecular structure exhibited good formability of a coated layer. It can be considered that the reason for that is such that a more rigid Van der Waals bond is formed on the surfaces of these resins having π-electron due to overlapping with π-electron orbit of graphene. FIG. 20 shows an SEM photograph of the surface of the coated layer of multi-layer graphenes which was formed on the surface of the PET resin film, and FIG. 21 shows an SEM photograph of the surface of the coated layer of multi-layer graphemes which was formed on the surface of the acrylic resin film.

TABLE 3

|  | Coated layer | Uniformity of surface of coated layer |
| --- | --- | --- |
| PET resin | Formed | Extremely good |
| Acrylic resin | Formed | Good |
| Polystyrene resin | Formed | Good |
| Polycarbonate resin | Formed | Good |
| Polypropylene resin | Formed | Non-uniform |
| Polyethylene resin | Formed | Non-uniform |
| Polyvinyl chloride | Formed | Non-uniform |
| Teflon resin | Formed | Non-uniform |
| Glass | Not formed |  |

Example 4

A 300 μm thick copper sheet, a 70 μm thick copper foil, a 30 μm thick aluminum foil and a 200 μm thick titanium sheet were cut into a shape of 30 mm×30 mm, respectively, and a 125 μm thick silicon wafer, a 150 μm thick SiC substrate, a 125 μm thick aluminum nitride substrate, a 100 μm thick GaN substrate, a 125 μm thick glassy carbon substrate and a 100 μm thick sapphire substrate were cut into a shape of 50 mm diameter, respectively, and the surfaces thereof were wiped with a swab impregnated with ethyl alcohol for cleaning and degreasing treatment to prepare substrates.

The surfaces of these substrates were treated in the same manner as in Example 1 using the cluster of multi-layer graphenes obtained in Production Example 1 to ascertain whether a coated layer comprising the multi-layer graphenes was formed on the substrate. Number of rubbing cycles of the surface of the substrate with the cluster of multi-layer graphenes was five times.

Figure 22:
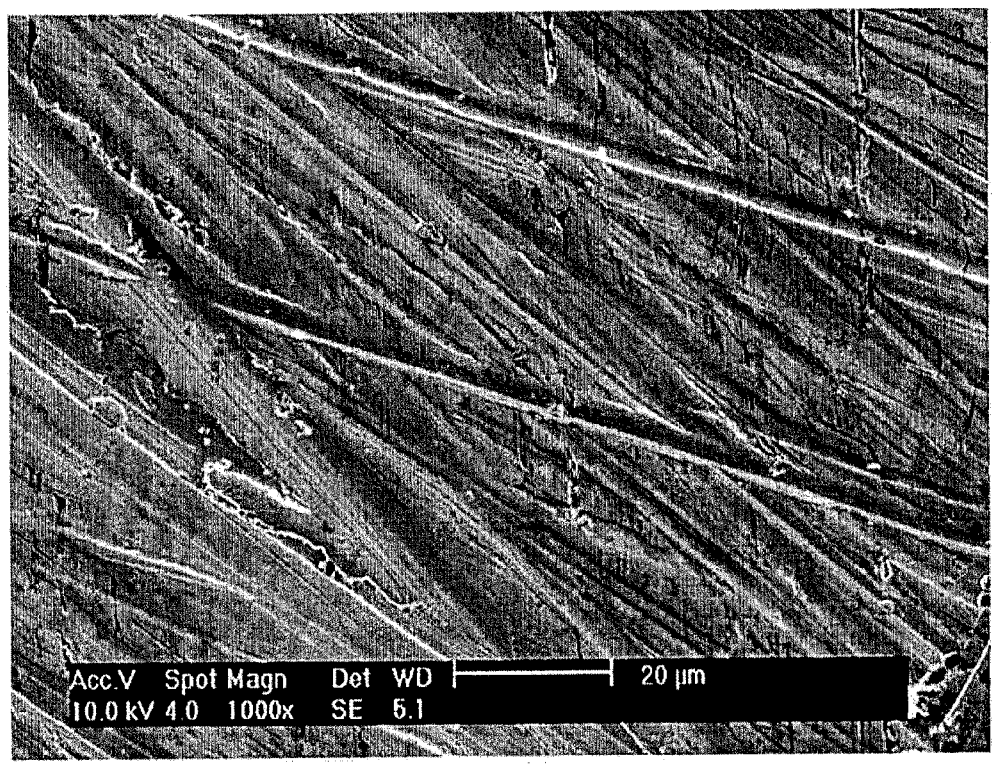
FIG. 22 is an SEM photograph of the surface of the coated layer of multi-layer graphenes and formed on the surface of the copper sheet in Example 4.

The surfaces of the obtained substrates were observed with an optical microscope and SEM to check to see whether a coated layer was formed and whether the surfaces were uniform. The results are shown in Table 4. It was confirmed that the coated layers of multi-layer graphenes were formed on the copper sheet, copper foil, aluminum foil, titanium sheet, glassy carbon substrate and sapphire substrate. Uniformity of the surface of the coated layer was most excellent in the copper sheet and the copper foil, and the whole surfaces thereof were covered with multi-layer graphenes. FIG. 22 shows an SEM photograph of the surface of the coated layer of multi-layer graphenes which was formed on the surface of the copper sheet.

TABLE 4

|  | Coated layer | Uniformity of surface of coated layer |
| --- | --- | --- |
| Copper sheet | Formed | Good |
| Copper foil | Formed | Good |
| Aluminum foil | Formed | Partly adhered |
| Titanium sheet | Formed | Partly adhered |
| Silicon wafer | Not formed |  |
| SiC substrate | Not formed |  |
| Aluminum nitride substrate | Not formed |  |
| Glassy carbon substrate | Formed | Partly adhered |
| Sapphire substrate | Formed | Partly adhered |

Example 5

The whole surface of a slide glass (26 mm wide×76 mm long×0.8 mm thick) produced by Matsunami Glass Ind., Ltd. was wiped with ethanol for cleaning and degreasing treatment. A polyester resin (available from UNITIKA LTD.) and an acrylic resin were mixed in a weight ratio of 1:1, and the mixture was dipped in N,N-dimethylformamide to prepare a solution having a resin concentration of 5000 ppm. The surface of the glass was coated with the resin using a micro speed dip coater available from SDI Company Ltd. at a temperature of 50° C. at a lift-up speed of 10 μm/sec. The obtained resin-coated glass was subjected to air drying for 24 hours to make a substrate for forming a coated layer of multi-layer graphenes.

The surface of the substrates were treated in the same manner as in Example 3 using the cluster of multi-layer graphenes obtained in Production Example 1, and a coated layer of multi-layer graphenes was formed and a transparent composite material composed of the glass, resin and graphenes was obtained.

Example 6

Three kinds of solvents, i.e., water containing 0.1 wt % of sodium lauryl sulfate (water+surfactant), N,N-dimethylformamide (DMF) and 2-methoxyethanol were prepared. The cluster of multi-layer graphenes obtained in Production Example 1 was weighed to be 0.1 wt % to each of the solvents, and after mixing with the solvent, was subjected to shredding treatment at 1000 rpm for 15 minutes with a wet mixer having a metallic cutter, thereby shredding the cluster of multi-layer graphenes to obtain three kinds of dispersions of multi-layer graphenes. Each dispersion was charged in a commercially available ultrasonic cleaner (Portable ultrasonic cleaner W-113 available from HONDA ELECTRONICS), and was subjected to application of ultrasonic wave at 42 kHz at an output of 100 W for 30 minutes. After the application of ultrasonic wave, the solution turned black since multi-layer graphenes in the form of flower leaf had been dispersed from the cluster of multi-layer graphenes in the solvent. Then, this dispersion was subjected to centrifugal separation at an acceleration rate of 800 G for 30 minutes, a light black supernatant was collected as a dispersion for graphene dip coating.

A 300 μm thick PET resin film and a 300 μm thick copper sheet were cut into a shape of 20 mm wide×70 mm long to make substrates for dip coating.

The PET resin film and the copper sheet were subjected to dip coating using a micro speed dip coater available from SDI Company Ltd. under the conditions shown in Table 5 for forming a multi-layer graphene-coated layer on the surface of the substrate.

In the case of dip coating of the PET resin film using the solvent of water+surfactant, a coated layer of multi-layer graphenes was not formed at a solution temperature of 40° C. even at a lift-up speed of 10 μm/sec. At a solution temperature of 50° C., partial adhering of multi-layer graphenes was recognized, and at 60° C., a coated layer was formed stably. However, at 80° C., the PET resin film was deformed due to heat. In the case of dip coating of the PET resin film using the solvent of 2-methoxyethanol, the same tendency was observed. However, even at a solution temperature of 40° C., a coated layer was formed, and at 50° C., a coated layer was formed stably. In the case of dip coating of the copper sheet using the N,N-dimethlformamide solution, even at 40° C., a coated layer was formed, and at 50° C., a coated layer was formed stably, and at 60° C., a uniformly coated surface was obtained.

In the case of the dip coating, while a substrate was exposed to the air by coming out from an interface of a solvent and the air, the substrate was dried by evaporation of the solvent, and thereby, multi-layer graphenes dispersed in the solvent was laminated on the surface of the substrate and a coated layer was formed. In the case where a solution temperature was low, it can be considered that an evaporation speed of the solvent was slow and smooth drying did not proceed at an interface between the solvent and the substrate, and therefore, graphenes dispersed in the solvent still remained in the solvent and stable formation did not occur.

TABLE 5

| Dispersion | Water + surfactant | Water + surfactant | Water + surfactant | Water + surfactant |
|---|---|---|---|---|
| Substrate | PET | PET | PET | PET |
| Temperature of dispersion | 40° C. | 50° C. | 60° C. | 80° C. |
| Application of ultrasonic wave | Applied | Applied | Applied | Applied |
| Lift-up speed | 10 μm/sec | 10 μm/sec | 10 μm/sec | 10 μm/sec |
| Graphene film formation | Not formed | Slightly adhered | Formed in much amount | Substrate was deformed |
| Dispersion | 2-Methoxyethanol | 2-Methoxyethanol | 2-Methoxyethanol | 2-Methoxyethanol |
| Substrate | PET | PET | PET | PET |
| Temperature of dispersion | 30° C. | 40° C. | 50° C. | 80° C. |
| Application of ultrasonic wave | Applied | Applied | Applied | Applied |
| Lift-up speed | 10 μm/sec | 10 μm/sec | 10 μm/sec | 10 μm/sec |
| Graphene film formation | Not formed | Slightly adhered | Formed in much amount | Substrate was deformed |
| Dispersion | DMF | DMF | DMF | DMF |
| Substrate | Copper sheet | Copper sheet | Copper sheet | Copper sheet |
| Temperature of dispersion | 30° C. | 40° C. | 50° C. | 60° C. |
| Application of ultrasonic wave | Applied | Applied | Applied | Applied |
| Lift-up speed | 10 μm/sec | 10 μm/sec | 10 μm/sec | 10 μm/sec |
| Graphene film formation | Not formed | Slightly adhered | Formed in much amount | Formed uniformly |

Example 7

Figure 23:
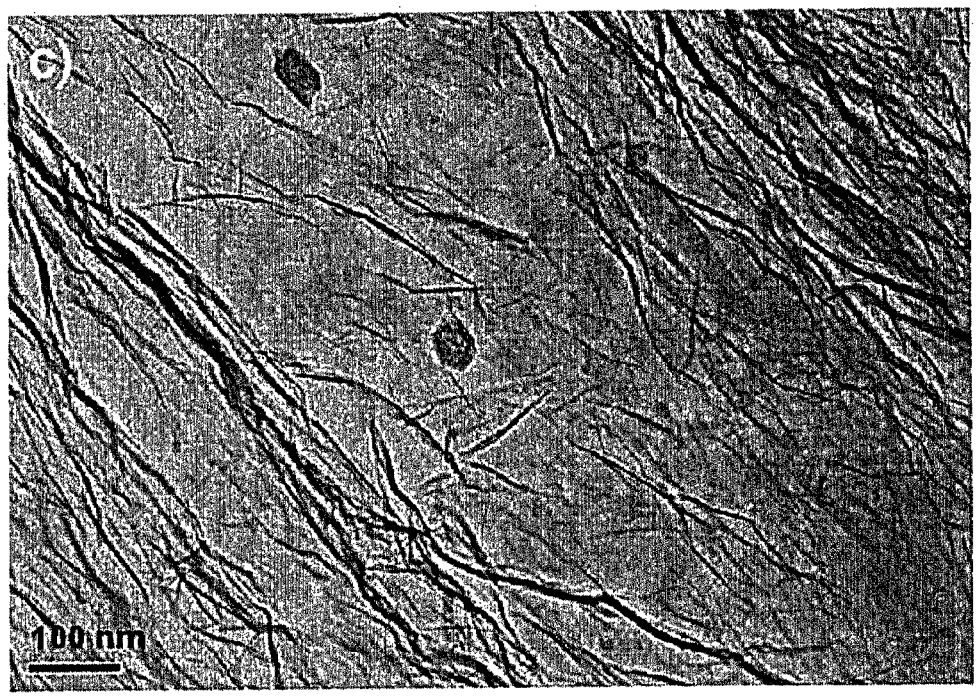
FIG. 23 is a transmission electron microscope (TEM) photograph showing a part of the surface of multi-layer graphenes in Example 7.
Figure 24:
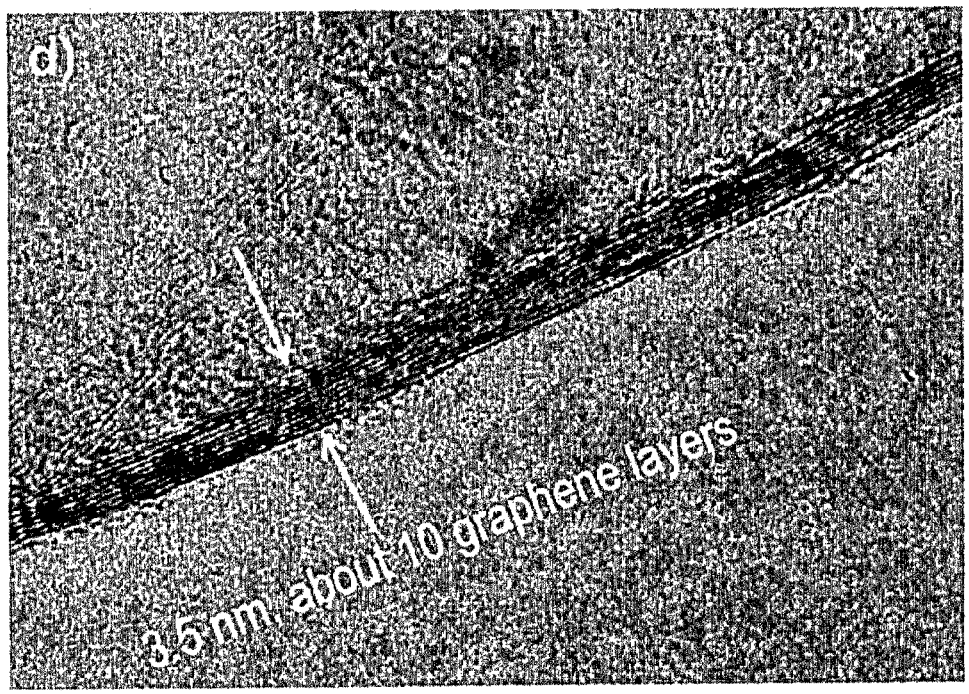
FIG. 24 is an enlarged view of multi-layer graphenes of FIG. 23 showing a lattice fringe image of its edge.

The cluster of multi-layer graphenes obtained in Production Example 11 was pulverized in an agate mortar, and the pulverized sample was poured into dimethylformamide to prepare a solution mixed with graphite in an amount of 5 wt %. After applying ultrasonic wave (at a frequency of 42 kHz at an output of 100 W for 30 minutes) with an ultrasonic cleaner (W-113 available from HONDA ELECTRONICS), a solid content was precipitated using a centrifugal separator (at an acceleration rate of 700 G for 30 minutes), The supernatant of the obtained solution was filtrated through a micro grid for TEM observation of graphenes having been dispersed in the solution, and the components collected on the micro grid was subjected to TEM observation. As a result of the TEM observation, the existence of many graphenes in the form of thin sheet (multi-layer graphenes) was observed as shown in FIG. 23, FIG. 24 shows a lattice fringe image by TEM of the edge of the obtained multi-layer graphenes in the form of thin sheet, and about seven layers of graphene can be observed. From this, it was confirmed that about 2.1 nm thick multi-layer graphenes had been obtained.

Example 8

Water containing 0.1 wt % of sodium lauryl sulfate (water+surfactant) was prepared, and the same treatment as in Example 6 was carried out to obtain a dispersion of multi-layer graphenes. The dispersion was used as a dispersion for spray coating of graphene.

A mini compressor (TYPE 226) available from Kiso Power Tool Mfg. Co., Ltd. was prepared and connected to an air brush (E1307N) available from the same company. The dispersion was filled in a liquid vessel of the air brush, and the air brush was adjusted so that the dispersion can be sprayed at an air pressure of 0.2 MPa. The inner diameter of the nozzle of the air brush was 0.4 mm. A PET resin film of 30 mm×30 mm×300 μm thick was placed on a surface of a metal hot plate, and the dispersion was sprayed onto the surface of the film to observe the surface. When the hot plate was not heated, liquid droplets remain on the surface of the film and graphenes were not adhered to the surface of the film. However, when the hot plate was heated to 60° C., graphenes were adhered to the surface of the film, and a substrate coated with multi-layer graphenes was obtained.

Example 9

The cluster of multi-layer graphenes obtained in Production Example 11 was cut into small pieces of about 3 to 5 mm with a cutter. A tool, in which a pedestal having a disk-like surface (surface of tool) having an outer diameter of 20 mm was jointed to a rotation shaft of 3 mm diameter×30 mm length made of steel, was prepared, and small pieces of multi-layer graphenes were adhered to the surface of the tool (The small pieces were not adhered to the portion in the range of about 9 mm diameter from the center of the tool surface). For the adhesion, an epoxy resin based elastic adhesive (EP001N available from CEMEDINE CO., LTD.) was used. The tool was allowed to stand for 24 hours for sufficient hardening of adhesive. FIG. 54 is a photograph showing an appearance of a completed graphene-coating tool. It can be seen that the cluster of multi-layer graphenes formed into small pieces is adhered to the surface of the tool. The prepared tool was fitted to a hobby router (HR100) available from Ryobi Limited, and pressed onto a PET resin film of 30 mm×30 mm×300 μm thick for 3 minutes at a rotation control graduation 1 while moving over the whole surface of the film to give a substrate coated with multi-layer graphenes.

Example 10

Figure 55:
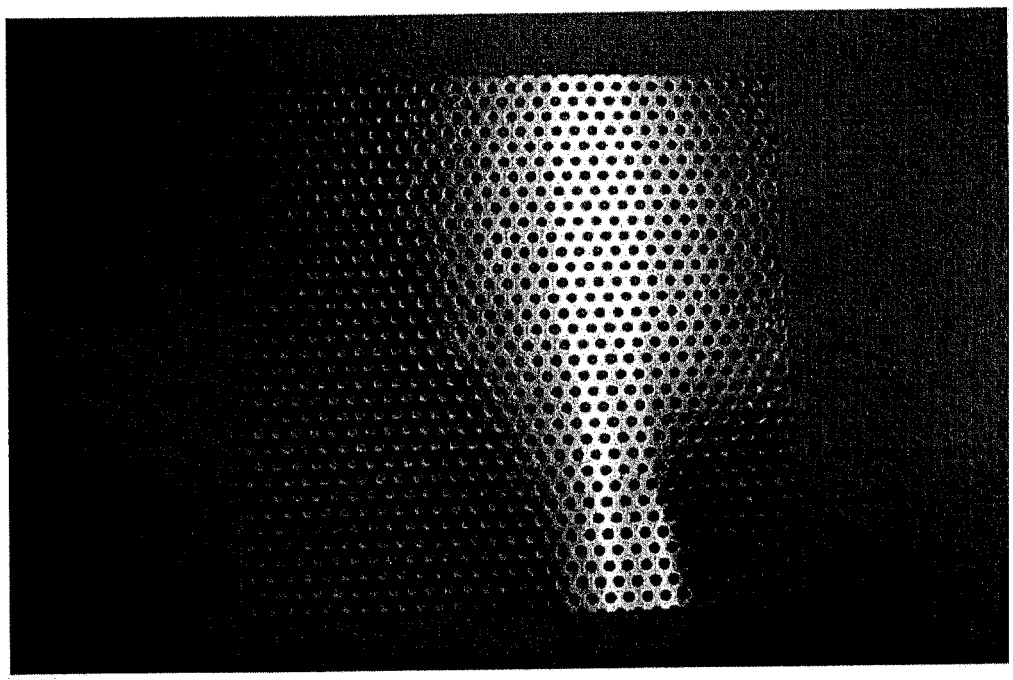
FIG. 55 shows a transfer mold used in Example 10.

The surface of a PET resin film of 120 μm thick×150 mm wide×150 mm long was wiped with a swab impregnated with ethyl alcohol for cleaning and degreasing treatment to prepare a substrate. Also, an aluminum sheet having a width of 160 mm, a length of 160 mm and a thickness of 3 mm and fabricated so as to have circular holes having a diameter of 5 mm on the whole surface thereof with a center-to-center pitch of the holes being 9 mm was prepared as a transfer mold (FIG. 55).

Figure 56:
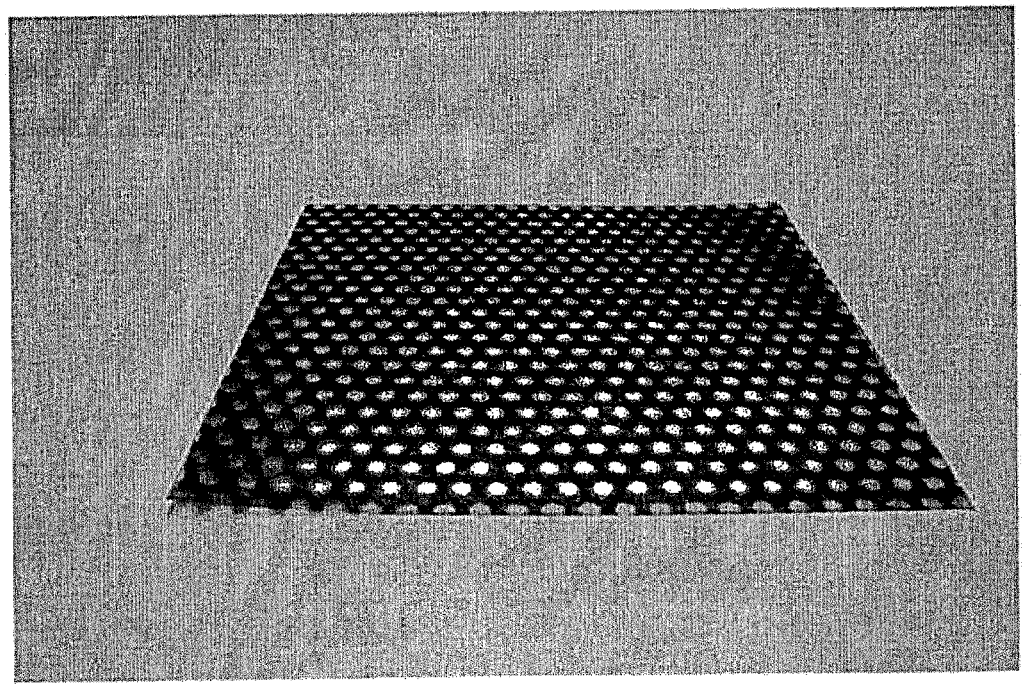
FIG. 56 shows a substrate coated with multi-layer graphenes and obtained in Example 10, in which the substrate has a pattern of thick and thin layers of multi-layer graphenes.

The aluminum sheet was placed on a hot plate, the surface temperature of which was set at 70° C., and after holding for five minutes, the back surface of the PET resin film was laid on the aluminum sheet and the outer periphery of the film was fixed with a heat resistant tape. While rubbing the surface of the PET resin film (substrate) with the cluster of multi-layer graphenes obtained in Production Example 13, the multi-layer graphenes were coated so that the pattern of the transfer mold came up to the surface of the film. A period of time required for coating the whole surface of the substrate was about five minutes. After the coating, 10 to 20 mm wide outer periphery portions of the PET resin film were cut off to remove defected portions such as portions damaged by the heat resistant tape. As a result, the PET resin film having a pattern of thick and thin layers of multi-layer graphenes (multi-layer graphene-coated substrate with a pattern) was obtained, in which multi-layer graphenes were coated in a thickness being as relatively thick as about 0.5 μm on the portions of 130 mm wide×130 mm long×120 μm thick except the circled hole portions of the transfer mold, while on the film portions corresponding to the circled hole portions of the transfer mold, multi-layer graphenes were coated thin. FIG. 56 is a photograph showing an appearance of the film.

With respect to the thus obtained multi-layer graphene-coated substrate with a pattern, surface resistances of the portions coated thick with graphenes and the portions coated thin were measured three times, respectively, and average values were obtained. With respect to light transmission, light transmissivity at each of wavelengths pf 400 nm, 500 nm, 600 nm and 700 nm was measured, and average values were obtained.

The surface resistance (average value) of the portions coated thick was 800Ω/□, and that of the portions coated thin was 85000Ω/□. The average light transmissivity with respect to visible light is 33.5% on the portions coated thick, and that of the portions coated thin was 85%. Accordingly, a transparent conductive film having a pattern of thick and thin layers of multi-layer graphenes and being provided with light transmittance and conductivity over the whole surface of the film was obtained.

Example 11

A copying paper having a thickness of about 90 μm, a whiteness of about 84% and a weight of 70 g/m² (available from ASKUL CORPORATION, trade name: Multi Paper Super Select Smooth) was cut into pieces of 150 mm wide× 150 mm long to make a substrate. Also, a 70 μm thick polyester non-woven fabric of polyester fibers having a diameter of 10 μm was cut into pieces of 150 mm wide×150 mm long to make another substrate. Multi-layer graphenes were coated on the surfaces of these substrates by rubbing the surfaces thereof with the cluster of multi-layer graphenes obtained in Production Example 13. The coating was repeated on each of the substrate surfaces until the resistance measured with a tester decreases under 1000Ω. The substrates were turned over and the same coating was also carried out on the back surfaces thereof. The coating on both front and back surfaces was carried out until the every resistance measured at ten points of the respective surfaces decrease under 1000Ω and electric conductivity is obtained on both surfaces. A period of time taken for processing was about 6 minutes in the copying paper and about 8 minutes in the polyester non-woven fabric. The analog tester EAT-01B available from Asahi Electric Co., Ltd. was used as a tester.

Figure 57:
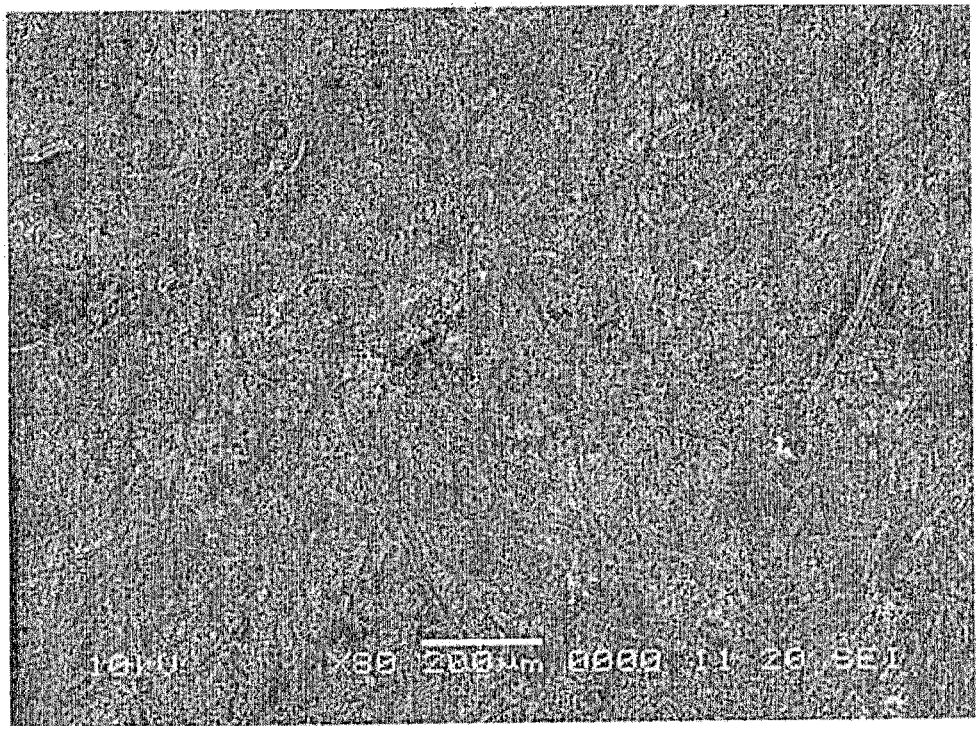
FIG. 57 is a SEM photograph of the surface of multi-layer graphenes coated on a copying paper which was obtained in Example 11.
Figure 58:
FIG. 58 is an enlarged photograph of FIG. 57.
Figure 59:
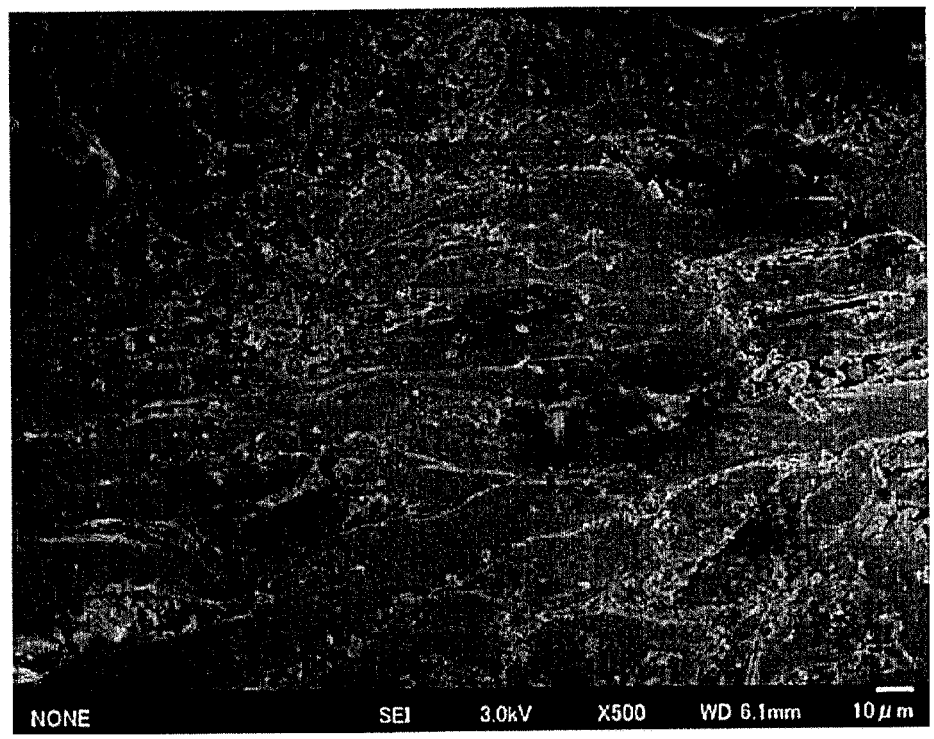
FIG. 59 is an SEM photograph of the surface of multi-layer graphenes coated on a no-woven polyester fabric which was obtained in Example 11.

SEM of the surface of multi-layer graphenes coated on the copying paper is shown in FIG. 57 and FIG. 58 (enlarged photograph of FIG. 57), and SEM of the surface of multi-layer graphenes coated on the polyester non-woven fabric is shown in FIG. 59. The multi-layer graphene-coated substrates were obtained, in which the multi-layer graphenes were coated without a binder on the surfaces of cellulose fibers in the case of the paper and on the surfaces of polyester fibers in the case of the polyester non-woven fabric.

Rubbing/Hot Roll Press/Hot Press

Example 12

Figure 60:
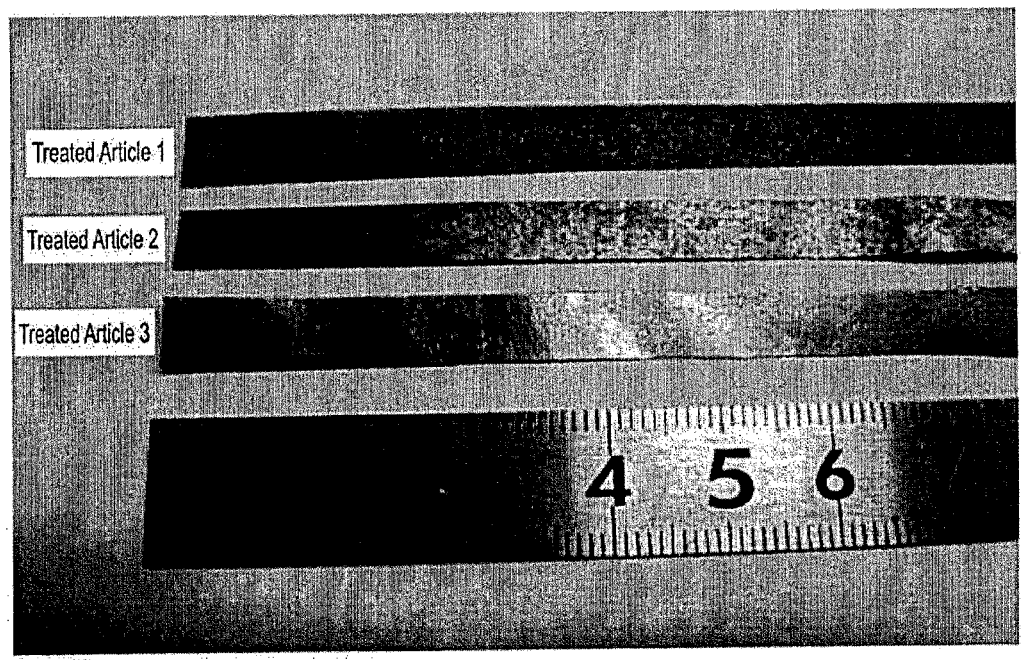
FIG. 60 is a photograph showing an appearance of the substrate coated with multi-layer graphenes of Example 12.

(1) A 110 μm thick polyester non-woven fabric having a weight of 75 g/m² was fixed onto a hot plate, and the temperature of the hot plate was set at 80° C. The polyester non-woven fabric was rubbed with the cluster of multi-layer graphenes obtained in Production Example 13 for lamination (treated article 1).
(2) The treated article 1 was subjected to hot roll press at a feeding rate of 2 cm/sec, a load of 280 N and a roll temperature of 80° C. (treated article 2),
(3) The treated article 2 was subjected to hot press at a hot plate temperature of 80° C. and a load of 10000 N for 10 minutes (treated article 3).
(4) A thickness, a bulk density and resistivity of each of the treated articles 1 to 3 were measured. A photograph showing appearances of the multi-layer graphene-coated substrates of the treated articles 1 to 3 is shown in FIG. 60. The treated article 1 showed a black appearance, and the treated articles 2 and 3 showed a metallic gloss. The multi-layer graphene-coated substrate of the treated article 3 showed the most metallic gloss. The thicknesses of the treated articles 1 to 3 after the coating were 83 μm, 66 μm and 61 μm, respectively, and bulk densities thereof (unit: g/cm³) calculated from their shapes and weights were 1.0, 1.3 and 1.5, respectively. Thus, high density was realized by roll press and hot press treatments. By the achievement of high density, an intrinsic electric resistance was decreased, and the intrinsic electric resistances of the treated articles 1 to 3 were 3.5 Ω·cm, 1.5 Ω·cm and 0.1 Ω·cm. The measurement of the intrinsic electric resistance was carried out with a surface resistance meter (Hiresta UP available from DIA Instruments Co., Ltd.).
(5) The treated article 3 was cut into a disc having a diameter of 10 mm. A double pole cell was produced in a globe box filled with argon gas atmosphere by using a multi-layer graphene-coated substrate dried at 120° C. for one hour as a working electrode, metallic lithium as a counter electrode and LiBF4 as an electrolytic solution, and charge and discharge characteristics were measured at an electric potential within a range from 0 to 3 V at a current density of 40 mA/g. The reversible capacitance and the coulomb efficiency which were measured at 35th cycle of charging and discharging were 210 mAh/g and 90.1%, respectively, and thus, the treated article 3 exhibited sufficient functions as a negative electrode material and a current collector for a lithium ion battery.

(6) The thermal diffusivities of the treated articles 1 to 3 and the polyester non-woven fabric were measured with the thermal diffusivity measuring equipment (Model LaserPIT-M2) available from ULVAC-RIKO, Inc. The thermal diffusivity ($10^{-6}$ m$^2$/S) of the polyester non-woven fabric was 0.02, and in the treated articles 1 to 3, thermal diffusivities thereof were enhanced to 0.318, 0.635 and 2.502, respectively. The obtained thermal diffusivity of the treated article 3 was about 100 times that of the polyester non-woven fabric.

Coating of Dispersion of Residual Graphenes/Hot Roll Press/Hot Press

Example 13

(1) A solvent of 2-propanol which was a reagent of special grade (available from Wako Pure Chemical Industries, Ltd.) was prepared. The weights of the solvent and the cluster of multi-layer graphenes obtained in Production Example 1 were measured so that the weight ratio of the cluster to the solvent would be 0.1 wt %, Then, after mixing of them, the mixture was subjected to shredding treatment at 1000 rpm for 15 minutes with a wet mixer having a metal cutter to shred the cluster of multi-layer graphenes. After that, the solution mixture was charged in a commercially available ultrasonic washer (portable ultrasonic washer W-113 available from HONDA ELECTRONICS), and subjected to application of ultrasonic wave at 42 kHz at an output of 100 W for 30 minutes. The solution mixture after the application of ultrasonic wave turned black since the multi-layer graphenes in the form of flower leaves were dispersed in the solvent from the cluster of multi-layer graphenes. Then, this dispersion was subjected to centrifuging at an acceleration rate of 800 G for 30 minutes. The black residual was collected, and 2-propanol was poured into the residual so that the amount of dispersed graphenes would be 30 wt %, followed by stirring to prepare a dispersion of residual graphenes.

(2) A 110 μm thick polyester non-woven fabric E having a weight of 75 g/m$^2$ and a 50 μm thick polyester non-woven fabric F having a weight of 40 g/m$^2$ were prepared and were placed on a hot plate having been set to 80° C. After coating the dispersion of residual graphenes prepared in (1) above by hand, hot roll press was carried out at a feeding speed of 1 cm/sec at a load of 500 N at a roll temperature of 80° C., and then, hot press treatment was carried out at a heated plate temperature of 80° C. at a load of 10000 N for 10 minutes. The resistances on the coated surface and the back surface thereof were measured with a surface resistance meter (Hiresta UP available from DIA Instruments Co., Ltd.). In the case of the non-woven fabric E, the resistance measured on the coated surface was 10 Ω·cm, and the resistance on back surface could not be measured (the electric resistance was too large and exceeded the measurable range of the meter). Thus, the electrically conductive sheet having thermal conductivity, while the other surface of which was an insulating surface, was obtained by using the thick non-woven fabric. In the case of the non-woven fabric F, the resistances thereof were measured in the same manner. The resistances of the both surfaces were less than 0.1 Ω·cm, and the bulk density was increased up to 1.7.

Spray Coating/Hot Roll Press/Hot Press

Example 14

(1) A solvent of 2-propanol which was a reagent of special grade (available from Wako Pure Chemical Industries, Ltd.) was prepared. The weights of the solvent and the cluster of multi-layer graphenes obtained in Production Example 1 were measured so that the weight ratio of the cluster to the solvent would be 0.1 wt %. Then, after mixing of them, the mixture was subjected to shredding treatment at 1000 rpm for 15 minutes with a wet mixer having a metal cutter to shred the cluster of multi-layer graphenes. After that, the solution mixture was charged in a commercially available ultrasonic washer (portable ultrasonic washer W-113 available from HONDA ELECTRONICS), and subjected to application of ultrasonic wave at 42 kHz at an output of 100 W for 30 minutes. The solution mixture after the application of ultrasonic wave turned black since the multi-layer graphenes in the form of flower leaves were dispersed in the solvent from the cluster of multi-layer graphenes. Then, this dispersion was subjected to centrifuging at an acceleration rate of 800 G for 30 minutes. The supernatant was collected, and a dispersion of multi-layer graphenes having an amount of dispersed graphenes of 0.05 mg/ml was obtained.

Figure 61:
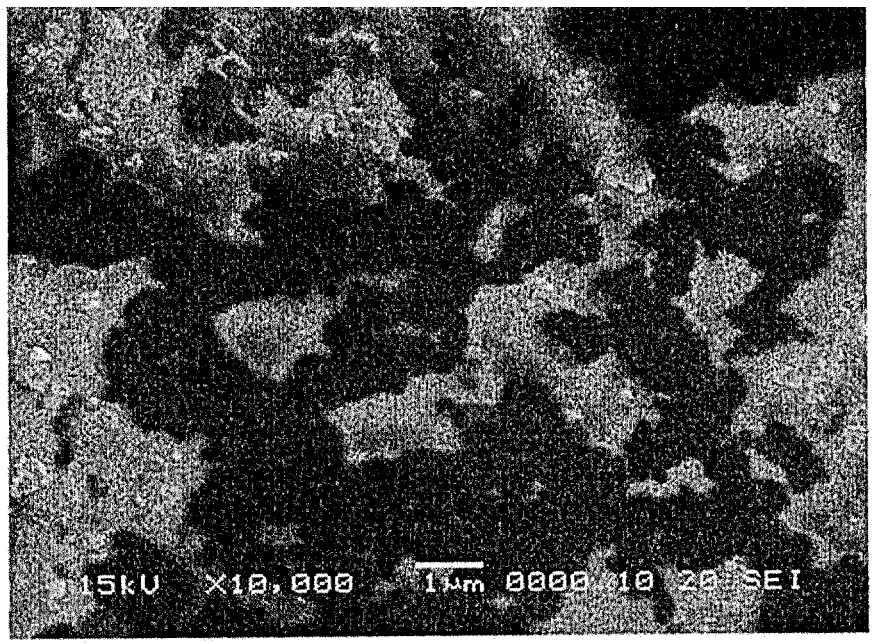
FIG. 61 is an SEM photograph of the surface of the substrate coated with multi-layer graphenes of Example 14.
Figure 61:
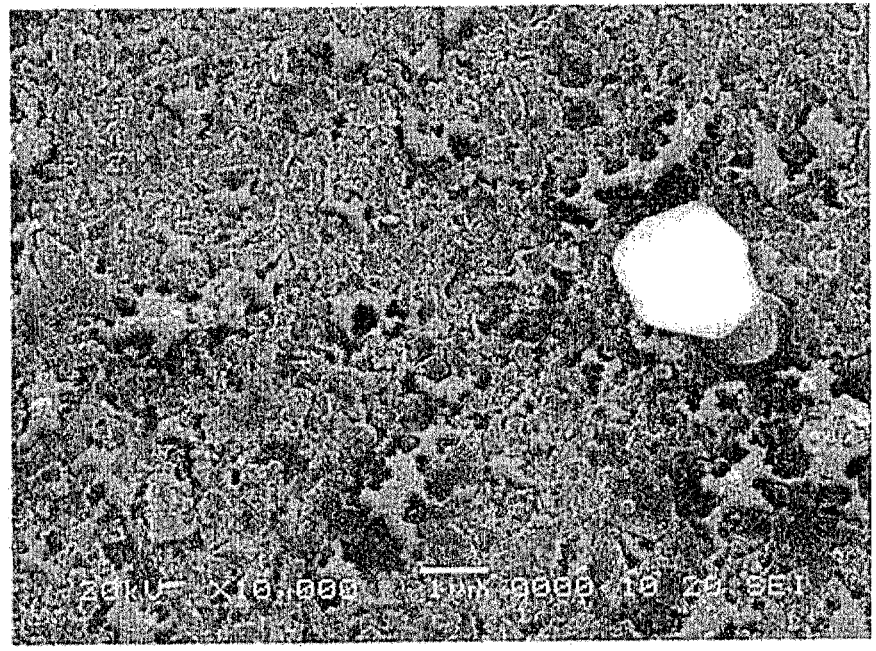

(2) The mini-compressor (type 226) available from KISO POWER TOOL MFG. CO., LTD. was prepared and connected to the air brush (E1307N) available from the same company. The dispersion of multi-layer graphenes prepared in (1) above was charged in the liquid vessel of the air brush, and the pressure inside the vessel was adjusted with an air pressure of 0.2 MPa so that the dispersion could gushed out. The inner diameter of the nozzle of the air brush was 0.4 mm. A 100 μm thick PET film of 50 mm square was placed on the surface of a metallic hot plate having been set to 80° C., a distance between the air brush and the substrate was set to 110 mm, and the 20 ml of dispersion was sprayed onto the film. After the spray coating, roll press was carried out at a load of 400 N between the rolls set to 120° C., and then, 5-minute hot press was conducted with a heated plate set to 140° C. at a load of 10000 N. The resistances on the surface of the laminated film of multi-layer graphenes after the spray coating and the hot press were measured with Hiresta UP available from DIA Instruments Co., Ltd., and light transmittance at a wavelength of 550 nm was measured with a visible ultraviolet spectrophotometer (Aurius CE2021 available from CECIL). The light transmittance immediately after the spray coating was 70%, and the surface resistance was 8000000Ω/□, and after the hot press, the light transmittance was decreased to 55% but the surface resistance was decreased to 1500Ω/□. The surface of the film after the spray coating and further after carrying out the hot roll press and the hot press was observed with FE-SEM (FIG. 61(a): the film after the spray coating, FIG. 61(b): the film after carrying out the hot roll press and the hot press). The state of graphenes being wholly agglomerated was observed, but by carrying out the hot roll treatment and the hot press treatment, the graphenes were adhered flatly on the film, contact points between the graphenes increased, and formation of a conductive path was accelerated.

Single-Fluid Spray-Coating

Example 15

Figure 62:
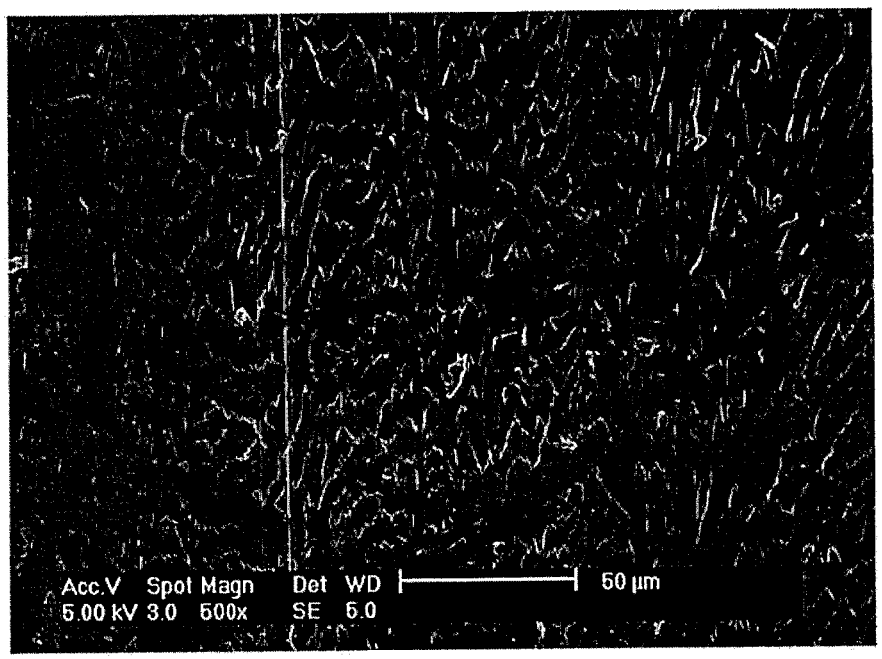
FIG. 62 is an FE-SEM photograph of the surface of the PET film of Example 15, on which a liquid droplet was sprayed.
Figure 62:
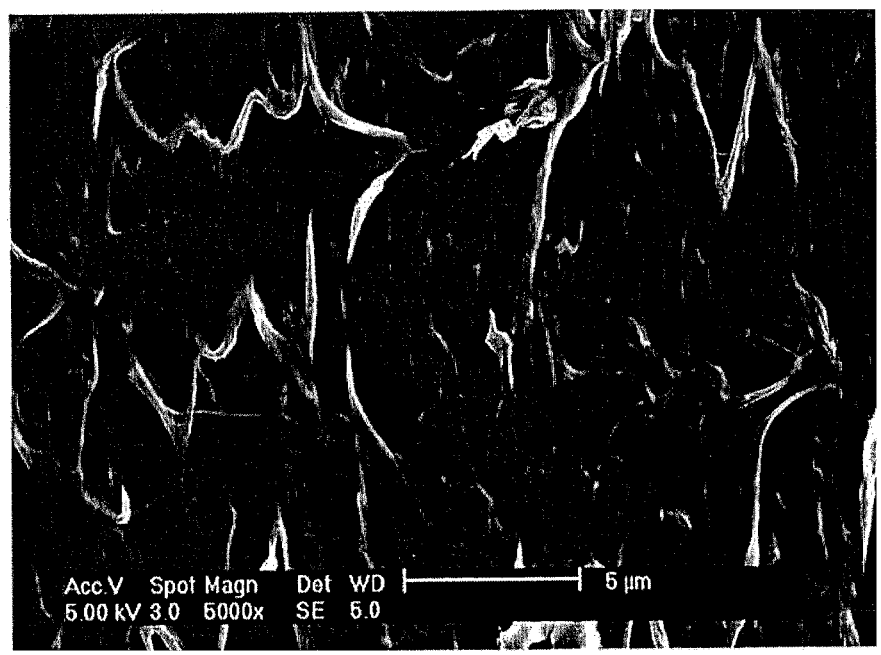
Figure 63:
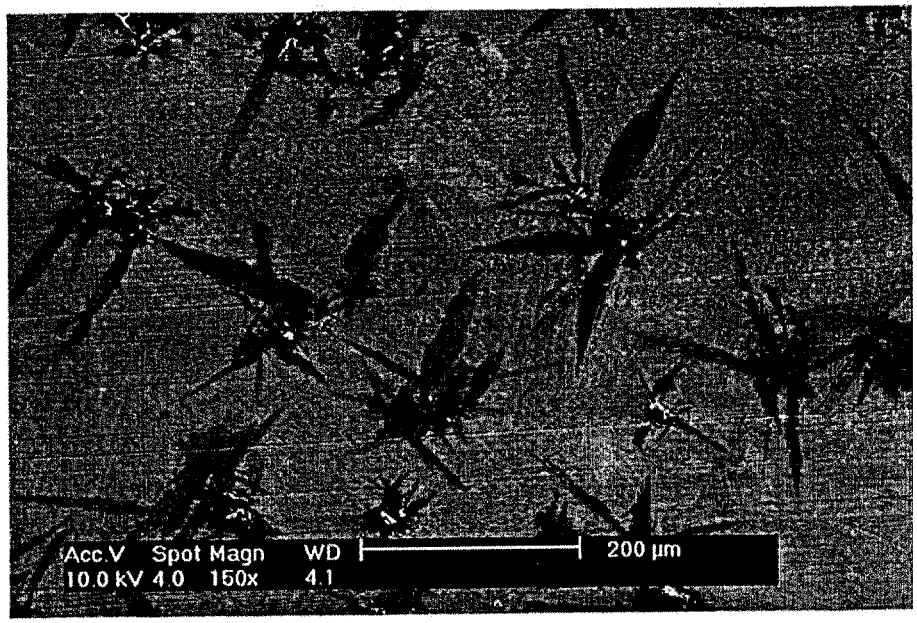
FIG. 63 is an FE-SEM photograph of the surface of the copper sheet of Example 15, on which a liquid droplet was sprayed.
Figure 63:

Single-fluid spray-coating was carried out using the dispersion of multi-layer graphenes prepared in (1) of Example 14 with a precision dispenser for ejecting a trace amount of the dispersion from the inside of a cylinder through a nozzle having a fine tip by an air pressure. Namely, a trace amount of solution droplets having a size of about 500 μm were dropped on a heated substrate at an interval of 0.5 mm using a nozzle having an inner diameter of 100 μm while adjusting an opening/closing time and a distance of a solenoid valve and an applying air pressure for supplying the dispersion. A PET film or a copper sheet was used as a substrate, and the heating temperature was 90° C. The state of the surface of each of the substrates where the dispersion was dropped was observed with FE-SEM (FIG. 62(a): state of the surface of the PET film, FIG. 62(b): enlarged photograph of (a), FIG. 63(a): state of the surface of the copper sheet, FIG. 63(b): enlarged photograph of (a)). Many portions where thin graphenes having a size of about 10 μm had been coated while shrinking in the form of roll were observed. Since in the two-liquid spray coating in Example 14, etc., such thin graphenes were not observed, it can be considered that in the two-liquid method, most of thin graphenes had been blown off due to the air flow. On the contrary, it was confirmed that the single-liquid method was a process suitable for coating thin graphenes since nearly the whole ejected liquid droplets arrived at the surface of the substrate or film.

Cluster of Multi-Layer Graphenes (A)

Production Example 1

A PET resin (an average particle size of 3 mm) in the form of pellet was pre-baked at a maximum ultimate temperature of 600° C. under inert gas atmosphere. An amount of hydrogen remaining in the starting material after the pre-baking was 22000 ppm. The pre-baked starting material was charged in a screw-capped (triangular screw) graphite crucible made of a material having a bulk density of 1.80 and an open pore ratio of 10%, and a screw type top cover was turned to be closed, and thus the crucible containing the pre-baked starting material was sealed. After charging the graphite crucible in hot isostatic pressing equipment, a temperature and pressure inside the equipment were increased to 600° C. and 70 MPa, respectively in one hour using argon gas, and thereafter, heating at a temperature elevating rate of 500° C. per hour and increase in a pressure were continued to reach a maximum ultimate pressure of 190 MPa and a maximum ultimate temperature of 1500° C. Then, the maximum ultimate temperature and pressure were maintained for one hour, and the temperature was reduced to room temperature and the pressure was decreased. The sample obtained after the treatment was a cluster of multi-layer graphenes (true density: 2.08, apparent density: 1.33, bulk density: 0.75, total pore ratio: 63.9).

Production Example 2

Each of samples (Production Examples 2-1 to 2-6) was obtained by treating in the same manner as in Production Example 1 except that a phenol-formaldehyde resin (an average particle size of 20 μm) was used instead of a PET resin as a starting material and that the treating conditions shown in Table 6 were used.

TABLE 6

| | Pre-baking | HIP treatment | | |
|---|---|---|---|---|
| Production Example | temperature ° C. | Heat-up and pressure elevating pattern | Maximum ultimate temperature ° C. | Compressed gas |
| 2-1 | 1000 | Pressure is increased to 140 Ma before temperature reaching 1000° C., followed by heating at 500° C./hr | 2500 | Ar gas |
| 2-2 | 890 | Pressure is increased to 120 Ma before temperature reaching 800° C., followed by heating at 500° C./hr | 2500 | Ar gas |
| 2-3 | 890 | Pressure is increased to 120 Ma before temperature reaching 800° C., followed by heating at 500° C./hr | 2000 | Ar gas |
| 2-4 | 890 | Pressure is increased to 120 Ma before temperature reaching 800° C., followed by heating at 500° C./hr | 2000 | $N_2$ gas |
| 2-5 | 890 | Pressure is increased to 120 Ma before temperature reaching 800° C., followed by heating at 500° C./hr | 1800 | Ar gas |
| 2-6 | 600 | Pressure is increased to 120 Ma before temperature reaching 600° C., followed by heating at 500° C./hr | 1800 | Ar gas |

Production Example 3

A powder of phenol-formaldehyde resin having an average particle size of 20 μm was pre-baked at each of maximum ultimate temperatures of 600° C., 700° C., 900° C. and 1000° C. under inert gas atmosphere. An amount of hydrogen remaining in the starting material after the pre-baking was analyzed, and the results are shown in Table 7. The starting material pre-baked at each temperature was charged in a screw-capped (triangular screw) graphite crucible made of a material having a bulk density of 1.80 and an open pore ratio of 10%, and a threaded top cover was turned to be closed, and thus the crucible containing the pre-baked starting material was sealed. After charging the graphite crucible in hot isostatic pressing equipment, a temperature and pressure inside the equipment were increased to 600° C. and 70 MPa, respectively in one hour using argon gas, and thereafter, heating at a temperature elevating rate of 500° C. per hour and increase in a pressure were continued to reach a maximum ultimate pressure of 190 MPa and each of maximum ultimate temperatures of 1400° C., 1800° C., 2000° C. and 2500° C. Then, the maximum ultimate temperature and pressure were maintained for one hour, and the temperature was reduced to room temperature and the pressure was decreased. A period of time required from charging of the graphite crucible up to taking out thereof was 8 to 12 hours. A bulk density, a pore ratio and a true density of the treated sample were measured, and the results are shown in Table 7.

TABLE 7

| | Pre-baking (sintering) | | Hot isostatic pressing treatment | | | Physical properties of material after treatment | | |
|---|---|---|---|---|---|---|---|---|
| Production Example No. | Pre-baking ° C. | Amount of remaining hydrogen ppm | Temp. ° C. | Pressure MPa | Residence time hr | True density g/cm$^3$ | Bulk density g/cm$^3$ | Pore ratio % |
| 3-1 | 600 | 20000 | 1400 | 190 | 1 | 2.16 | 0.66 | 69 |
| 3-2 | | | 1800 | 190 | 1 | 2.16 | 0.63 | 71 |
| 3-3 | 700 | 10000 | 1800 | 190 | 1 | 2.09 | 0.58 | 72 |
| 3-4 | | | 1800 | 190 | 1 | 1.88 | 0.68 | 64 |
| 3-5 | 900 | 5000 | 2000 | 190 | 1 | 1.93 | 0.99 | 49 |
| 3-6 | | | 2500 | 190 | 1 | 1.73 | 1.15 | 34 |
| 3-7 | 1000 | 2000 | 2000 | 190 | 1 | 1.83 | 1.01 | 45 |

Figure 26:
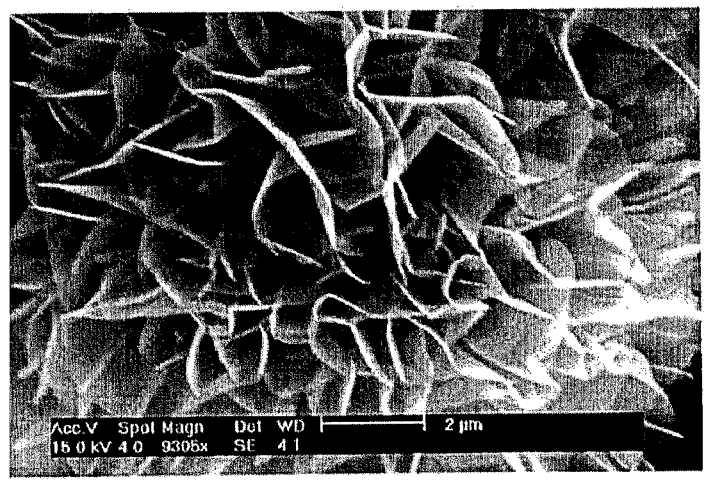
FIG. 26 is a photograph showing a high magnification image of FIG. 25.
Figure 27:
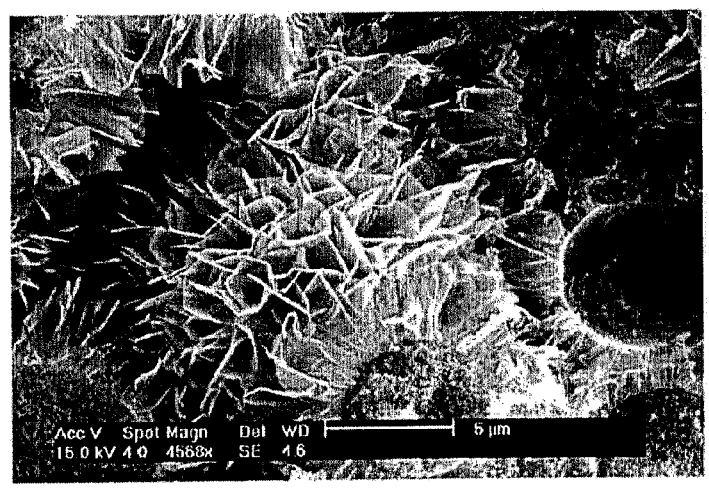
FIG. 27 is an SEM photograph showing a broken surface of the product of Production Example 3-1.

As shown in Table 7, in the case of a pre-baking temperature of 600° C. and an amount of remaining hydrogen of 20000 ppm measured by the above-mentioned measuring method, a true density being most approximate to a theoretical density of graphite was obtained (Production Examples 3-1 and 3-2), and as a pre-baking temperature increased, a value of a true density decreased (Production Examples 3-3 and 3-4). In the case of a pre-baking temperature of 900° C. and an amount of remaining hydrogen of 5000 ppm measured by the above-mentioned measuring method, a true density was 1.88 (Production Example 3-4). In the case of a pre-baking temperature of 900° C. or 1000° C. and a maximum ultimate temperature of 2000° C. or 2500° C. at the hot isostatic pressing treatment, any of true densities are less than 2.0. FIG. 25 is an electron micrograph of a surface of the sample of Production Example 3-1, and FIG. 26 is an expanded electron micrograph of the surface of FIG. 25. FIG. 27 is an electron micrograph of a broken surface of the sample of Production Example 3-1, and graphenes are vapor-grown radially on a surface of the spherical pre-baked starting material.

Figure 28:
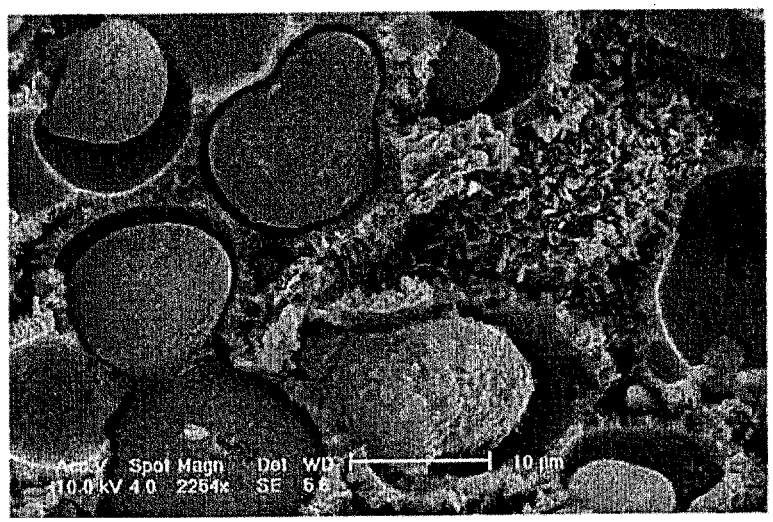
FIG. 28 is an SEM photograph showing a broken surface of the product of Production Example 3-5.

FIG. 28 is an electron micrograph showing a broken surface of the sample of Production Example 3-5, and FIG. 29 is an electron micrograph showing a broken surface of the sample of Production Example 3-6. As compared with Production Example 3-1, a degree of growth of graphenes is low, and especially in the case of Production Example 3-6, a trace of etching of graphite due to hydrogen excited at a high temperature of 2000° C. or more was recognized.

Figure 30:
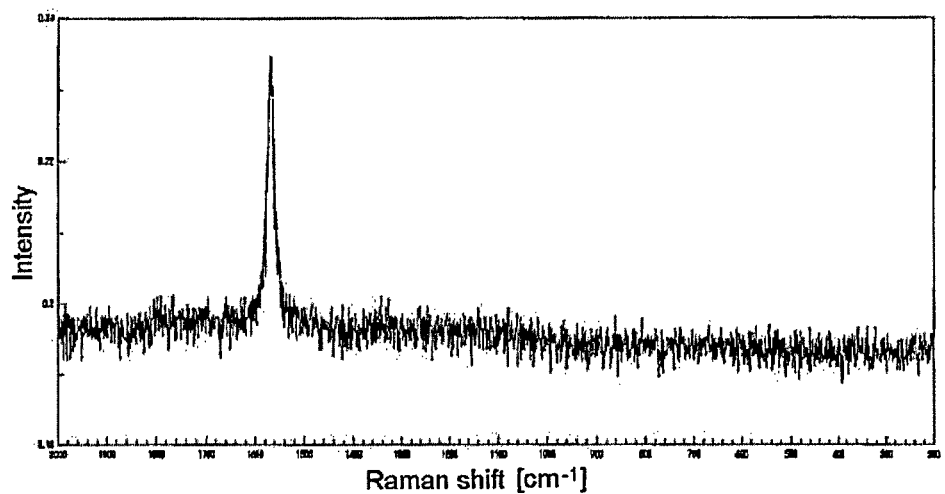
FIG. 30 shows a measuring result of Raman spectroscopic spectrum of Production Example 3-1.
Figure 31:
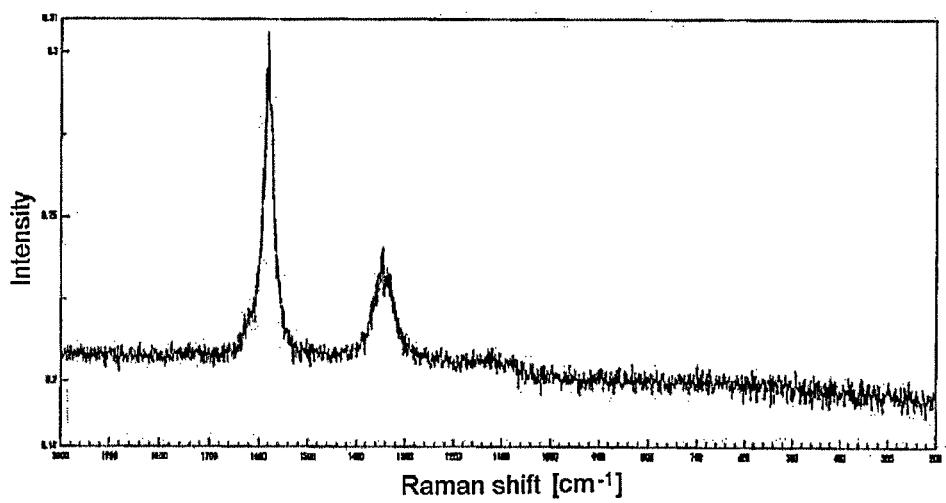
FIG. 31 shows a measuring result of Raman spectroscopic spectrum of Production Example 3-5.

FIG. 30 shows the measuring results of a spectrum of Production Example 3-1 with Raman spectroscopy. A sharp peak of SP$^2$ graphite bonding around 1580 cm$^{-1}$ was recognized, and a peak around 1360 cm$^{-1}$ showing a turbostratic structure was hardly recognized. An R value represented by its intensity ratio of I1360/I1580 ($I_D/I_G$) was a value being close to zero, and the structure was one having very good crystallinity. On the other hand, the measuring results of a spectrum of Production Example 3-5 with Raman spectroscopy is shown in FIG. 31. A peak around 1360 cm$^{-1}$ was observed, and its intensity ratio of I1360/I1580 ($I_D/I_G$) was a large value.

Production Example 4

Figure 32:
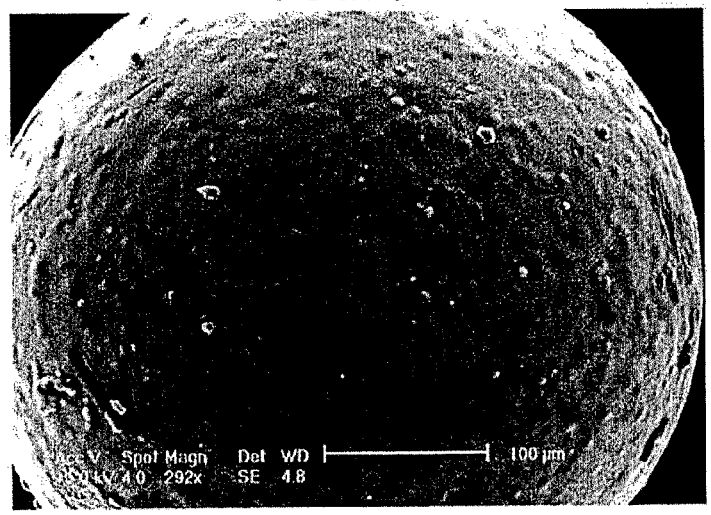
FIG. 32 is an SEM photograph showing the surface of the product of Production Example 4.
Figure 33:
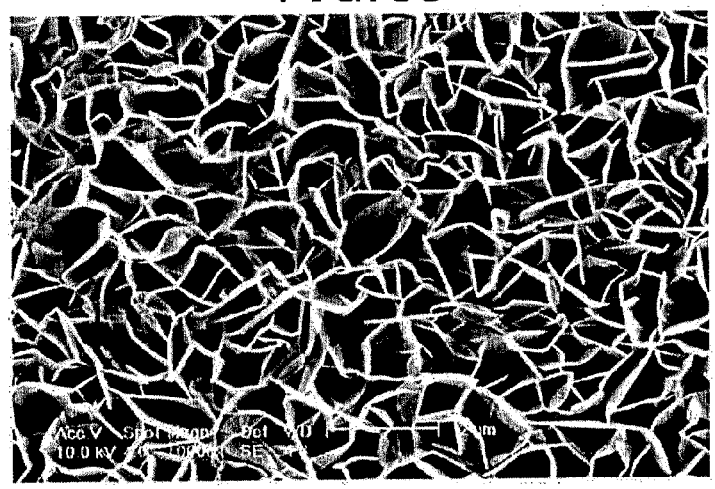
FIG. 33 is a photograph showing a high magnification image of FIG. 32. A bar in this photograph represents 2 μm.

A powder of phenol-formaldehyde resin having an average particle size of 500 μm was pre-baked at a maximum ultimate temperature of 600° C. under inert gas atmosphere. The pre-baked starting material was treated in the same manner as in Production Example 3 except that a maximum ultimate temperature during the hot isostatic pressing treatment was 1400° C. A period of time required from charging of the graphite crucible up to taking out thereof was 12 hours. An electron micrograph of the treated sample is shown in FIG. 32, and an expanded photograph of the surface thereof is shown in FIG. 33. Vapor-phase-grown graphite grown radially over the whole surfaces of the spherical particles was recognized, but a bulk structure comprising bonded particles was not obtained. A true density of the obtained sample was 1.80.

Production Example 5

A waste PET beverage bottle was finely cut into an average particle size of about 200 μm (a size of the longest portion in lengthwise and crosswise directions) and was pre-baked at a maximum ultimate temperature of 600° C. under inert gas atmosphere. The pre-baked starting material was pulverized into particles in a stainless steel mortar, and was then treated in the same manner as in Production Example 4. A period of time required from charging of the graphite crucible up to taking out thereof was 12 hours. An electron micrograph of the treated sample is shown in FIG. 34. Graphenes grown approximately radially over the whole surfaces of the irregular particles were recognized. A true density of the obtained sample was 1.90.

Production Example 6

A powder of phenol-formaldehyde resin having an average particle size of 20 μm was pre-baked at a maximum ultimate temperature of 700° C. under inert gas atmosphere. The pre-baked starting material was charged in each of graphite crucibles shown in Table 8, and a screw type top cover was tightened to seal the crucible containing the pre-baked starting material. The graphite crucibles were treated in the same manner as in Production Example 4 except that a maximum ultimate temperature during the hot isostatic pressing treatment was 1500° C.

TABLE 8

| Production Example No. | Graphite crucible | | | | | Spacer Material: Glassy carbon | Sleeve Material: Glassy carbon | True density of treated sample g/cm³ |
|---|---|---|---|---|---|---|---|---|
| | Bulk density g/cm³ | Pore ratio % | Screw | | | | | |
| | | | Type | Pitch | No. of threads | | | |
| 6-1 | 1.85 | 8 | Triangular screw | 1 | 16 | Nil | Nil | 2.17 |
| 6-2 | 1.8 | 10 | Triangular screw | 1 | 16 | Nil | Nil | 2.16 |
| 6-3 | 1.6 | 23 | Triangular screw | 1 | 16 | Nil | Nil | 2.05 |
| 6-4 | 1.85 | 8 | Triangular screw | 1 | 3 | Nil | Nil | 2.01 |
| 6-5 | 1.85 | 8 | Triangular screw | 1 | 5 | Nil | Nil | 2.05 |
| 6-6 | 1.85 | 8 | Triangular screw | 2 | 8 | Nil | Nil | 1.99 |
| 6-7 | 1.85 | 8 | Square screw | 1 | 16 | Nil | Nil | 1.98 |
| 6-8 | 1.85 | 8 | Trapezoidal screw | 1 | 16 | Nil | Nil | 2.03 |
| 6-9 | 1.85 | 8 | Triangular screw | 1 | 16 | used | Nil | 2.19 |
| 6-10 | 1.85 | 8 | Triangular screw | 1 | 16 | used | used | 2.23 |

When the graphite crucible made of a material having a higher pore ratio and a lower bulk density is used, a true density of the treated sample becomes less (Production Examples 6-1 to 6-3). When the pitch of the thread of the graphite crucible is 2 mm (Production Example 6-6) and the number of threads is small (Production Examples 6-4 and 6-5), a true density thereof is low as compared with Production Example 6-1, As compared with the case where the screw of the graphite crucible is triangular (Production Example 6-1), a low true density was obtained in the case of a square screw (Production Example 6-7) and a trapezoidal screw (Production Example 6-8).

When charging the pre-baked starting material in a graphite crucible and then sealing, in the case of producing a spacer from glassy carbon having low air permeability and a pore ratio of 0% and setting the spacer to cover the whole top and bottom of the pre-baked starting material (FIG. 4, Production Example 6-9), a true density increased up to 2.19. Further, in Production Example 6-10, in which in addition to these spacers, a sleeve was used so as to cover the whole side surface of the pre-baked starting material (FIG. 6), a true density of 2.23 was obtained.

Mass of Multi-Layer Graphenes (B) in the Form of Thin Film

Production Example 7

Figure 35:
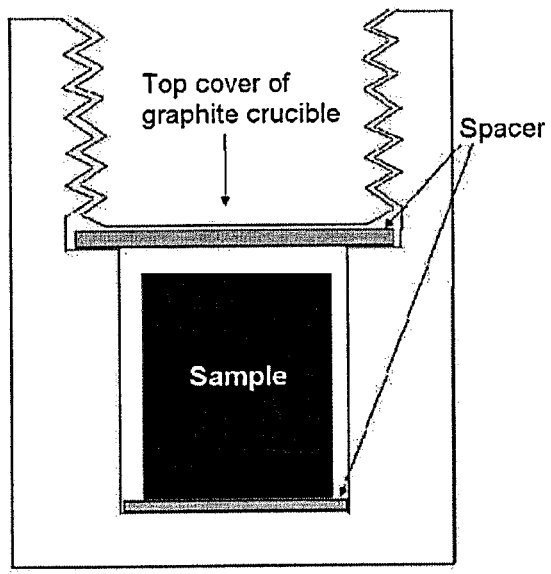
FIG. 35 is a diagrammatic view showing the structures of the graphite crucible and the glassy carbon spacer used in Production Example 7 and a state of the sample filled.

A powder of phenol-formaldehyde resin having an average particle size of 20 μm was pre-baked at a maximum ultimate temperature of 500° C. under inert gas atmosphere. An amount of hydrogen remaining in the starting material after the pre-baking was 40000 ppm. The pre-baked starting material was charged in a screw type graphite crucible made of a material having a bulk density of 1.80 and an open pore ratio of 10% with the pre-baked starting material being interposed between the spacers made of glassy carbon, and a screw type top cover was turned to be closed, and thus the crucible containing the pre-baked starting material was sealed. As shown in FIG. 35, the screw of the top cover of the graphite crucible was tightened so that the top spacer is brought into close contact with a guide portion of the graphite crucible by a tightening force of the screw, and thereby, a degree of sealing is increased. After charging the graphite crucible in hot isostatic pressing equipment, a temperature and pressure inside the equipment were increased to 700° C. and 70 MPa, respectively in one hour using argon gas, and thereafter, heating at a temperature elevating rate of 500° C. per hour and increase in a pressure were continued to reach a maximum ultimate pressure of 190 MPa and a maximum ultimate temperatures of 1800° C. Then, the maximum ultimate temperature and pressure were maintained for one hour, and the temperature was reduced to room temperature and the pressure was decreased. The spacers made of glassy carbon were those subjected to mirror grinding.

Figure 36:
FIG. 36 is a photograph showing an appearance of the generated film-like product formed on the surface of the glassy carbon spacer and consisting of vapor-phase-grown graphite (multi-layer graphene) in Production Example 7.
Figure 37:
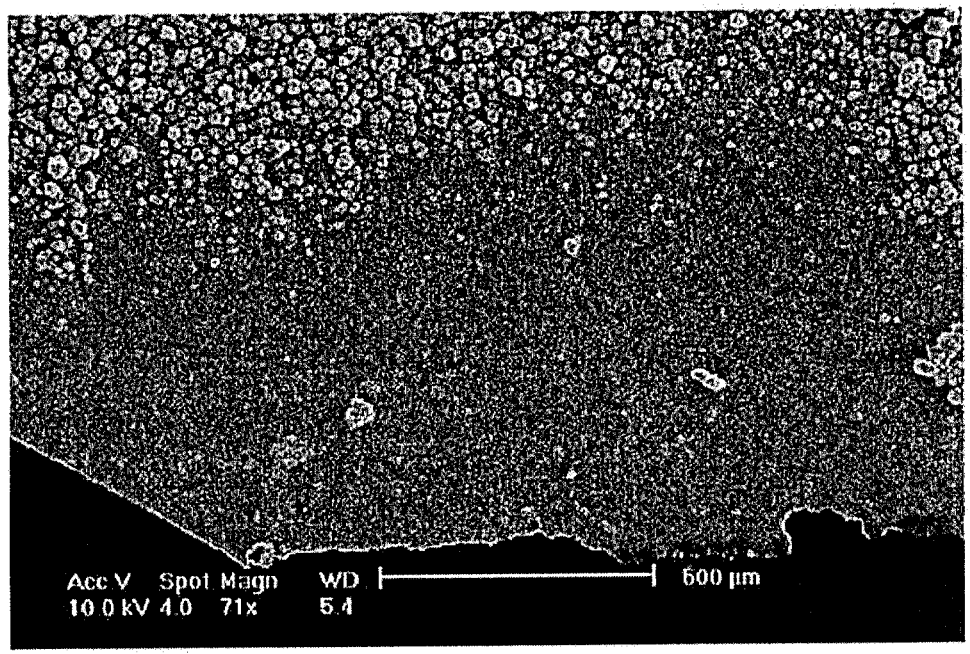
FIG. 37 is a photograph by SEM of the edge of the film-like product generated in Production Example 7.
Figure 38:
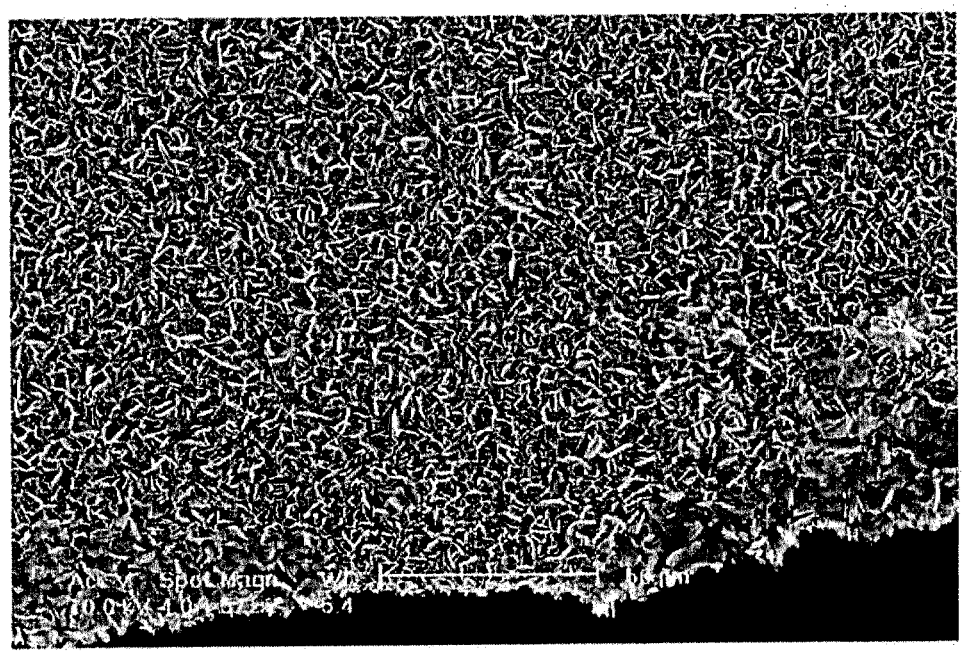
FIG. 38 is an enlarged photograph by SEM of the portion which looks flat in FIG. 37.
Figure 39:
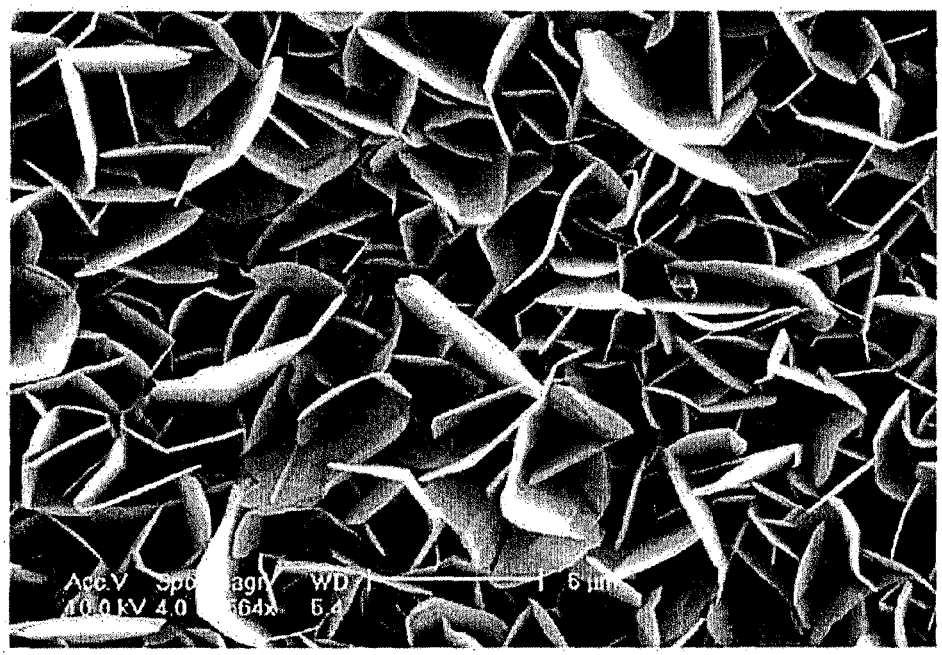
FIG. 39 is an enlarged photograph of FIG. 38.
Figure 40:
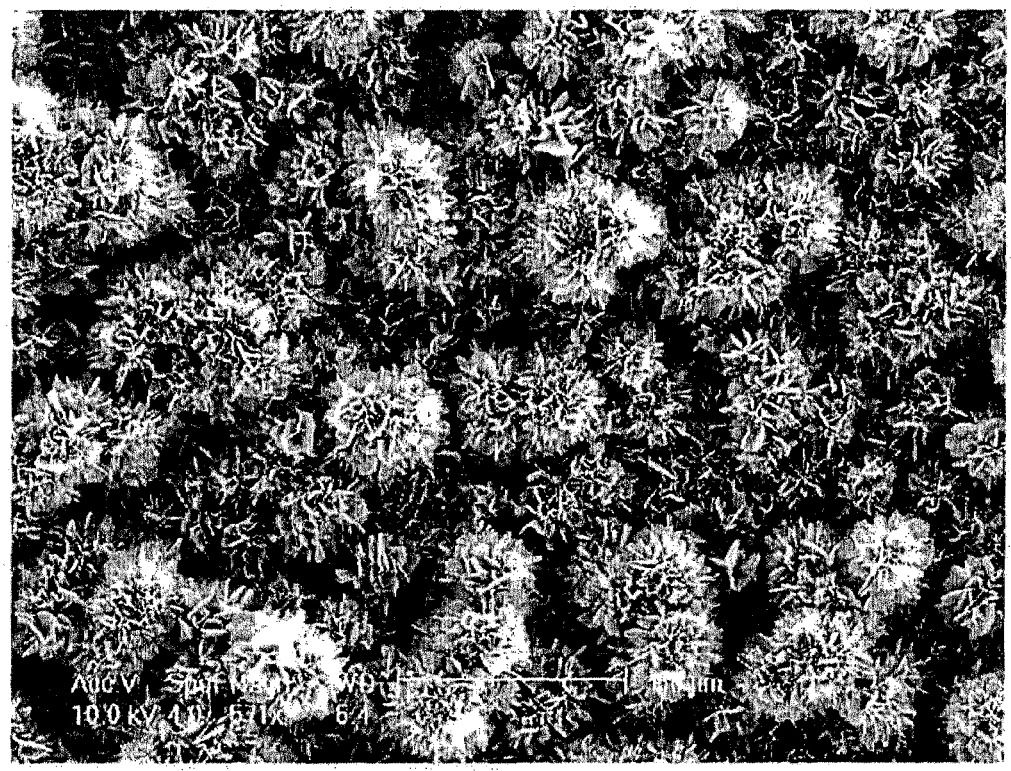
FIG. 40 is an enlarged photograph by SEM of the portion which looks like a protruding portion in FIG. 37.
Figure 41:
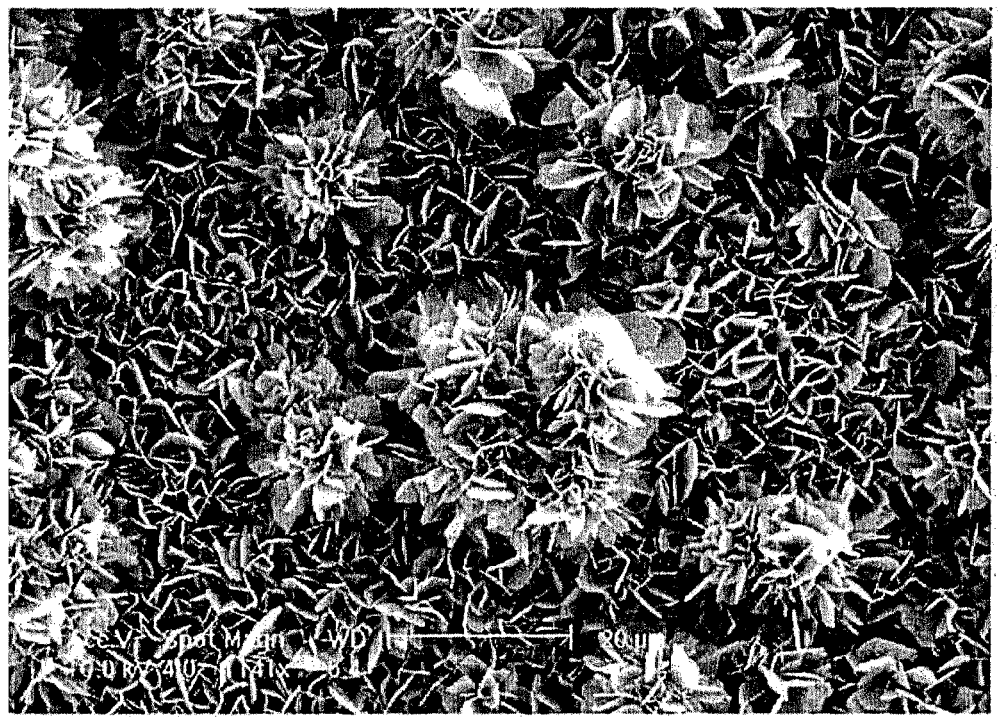
FIG. 41 is an enlarged photograph of FIG. 40.

When taking out the treated sample, a film-like product of silver color having a metallic gloss had been deposited on the spacer made of glassy carbon, as shown in FIG. 36. This film-like product could be peeled easily from the spacer, and had strength enough for working as a thin film. When the surface of the obtained film-like product was observed with an electron microscope, a state of each of multi-layer graphenes being grown approximately vertically to the surface of the spacer and being aggregated was observed as one embodiment of a mass of multi-layer graphenes obtained by aggregation of multi-layer graphenes extending from the inside toward the outside. Also, multi-layer graphenes grown like flower leaves (the cluster of multi-layer graphenes) were included therein. (FIGS. 37 to 41)

Mass of Multi-Layer Graphenes (C) in the Form of Fiber

Production Example 8

A powder of phenol-formaldehyde resin having an average particle size of 20 μm was pre-baked at a maximum ultimate temperature of 600° C. under inert gas atmosphere. The pre-baked starting material was charged in a screw type graphite crucible made of a material having a bulk density of 1.80 and an open pore ratio of 10%, and a screw type top cover was turned to be closed, and thus the crucible containing the pre-baked starting material was sealed. After charging the graphite crucible in hot isostatic pressing equipment, a temperature and pressure inside the equipment were increased to 700° C. and 70 MPa, respectively in one hour using argon gas, and thereafter, heating at a temperature elevating rate of 300° C. per hour and increase in a pressure were continued to reach a maximum ultimate pressure of 190 MPa and a maximum ultimate temperature of 1400° C. Then, the maximum ultimate temperature and pressure were maintained for one hour, and the temperature was reduced to room temperature and the pressure was decreased. An apparent density of the treated sample was 1.60, and a true density thereof was 2.09.

Figure 42:
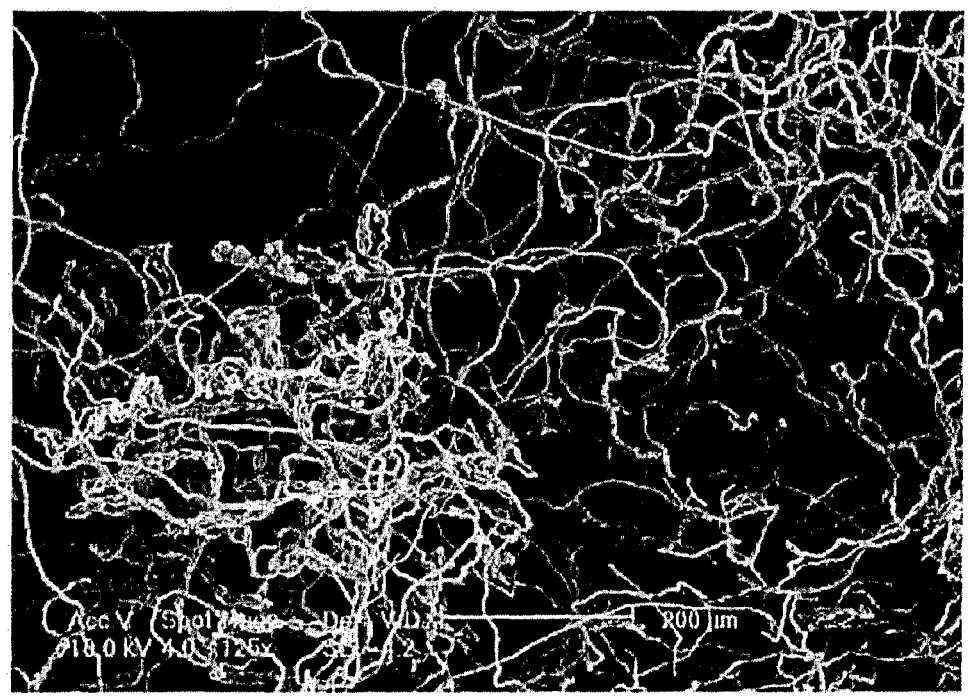
FIG. 42 is a photograph by SEM of the product formed on the surface of the sample in Production Example 8.
Figure 43:
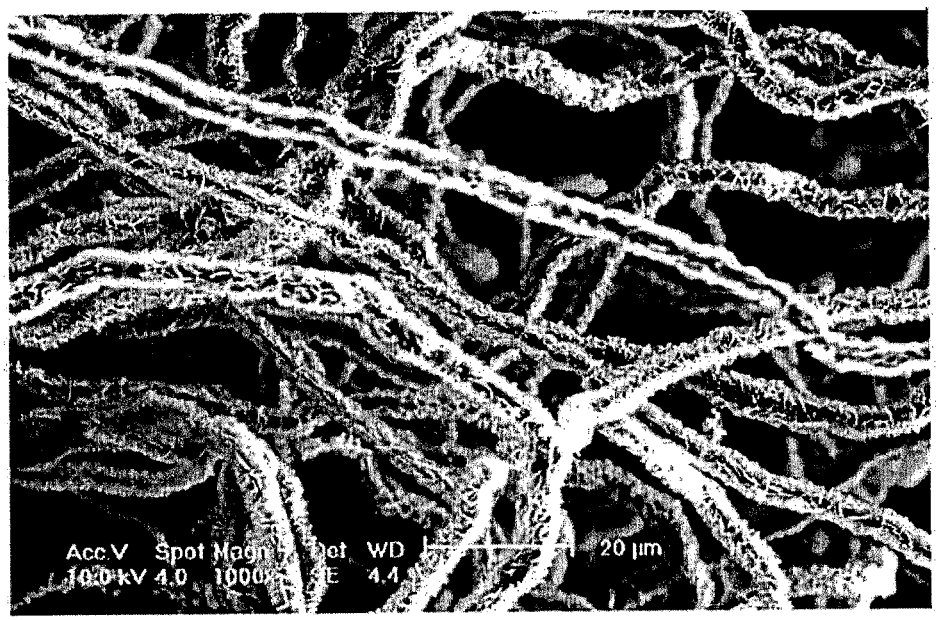
FIG. 43 is an enlarged photograph of FIG. 42.
Figure 44:
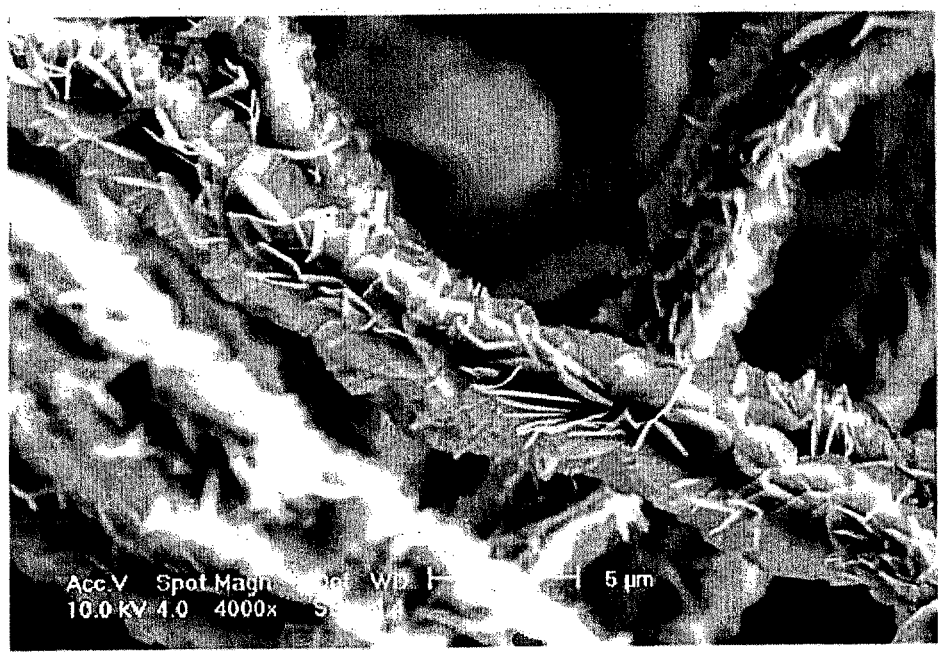
FIG. 44 is an enlarged photograph of FIG. 43.

On the treated sample, vapor-phase-grown fibers having a diameter of several microns and a length of from several microns to several millimeters were generated (FIGS. 42 to 44). These fibers showed one embodiment of the mass of multi-layer graphenes formed by aggregation of multi-layer graphenes extending from the inside toward the outside, and were in the special form resulting from the growth of multi-layer graphenes from the center of the fibers toward the outside thereof. Though these fibers existed even inside the material, there were fairy long fibers growing around the surface portion.

Production Example 9

Treatment was carried out in the same manner as in the preceding Production Example except that in the HIP treatment, after having reached 700° C., the inside temperature was increased at a temperature elevating rate of 700° C. per hour and a maximum ultimate temperature was set to 1450° C. An apparent density of the treated sample was 1.66, and a true density thereof was 2.05.

Figure 45:
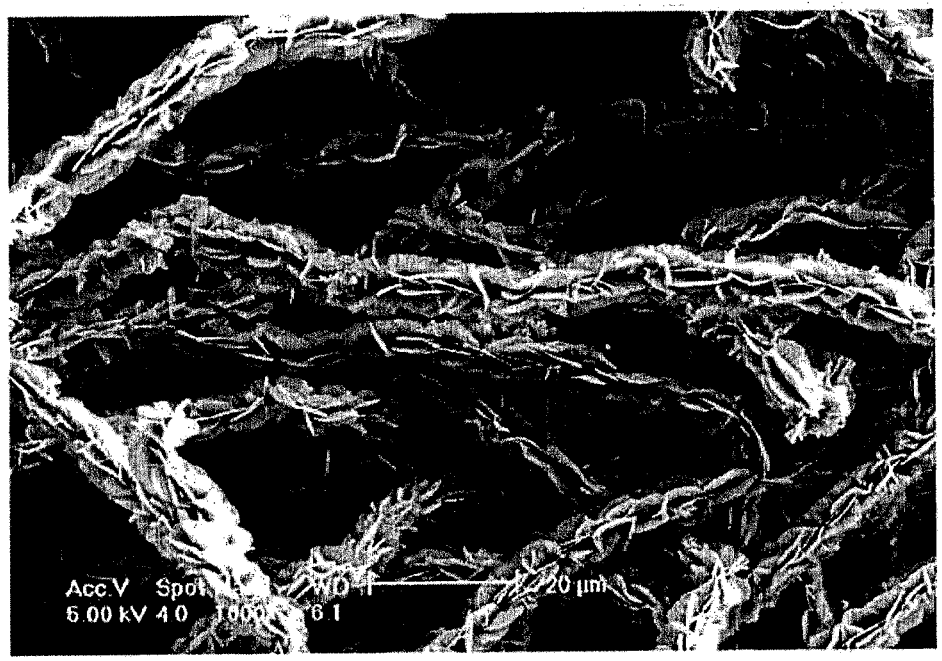
FIG. 45 is a photograph by SEM of the product of Production Example 9.
Figure 46:
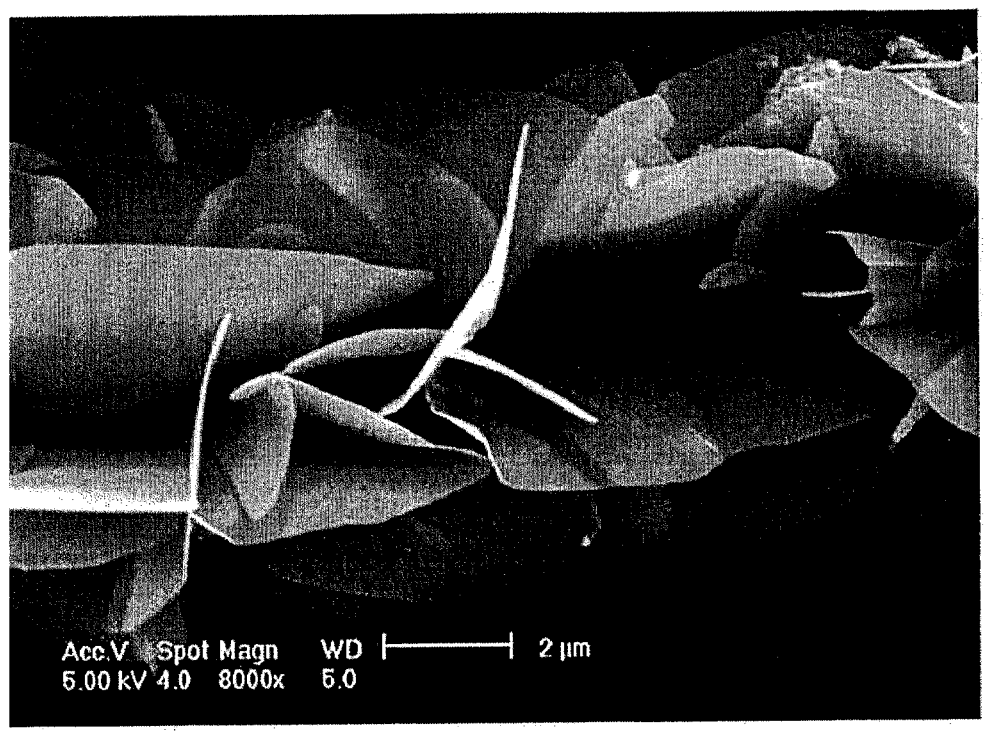
FIG. 46 is an enlarged photograph of FIG. 45.

On the treated sample, the products in the same form as in the preceding Production Example had been formed (FIGS. 45 and 46).

Production Example 10

Treatment was carried out in the same manner as in the preceding Production Example except that a maximum ultimate temperature during pre-baking was set to 500° C. and in the HIP treatment, after having reached 700° C., the inside temperature was increased at a temperature elevating rate of 500° C. per hour and a maximum ultimate temperature was set to 1800° C. An apparent density of the treated sample was 1.77, and a true density thereof was 2.07.

Figure 47:
FIG. 47 is a photograph by SEM of the product of Production Example 10.
Figure 48:
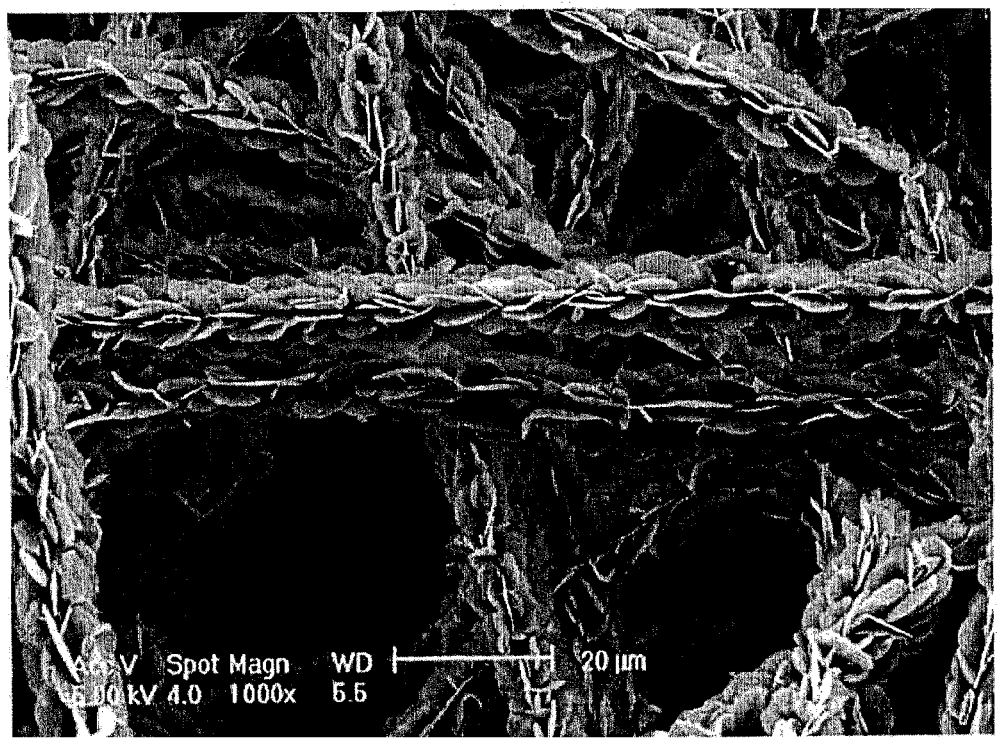
FIG. 48 is an enlarged photograph of FIG. 47.

On the treated sample, the products in the same form as in the preceding Production Example had been formed (FIGS. 47 and 48).

Cluster of Multi-Layer Graphenes (A)

Production Example 11

Figure 49:
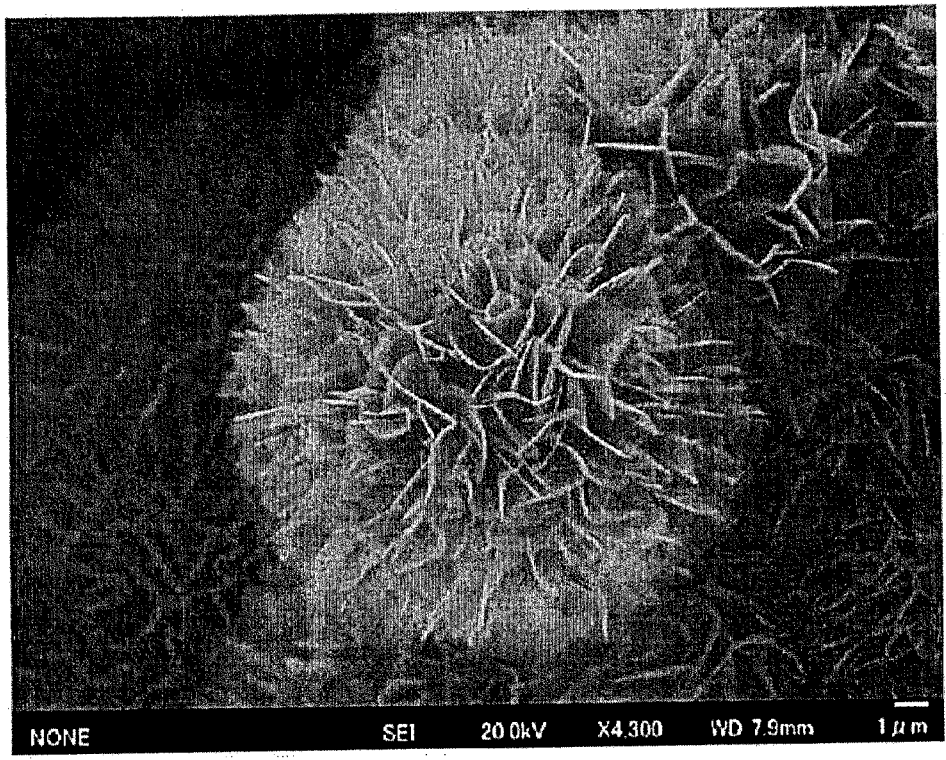
FIG. 49 is a photograph by SEM of the cluster of the multi-layer graphenes generated in Production Example 11.
Figure 50:
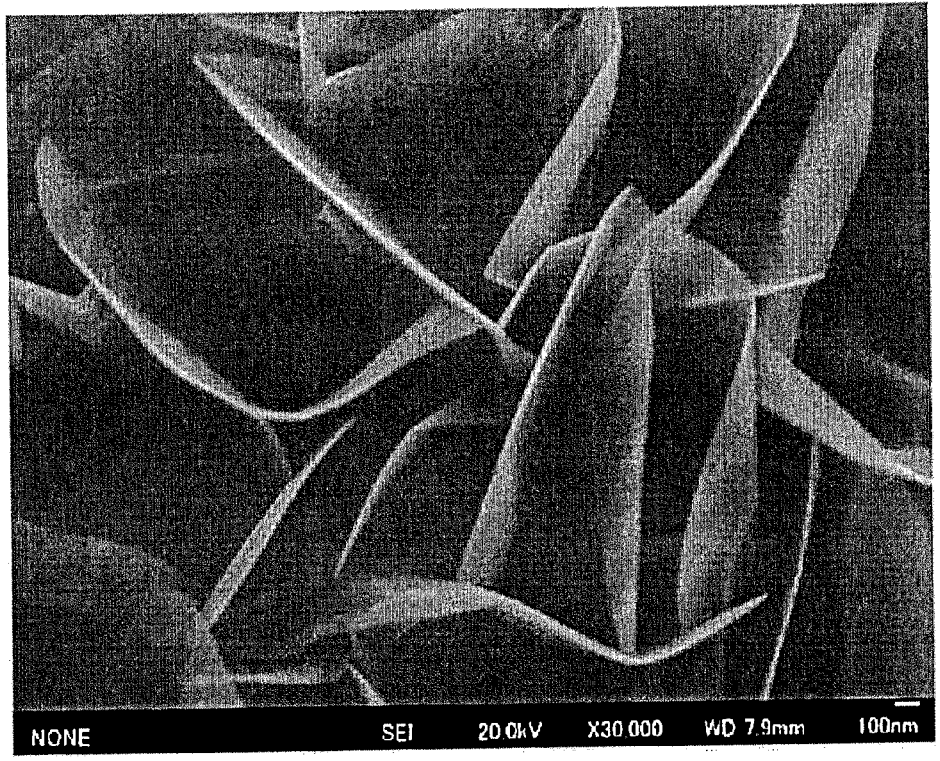
FIG. 50 is an enlarged photograph of FIG. 49.

A phenol formaldehyde resin powder having an average particle size of 20 μm was pre-baked at a maximum ultimate temperature of 600° C. under inert gas atmosphere. An amount of hydrogen remaining in the starting material after the pre-baking was 20000 ppm. The pre-baked starting material was charged in a screw type graphite crucible made of a material having a bulk density of 1.80 and an open pore ratio of 10%, and a screw type top cover was turned to be closed, and thus the crucible containing the pre-baked starting material was sealed. After charging the sealed graphite crucible in hot isostatic pressing equipment, a temperature and pressure inside the equipment were increased to 700° C. and 70 MPa, respectively in one hour using argon gas, and thereafter, heating at a temperature elevating rate of 500° C. per hour and increase in a pressure were continued to reach a maximum ultimate pressure of 190 MPa and a maximum ultimate temperature of 1800° C. Then, the maximum ultimate temperature and pressure were maintained for one hour, and the temperature was reduced to room temperature and the pressure was decreased. A true density of the obtained product in the form of bulk was 2.17. An SEM of the obtained vapor-phase-grown graphite is shown in FIG. 49, and an enlarged SEM thereof is shown in FIG. 50. Multi-layer graphenes extending from the inside toward the outside are aggregated to form a cluster.

Cluster of Multi-Layer Graphemes (D) Obtained by Cleaving

Production Example 12

Figure 51:
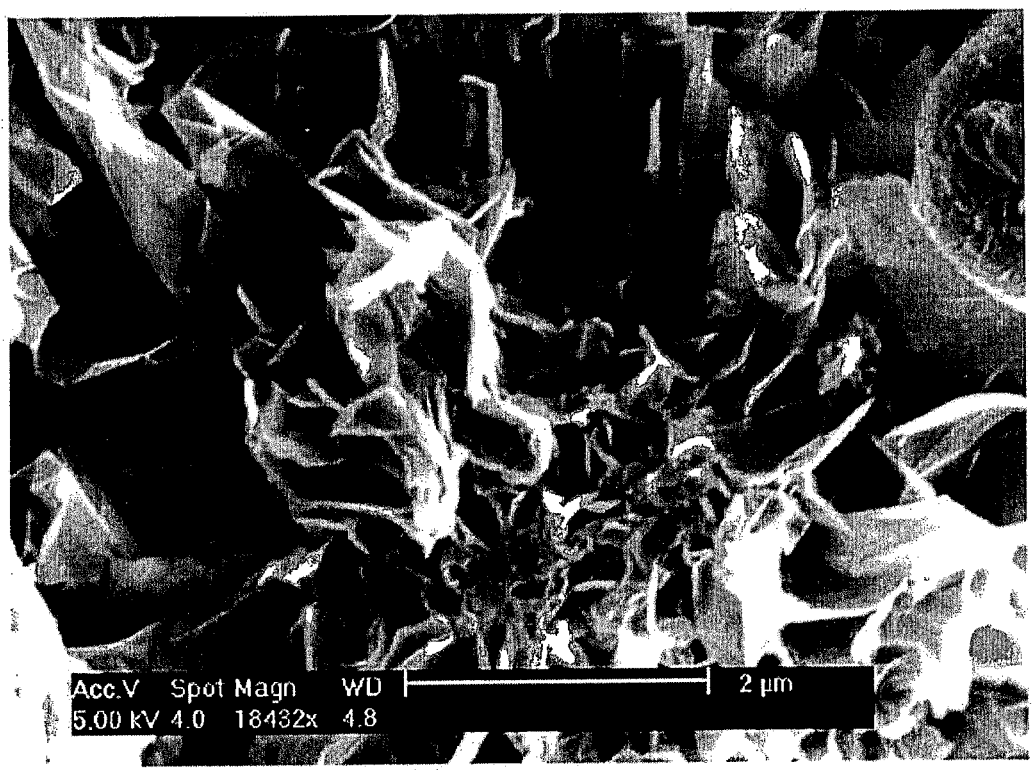
FIG. 51 is a cluster of the multi-layer graphenes obtained by subjecting the multi-layer graphenes of the cluster of the multi-layer graphenes of the present invention to partial cleaving (Production Example 12).
Figure 52:
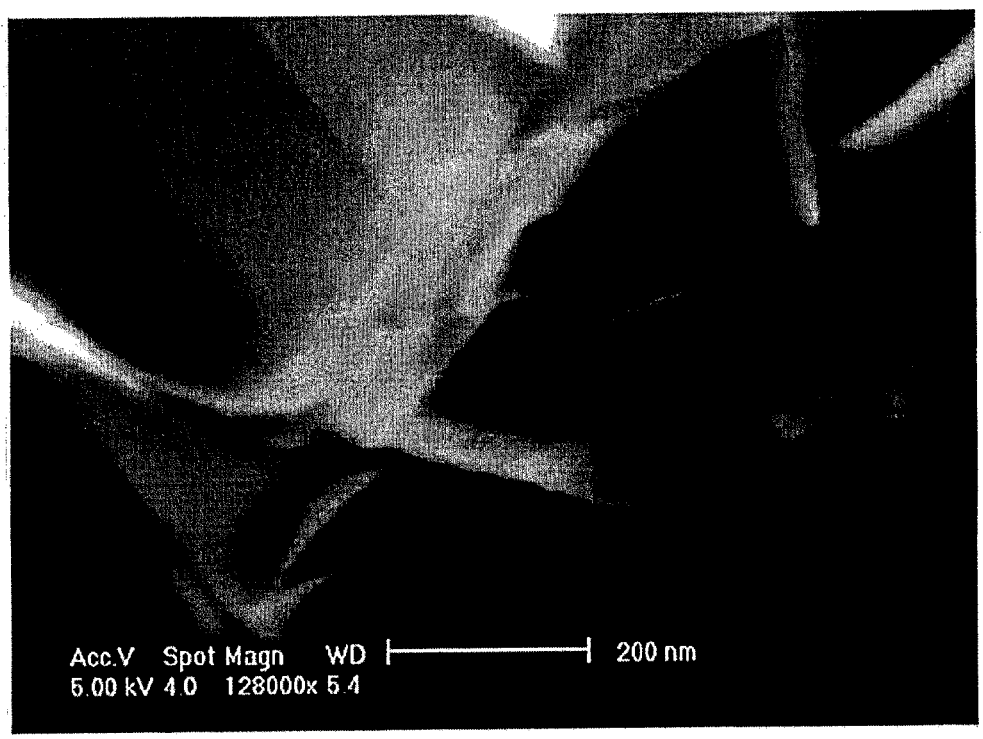
FIG. 52 is an enlarged photograph of FIG. 51.

Into an Erlenmeyer flask made of glass was poured 5 g of the cluster of multi-layer graphenes of Production Example 3-2, and a solution mixture containing 80 ml of concentrated sulfuric acid and 20 ml of concentrated nitric acid was added thereto, followed by 24-hour reaction while stirring with a stirrer made of Teflon (registered trademark). In about 30 minutes after the starting of the reaction, the massive sample started collapsing gradually due to generation of a graphite-sulfuric acid intercalation compound in which sulfuric acid ion was intercalated between the graphite layers. After completion of the reaction, the mixture was formed into a solution containing fine particles dispersed therein. After the reaction, the sample was dried and charged in a magnetic ceramic crucible, and the magnetic crucible containing the sample was charged in an electric oven heated to 700° C., followed by rapid heat treatment. By the rapid heat treatment in the electric oven set to 700° C., the heat-treated sample was expanded to a volume three times as large as the initial volume. FIGS. 51 and 52 show SEM of the heat-treated sample, and it was observed that the multi-layer graphene was in a state of being cleaved into thinner multi-layer graphene since sulfuric acid ion was decomposed and released rapidly from between the multi-layer graphene layers due to the heat treatment.

Cluster of Multi-Layer Graphenes (A)

Production Example 13

A PET resin (an average particle size of about 3 mm) in the form of pellet was pre-baked at a maximum ultimate temperature of 600° C. under inert gas atmosphere. The starting material after the pre-baking (pre-baked starting material) was pulverized and classified to obtain a pre-baked starting material having an average particle size of from about 10 μm to about 100 μm. An amount of hydrogen remaining in the pre-baked starting material was 22000 ppm. The pre-baked starting material was charged in a screw type (triangular screw) graphite crucible made of a material having a bulk density of 1.80 and an open pore ratio of 10%, and a screw type top cover was turned to be closed, and thus the crucible containing the pre-baked starting material was sealed. After charging the graphite crucible in hot isostatic pressing equipment, a temperature and pressure inside the equipment were increased to 600° C. and 70 MPa, respectively in one hour using argon gas, and thereafter, heating at a temperature elevating rate of 500° C. per hour and increase in a pressure were continued to reach a maximum ultimate pressure of 190 MPa and a maximum ultimate temperature of 1500° C. Then, the maximum ultimate temperature and pressure were maintained for one hour, and the temperature was reduced to room temperature and the pressure was decreased. The sample obtained after the treatment was a cluster of multi-layer graphenes (true density: 2.08, apparent density: 1.33, bulk density: 0.75, total pore ratio: 63.9).

INDUSTRIAL APPLICABILITY

The present invention provides a novel method for producing a substrate coated with multi-layer graphenes which is usable, as a transparent conductive film or a conductive film, on electrodes for panels such as liquid crystal display panels and plasma display panels, electrodes for display elements such as laptop computers, mobile phones and touch panels, or electrodes and electrode substrates for lithium ion batteries, lithium ion capacitors, fuel cells, thin film solar cells, other primary batteries and secondary batteries.

EXPLANATION OF SYMBOLS

1 Crucible cap
1a Outer circumference of crucible cap
2 Crucible body
2a Inner wall at the top of crucible body
3 Pre-baked starting material
4 Spacer
5 Sleeve
6 Particles of pre-baked starting material
6a Gas
6s Surface of particles of pre-baked starting material
7 Graphene
7a In-plane direction of carbon hexagonal planes (Direction of a-axis of graphite crystal)
7c Direction of c-axis of graphite crystal
8 Mass of multi-layer graphenes
9 Pedestal
10 Gripper (a part gripped with hand)
11 Rotary shaft
12 Adhesive layer (a layer of an adhesive adhering the mass of multi-layer graphenes to the pedestal)

The invention claimed is:

1. A method for producing a substrate coated with multi-layer graphenes, comprising laminating, on surface of a substrate, multi-layer graphenes from a mass of multi-layer graphenes,
   wherein the mass of multi-layer graphenes is an aggregation having a three-dimensional shape of many discrete multi-layer graphenes, approximately radially or approximately vertically to a plane or spherical surface in a three-dimensional space without being laminated to each other, and
   the thicknesses of the multi-layer graphenes are in the range of 0.34 nm to 100 nm; and
   wherein the mass of multi-layer graphenes is produced by a method comprising:
   preparing a powdery and/or particulate material of an organic compound pre-baked at a temperature of 1000° C. or lower, to an extent of containing remaining hydrogen;
   charging the powdery and/or particulate material in a closed vessel made of a heat-resistant material; and
   subjecting the powdery and/or particulate material together with the vessel to hot isostatic pressing treatment using a compressed gas atmosphere, wherein a maximum temperature in the hot isostatic pressing treatment is 900° C. to 2000° C., and the maximum temperature in the hot isostatic pressing treatment is higher than the pre-baking temperature.

2. The production method of claim 1, wherein the mass of multi-layer graphenes is an isotropic cluster of multi-layer graphenes composed of aggregates in such a state that discrete multi-layer graphenes extend approximately radially from the inside toward the outside.

3. The production method of claim 1, wherein the multi-layer graphenes constituting the mass of multi-layer graphenes have a thickness of from 0.34 to 10 nm.

4. The production method of claim 1, wherein the lamination is carried out by rubbing the surface of the substrate with the mass of multi-layer graphenes.

5. The production method of claim 1, wherein the lamination is carried out by bringing the surface of the substrate into contact with a dispersion of multi-layer graphenes prepared from the mass of multi-layer graphenes and then removing a solvent from the surface of the substrate.

6. The production method of claim 1, wherein the lamination is carried out by dip-coating of the surface of the substrate with a dispersion of multi-layer graphenes prepared from the mass of multi-layer graphenes.

7. The production method of claim 1, wherein the lamination is carried out by spray-coating of the surface of the substrate with a dispersion of multi-layer graphenes prepared from the mass of multi-layer graphenes.

8. The production method of claim 5, wherein the solvent is one selected from the group consisting of 1,2-dichloroethane, benzene, thionyl chloride, acetyl chloride, tetrachloroethylene carbonate, dichloroethylene carbonate, benzoyl fluoride, benzoyl chloride, nitromethane, nitrobenzene, acetic anhydride, phosphorus oxychloride, benzonitrile, selenium oxychloride, acetonitrile, tetramethylsulfone, dioxane, 1,2-propanediol carbonate, benzyl cyanide, ethylene sulfite, isobutyronitrile, propionitrile, dimethyl carbonate, propylene carbonate, ethyl methyl carbonate, diethyl carbonate, ethylene carbonate, phenyl phosphorous acid difluoride, methyl acetate, n-butyronitrile, acetone, ethyl acetate, water, phenyl phosphoric acid dichloride, diethyl ether, tetrahydrofuran, diphenyl phosphoric acid chloride, trimethyl phosphate, tributyl phosphate, dimethylformamide, N-methylpyrrolidine, n-dimethylacetamide, dimethyl sulfoxide, N-diethylformamide, N-diethylacetamide, pyridine, hexamethylphosphoric amide, hexane, carbon tetrachloride, diglyme, trichloromethane, 2-propanol, methanol, ethanol, propanol, ethylene glycol, methyl ethyl ketone, 2-methoxyethanol, dimethylacetamide, toluene and polybenzimidazole, or a mixture of at least two thereof; or said solvent or solvent mixture comprising a dispersant.

9. The production method of claim 6, wherein in the dip-coating, a temperature of the dispersion of multi-layer graphenes is 40° C. or more and a lift-up speed when lifting up the substrate dipped in the dispersion of multi-layer graphenes is from 1 to 1000 μm/sec.

10. The production method of claim 1, wherein a thickness of the layer of the multi-layer graphenes on the substrate coated with multi-layer graphenes is from 0.5 to 10000 nm.

11. The production method of claim 1, wherein the substrate is a resin film made of a resin selected from a polyester resin, an acrylic resin, a polystyrene resin, a polycarbonate resin, a polypropylene resin, a polyethylene resin, a polyvinyl chloride resin and a polytetrafluoroethylene resin; a glass substrate coated on its surface with a resin selected from a polyester resin, an acrylic resin, a polystyrene resin, a polycarbonate resin, a polypropylene resin, a polyethylene resin, a polyvinyl chloride resin and a polytetrafluoroethylene resin or a resin mixture of at least two thereof; a metal foil, metal sheet or metal film made of a metal selected from copper, nickel, iron, aluminum and titanium; paper; a glassy carbon substrate; a sapphire substrate; or a non-woven fabric made of a resin fiber, wherein the resin of the fiber is selected from aromatic polyamide resin, aromatic polyimide resin and polyester resin.

12. The production method of claim 1, wherein each of the discrete multi-layer graphenes is in a state of being grown, in the direction of the "a" axis of the graphite crystal, approximately vertically to a plane or spherical surface, and the discrete multi-layer graphenes cover the plane surface and the spherical surface to be in a film-like form.

13. The production method of claim 1, wherein the discrete multi-layer graphenes are in a state of being grown approximately radially from the center toward the outside of the fiber in the direction of "a" axis of the graphite crystal, and the multi-layer graphenes are connected to form a fibrous mass.

14. The production method of claim 2, further comprising the step of:
subjecting the cluster of multi-layer graphenes to partial cleaving to form a cluster of cloven multi-layer graphenes.

15. The method of claim 1, wherein:
the thicknesses of the multi-layer graphenes are in the range of 0.34 nm to 3.5 nm.

16. A method for producing a substrate coated with multi-layer graphenes, comprising laminating, on surface of a substrate, multi-layer graphenes from a mass of multi-layer graphenes, and then pressing the surface of the substrate,
wherein the mass of multi-layer graphenes is an aggregation having a three-dimensional shape of many discrete multi-layer graphenes, approximately radially or approximately vertically to a plane or spherical surface in a three-dimensional space without being laminated to each other, and
the thicknesses of the multi-layer graphenes are in the range of 0.34 nm to 100 nm; and
wherein the mass of multi-layer graphenes is produced by a method comprising:
preparing a powdery and/or particulate material of an organic compound pre-baked at a temperature of 1000° C. or lower, to an extent of containing remaining hydrogen;
charging the powdery and/or particulate material in a closed vessel made of a heat-resistant material; and
subjecting the powdery and/or particulate material together with the vessel to hot isostatic pressing treatment using a compressed gas atmosphere, wherein a maximum temperature in the hot isostatic pressing treatment is 900° C. to 2000° C., and the maximum temperature in the hot isostatic pressing treatment is higher than the pre-baking temperature.

17. The production method of claim 16, wherein the lamination is carried out by spray-coating of the surface of the substrate with a dispersion of multi-layer graphenes, a liquid of pulverized multi-layer graphenes or a dispersion of residual graphenes which are prepared from a mass of multi-layer graphenes.

18. The production method of claim 16, wherein the substrate is a resin film made of a resin selected from a polyester resin, an acrylic resin, a polystyrene resin, a polycarbonate resin, a polypropylene resin, a polyethylene resin, a polyvinyl chloride resin and a polytetrafluoroethylene resin; a glass substrate coated on its surface with a resin selected from a polyester resin, an acrylic resin, a polystyrene resin, a polycarbonate resin, a polypropylene resin, a polyethylene resin, a polyvinyl chloride resin and a polytetrafluoroethylene resin or a resin mixture of at least two thereof; a metal foil, metal sheet or metal film made of a metal selected from copper, nickel, iron, aluminum and titanium; paper; a glassy carbon substrate; a sapphire substrate; or a non-woven fabric made of a resin fiber, wherein the resin of the fiber is selected from aromatic polyamide resin, aromatic polyimide resin and polyester resin.

19. The production method of claim 16, wherein the lamination is carried out by a coating method selected from the group consisting of dip coating, spin coating, die coating spray coating, ink jet printing, printing using a dispenser, flexographic printing (letterpress printing), offset printing (planographic printing), gravure printing (intaglio printing), screen printing, electrophotography, heat transfer, laser transfer, slit coating, bar coating, blade coating, melt extrusion molding method in combination of a resin and an additive, inflation method, T die method, flat die method, solvent casting method, calendaring method, stretching method, multi-layer processing method, co-extrusion method, co-extrusion by inflation method, multi-manifold method, laminating method, extrusion-laminating method, laminating method using an adhesive, wet laminating method, dry laminating method, hot-melt laminating method, heat-seal method, external heating method, internal heating method, ion, ion plating, and sputtering.

20. The production method of claim 16, wherein the pressing is carried out by a method selected from the group consisting of cold rolling, hot rolling, roll press, hot press, and hot roll press.

21. The production method of claim 16, wherein the mass of multi-layer graphenes is an isotropic cluster of multi-layer graphenes composed of aggregates in such a state that discrete multi-layer graphenes extend approximately radially from the inside toward the outside.

22. The production method of claim 16, wherein each of the discrete multi-layer graphenes is in a state of being grown, in the direction of the "a" axis of the graphite crystal, approximately vertically to a plane or spherical surface, and the discrete multi-layer graphenes cover the plane surface and the spherical surface to be in a film-like form.

23. The production method of claim 16, wherein the discrete multi-layer graphenes are in a state of being grown approximately radially from the center toward the outside of the fiber in the direction of "a" axis of the graphite crystal, and the discrete multi-layer graphenes are connected to form a fibrous mass.

24. The production method of claim 21, further comprising the step of:
subjecting the cluster of multi-layer graphenes to partial cleaving to form a cluster of cloven multi-layer graphenes.

25. The production method of claim 16, wherein the pressing step comprises feeding the substrate to a roll press under heating and/or a hot press, wherein
the heating temperature of the roll press is 70° C. to 300° C.,
the press load of the roll press is 1 N to 100000 N,
the feeding speed to the roll press is 0.1 cm/sec to 10 cm/sec,
the heating temperature of the hot press is 70° C. to 300° C.,
the press load of the hot press is 1 N to 5000000 N, and
the pressing time of the hot press is 10 sec to 10 min.

26. The production method of claim 16, wherein the substrate is a resin film having a π-electron bond, or a non-woven fabric made of a resin fiber, wherein the resin of the fiber has a π-electron bond.

* * * * *